United States Patent
Hoke et al.

(10) Patent No.: US 6,214,303 B1
(45) Date of Patent: *Apr. 10, 2001

(54) METHOD AND APPARATUS FOR TREATING THE ATMOSPHERE

(75) Inventors: Jeffrey B. Hoke, North Brunswick; John R. Novak, Lawrenceville; John J. Steger, Pittstown; Terence C. Poles, Ringoes; L. Michael Quick, Bridgewater; Ronald M. Heck, Frenchtown; Zhicheng Hu, Edison; Michael Durilla, Howell, all of NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/589,032

(22) Filed: Jan. 19, 1996

Related U.S. Application Data

(63) Continuation-in-part of application No. 08/549,996, filed on Oct. 27, 1995, now abandoned, which is a continuation-in-part of application No. 08/537,206, filed on Sep. 29, 1995, now abandoned, which is a continuation-in-part of application No. 08/410,445, filed on Mar. 24, 1995, now abandoned, which is a continuation-in-part of application No. 08/376,332, filed on Jan. 20, 1995, now abandoned, said application No. 08/549,996, is a continuation-in-part of application No. 08/412,525, filed on Mar. 29, 1995, now abandoned, which is a continuation-in-part of application No. 08/410,445, which is a continuation-in-part of application No. 08/376,332.

(51) Int. Cl.[7] .................................................. B01D 47/00
(52) U.S. Cl. ..................... 423/210; 423/210; 423/219; 423/245.1; 423/243.3; 423/247
(58) Field of Search ................................... 423/210, 219, 423/235, 245.1, 243.3, 247

(56) References Cited

U.S. PATENT DOCUMENTS

| | | |
|---|---|---|
| 1,484,782 | 2/1924 | Heise . |
| 1,628,344 | 5/1927 | Walsh . |
| 1,863,015 | 6/1932 | Kamrath . |
| 1,937,488 | 11/1933 | Jenness ................................. 23/234 |
| 1,937,489 | 11/1933 | Jenness ................................. 23/234 |

(List continued on next page.)

FOREIGN PATENT DOCUMENTS

| | | |
|---|---|---|
| 822 053 | 11/1951 | (DE) . |
| 1067691 | 10/1959 | (DE) . |
| 1095128 | 12/1960 | (DE) . |
| 1101160 | 3/1961 | (DE) . |
| 1133154 | 7/1962 | (DE) . |

(List continued on next page.)

OTHER PUBLICATIONS

Derwent Abstract (see Attached).
Manganese Compounds, vol. 15, pp. 1003–1050.
SAE 931088 Calculation and Design of Cooling Systems by Eichiseder & Raab of Steyr Damler Puch AG, 1993.
SAE 931089 Charge Air Cooler for Passenger Cars by thierry Collette of Valeo Thermique Moteur, 1993.

(List continued on next page.)

Primary Examiner—Gary P. Straub
(74) Attorney, Agent, or Firm—Richard A. Negin

(57) ABSTRACT

Method and apparatus for treating the atmosphere to lower the concentration of pollutants therein in which ambient air is passed into operative contact with a stationary substrate having at least one ambient air contacting surface having a pollutant treating material thereon.

17 Claims, 17 Drawing Sheets

U.S. PATENT DOCUMENTS

| | | | |
|---|---|---|---|
| 2,213,017 | 8/1940 | Perkins | 98/2 |
| 2,455,734 | 12/1948 | Clausen | 183/53 |
| 2,473,563 | 6/1949 | Beja et al. | 23/145 |
| 2,551,823 | 5/1951 | Buttner et al. | 237/28 |
| 2,658,742 | 11/1953 | Suter et al. | 263/3 |
| 2,701,104 | 2/1955 | Fox | 241/3 |
| 2,956,860 | 10/1960 | Welsh | 23/145 |
| 2,966,339 | 12/1960 | Morgan | 257/1 |
| 3,110,300 | 11/1963 | Brown et al. | 126/109 |
| 3,147,100 | 9/1964 | Wilber | 55/419 |
| 3,242,013 | 3/1966 | Mehne et al. | 136/138 |
| 3,269,801 | 8/1966 | Boberg et al. | 23/238 |
| 3,356,452 | 12/1967 | Moore | 23/145 |
| 3,414,440 | 12/1968 | Moore | 136/107 |
| 3,565,203 | 2/1971 | Ashton et al. | 180/68 |
| 3,596,441 | 8/1971 | Luedahl | 55/376 |
| 3,640,683 | 2/1972 | Miyazaki et al. | 23/145 |
| 3,685,983 | 8/1972 | Louzos | 75/5 R |
| 3,738,088 | 6/1973 | Colosimo | 55/104 |
| 3,770,868 | 11/1973 | Swinkels et al. | 423/50 |
| 3,823,533 | 7/1974 | Alverson et al. | 55/493 |
| 3,837,149 | 9/1974 | West et al. | 55/269 |
| 3,859,788 | 1/1975 | King et al. | 60/280 |
| 3,864,118 | 2/1975 | Schumacher et al. | 75/3 |
| 3,883,637 | 5/1975 | Benedict | 423/230 |
| 3,915,837 | 10/1975 | Feige, Jr. | 204/286 |
| 3,959,021 | 5/1976 | Nishino et al. | 136/138 |
| 3,993,597 | 11/1976 | Stiles | 252/454 |
| 4,006,217 | 2/1977 | Faber et al. | 423/605 |
| 4,007,875 | 2/1977 | Stolz et al. | 237/12.3 A |
| 4,089,928 | 5/1978 | Foroglou | 423/49 |
| 4,101,296 | 7/1978 | Lowther | 55/33 |
| 4,134,860 | 1/1979 | Hindin et al. | 252/466 |
| 4,141,963 | 2/1979 | Miller | 423/592 |
| 4,160,806 | 7/1979 | Long et al. | 422/223 |
| 4,171,211 | 10/1979 | Carter | 55/493 |
| 4,173,549 | 11/1979 | Kent et al. | 252/463 |
| 4,184,983 | 1/1980 | Putz et al. | 252/466 PT |
| 4,197,366 | 4/1980 | Tamura et al. | 429/197 |
| 4,200,609 | 4/1980 | Byrd | 422/122 |
| 4,206,083 | 6/1980 | Chang | 252/455 R |
| 4,207,291 | 6/1980 | Byrd et al. | 422/122 |
| 4,214,867 | 7/1980 | Hunter et al. | 432/29 |
| 4,234,326 | 11/1980 | Bailey et al. | 55/278 |
| 4,246,253 | 1/1981 | Hunter | 423/605 |
| 4,261,863 | 4/1981 | Kent et al. | 252/463 |
| 4,277,360 | 7/1981 | Mellors et al. | 252/182.1 |
| 4,284,618 | 8/1981 | Van der Heyden et al. | 423/605 |
| 4,285,913 | 8/1981 | Soni et al. | 423/50 |
| 4,302,490 | 11/1981 | Byrd | 427/301 |
| 4,310,494 | 1/1982 | Welsh | 423/49 |
| 4,343,776 | 8/1982 | Carr et al. | 423/210 |
| 4,348,360 | 9/1982 | Chang et al. | 422/122 |
| 4,352,321 | 10/1982 | Fukui et al. | 98/2.11 |
| 4,363,787 | 12/1982 | Yoon | 422/201 |
| 4,379,129 | 4/1983 | Abe | 423/210 |
| 4,379,817 | 4/1983 | Kozawa | 429/224 |
| 4,399,185 | 8/1983 | Petrow | 428/253 |
| 4,402,931 | 9/1983 | Tanabe et al. | 423/605 |
| 4,405,507 | 9/1983 | Carr et al. | 252/466 |
| 4,405,699 | 9/1983 | Kruger | 429/224 |
| 4,425,145 | 1/1984 | Reese | 55/385 B |
| 4,476,104 | 10/1984 | Mellors | 423/605 |
| 4,477,541 | 10/1984 | Fraioli | 429/33 |
| 4,483,828 | 11/1984 | Laughlin et al. | 423/49 |
| 4,485,073 | 11/1984 | Robertson et al. | 423/49 |
| 4,489,043 | 12/1984 | Bowerman et al. | 423/49 |
| 4,537,839 | 8/1985 | Cameron | 429/20 |
| 4,551,254 | 11/1985 | Imada et al. | 210/688 |
| 4,579,723 | 4/1986 | Weltmer et al. | 423/219 |
| 4,581,219 | 4/1986 | Imada et al. | 423/605 |
| 4,585,718 | 4/1986 | Uedaira et al. | 429/224 |
| 4,590,059 | 5/1986 | Mellors | 423/605 |
| 4,595,643 | 6/1986 | Koshiba et al. | 429/27 |
| 4,604,336 | 8/1986 | Nardi | 429/224 |
| 4,619,821 | 10/1986 | Ely | 423/579 |
| 4,657,887 | 4/1987 | Hardman et al. | 502/303 |
| 4,662,065 | 5/1987 | Marincic et al. | 29/623.1 |
| 4,665,973 | 5/1987 | Limberg et al. | 165/133 |
| 4,666,677 | 5/1987 | Ramus et al. | 422/183 |
| 4,684,381 | 8/1987 | Wasylyniuk | 55/316 |
| 4,714,694 | 12/1987 | Wan et al. | 502/304 |
| 4,733,605 | 3/1988 | Hölter et al. | 98/2.11 |
| 4,734,113 | 3/1988 | Takagi et al. | 55/504 |
| 4,738,947 | 4/1988 | Wan et al. | 502/304 |
| 4,742,038 | 5/1988 | Matsumoto | 502/303 |
| 4,818,354 | 4/1989 | Preisler et al. | 204/96 |
| 4,824,363 | 4/1989 | Abthoff et al. | 432/222 |
| 4,838,910 | 6/1989 | Stollenwerk et al. | 55/385.2 |
| 4,871,709 | 10/1989 | Tatsushima et al. | 502/324 |
| 4,909,815 | 3/1990 | Meyer | 55/316 |
| 4,921,689 | 5/1990 | Walker et al. | 423/605 |
| 4,961,762 | 10/1990 | Howeth | 55/302 |
| 4,975,346 | 12/1990 | Lecerf et al. | 429/197 |
| 5,004,487 | 4/1991 | Kowalczyk | 55/269 |
| 5,010,051 | 4/1991 | Rudy | 502/304 |
| 5,057,483 | 10/1991 | Wan | 502/304 |
| 5,080,882 | 1/1992 | Yoshimoto et al. | 423/579 |
| 5,082,570 | 1/1992 | Higgins et al. | 210/683 |
| 5,085,266 | 2/1992 | Arold et al. | 165/1 |
| 5,092,396 | 3/1992 | Murano et al. | 165/119 |
| 5,139,992 | 8/1992 | Tauster et al. | 502/304 |
| 5,142,864 | 9/1992 | Dunne | 60/274 |
| 5,145,657 | 9/1992 | Kobayashi et al. | 423/219 |
| 5,145,822 | 9/1992 | Falke et al. | 502/150 |
| 5,145,825 | 9/1992 | Deeba et al. | 502/242 |
| 5,147,429 | 9/1992 | Bartholmew et al. | 55/356 |
| 5,160,586 | 11/1992 | Yoshimoto et al. | 204/59 |
| 5,162,274 | 11/1992 | Deitz | 502/51 |
| 5,176,833 | 1/1993 | Vaughn et al. | 210/638 |
| 5,180,502 | 1/1993 | Nishiki et al. | 210/748 |
| 5,187,137 | 2/1993 | Terui et al. | 502/241 |
| 5,194,233 | 3/1993 | Kitahara et al. | 423/210 |
| 5,212,140 | 5/1993 | Yoshimoto et al. | 502/300 |
| 5,214,014 | 5/1993 | Yoshimoto et al. | 502/84 |
| 5,221,649 | 6/1993 | Yoshimoto et al. | 502/84 |
| 5,221,652 | 6/1993 | Tierney et al. | 502/170 |
| 5,227,144 | 7/1993 | Perez de la Garza | 423/210 |
| 5,232,882 | 8/1993 | Yoshimoto et al. | 502/5 |
| 5,232,886 | 8/1993 | Yoshimoto et al. | 502/84 |
| 5,262,129 | 11/1993 | Terada et al. | 422/122 |
| 5,277,890 | 1/1994 | Wang et al. | 423/605 |
| 5,283,041 | 2/1994 | Nguyen et al. | 423/240 |
| 5,283,139 | 2/1994 | Newman et al. | 429/224 |
| 5,294,499 | 3/1994 | Furukawa et al. | 429/164 |
| 5,296,435 | 3/1994 | Kitaguchi et al. | 502/174 |
| 5,308,591 | 5/1994 | Whittenberger | 422/174 |
| 5,317,869 | 6/1994 | Takeuchi | 60/300 |
| 5,340,562 | 8/1994 | O'Young et al. | 423/599 |
| 5,348,726 | 9/1994 | Wang et al. | 423/605 |
| 5,356,457 | 10/1994 | Pincheira Alvarez et al. | 75/710 |
| 5,382,417 | 1/1995 | Haase | 423/219 |
| 5,391,365 | 2/1995 | Wang et al. | 423/605 |
| 5,395,534 | 3/1995 | Smith | 210/688 |
| 5,401,477 | 3/1995 | Cawlfield et al. | 423/50 |
| 5,405,594 | 4/1995 | Andersen et al. | 423/605 |
| 5,411,643 | 5/1995 | Cawlfield et al. | 204/115 |
| 5,419,882 | 5/1995 | Jibiki | 423/111 |
| 5,422,331 | 6/1995 | Galligan et al. | 502/333 |
| 5,447,693 | 9/1995 | Ohta et al. | 422/122 |
| 5,620,672 | 4/1997 | Galligan et al. | 423/219 |

| | | | |
|---|---|---|---|
| 5,676,913 | 10/1997 | Cirillo et al. ........................ | 423/219 |

FOREIGN PATENT DOCUMENTS

| | | | |
|---|---|---|---|
| 215 5738 | 1/1973 | (DE) ............................... | B60H/3/06 |
| 25 49 621 B2 | 5/1977 | (DE) . | |
| 37 13 035 A1 | 10/1988 | (DE) ............................. | B65D/90/28 |
| 40 07 965 A1 | 9/1991 | (DE) ............................. | B01J/23/84 |
| 40 17 892 A1 | 12/1991 | (DE) ............................. | B01J/23/89 |
| 42 09 196 C1 | 7/1993 | (DE) ............................. | B01D/53/36 |
| 42 09 198 C1 | 7/1993 | (DE) ............................. | B01D/53/36 |
| 40 07 965 C2 | 3/1994 | (DE) . | |
| 43 18 738 C1 | 7/1994 | (DE) . | |
| 44 20 224 A1 | 1/1995 | (DE) ............................. | B01D/53/86 |
| 44 23 329 A1 | 1/1995 | (DE) ............................. | B01D/53/86 |
| 0 186 477 B1 | 7/1986 | (EP) ............................... | F24F/3/12 |
| 0 431 648 A1 | 6/1991 | (EP) ............................. | A61L/9/015 |
| 470 330 A1 | 2/1992 | (EP) ........................... | F02M/35/024 |
| 0 561 484 A1 | 9/1993 | (EP) ............................. | B01D/53/36 |
| 06 28338A1 | 12/1994 | (EP) . | |
| 0 634 205 A1 | 1/1995 | (EP) . | |
| 0 635 685 A1 | 1/1995 | (EP) . | |
| 0 653 956 B1 | 5/1995 | (EP) ............................. | B01D/53/66 |
| 0 666 776 B1 | 8/1995 | (EP) ............................. | B01J/35/04 |
| 2 009 392 | 1/1979 | (GB) ............................... | F24F/7/06 |
| 2 056 424 | 3/1981 | (GB) ............................. | B01D/53/36 |
| 2037607 | 5/1983 | (GB) . | |
| 2 056 424 | 7/1983 | (GB) ............................. | B01D/63/36 |
| 7-4011141 | 3/1915 | (JP) ............................... | B01D/53/34 |
| 49-011141 | 3/1974 | (JP) . | |
| 55-106813 | 8/1990 | (JP) . | |
| 3-229645 | 3/1991 | (JP) . | |
| 4-176316 | 6/1992 | (JP) . | |
| 4-297341 | 10/1992 | (JP) ................................. | B60P/3/00 |
| 405007776 | 1/1993 | (JP) ............................... | B01J/23/64 |
| 6-13204 | 1/1994 | (JP) . | |
| WO 9109755 | 7/1991 | (WO) . | |
| WO9427709 | 12/1994 | (WO) . | |
| WO 97/41948 | 11/1997 | (WO) ............................ | B01D/53/86 |
| WO 98/06479 | 2/1998 | (WO) ............................ | B01D/53/86 |
| WO 98/06480 | 2/1998 | (WO) ............................ | B01D/53/86 |

OTHER PUBLICATIONS

SAE 931092 State of the Art & Future Developments of Aluminum Radiators for Cars & Trucks by Josef Kern & Jochen Eitel of Behr GmbH & Co., 1993.

SAE 931112 Air Mix versus Coolant Flow to Control Discharge Air Temperature in Vehicle Heating and Air Conditioning Systems by Gary Rolling and Robert Cummings of Behr of America, Inc. and Gebhard Schweizer of Behr GmbH & Co., 1993.

SAE 931115 Engine Cooling Module Development Using Air Flow Management Technique by Refki El–Bourini & Samuel Chen of Calsonic Technical Center, 1993.

SAE 931120 A New Zeolite Energy Storage Concept for Cooling & Heating Sleeping Cabins in Trucks by Manfred Nonnenman & Noureddine Khellifa of Behr GmbH & Co., 1993.

SAE 931121 Automotive Evaporator and Condenser Modeling by Francisco Castro, Francisco Tinaut & A.A. Rahman Ali of Universidad de Valladolid, 1993.

SAE 931125 Durability Concerns of Aluminum Air to Air Charge Air Coolers by Paul Richard Smith of Valeo Engine Cooling Inc., 1993.

Taylor, The Internal Combustion Engine in Theory and Practice, vol. I: Thermo Dynamics, Fluid Flow, Performance, Second Edition, Rev., The MIT Press, 1985 at pp. 304–306 for radiator and fin design; and p. 392 for after coolers.

Bosch Automotive Handbook, Second Edition, pp. 301–303, 320 and 349–351 published by Robert Bosch GmbH, 1986.

Outside submission from Litman Law Offices, Ltd. in the Application of Leo K. Brown for an Environmental Air Filtration System for Vehicles.

Outside submission from Attorney Conrad O. Gardner in the Application of a System for Ambient Air Pollution Processing by Motor Vehicles.

O'Young, Hydrothermal Synthesis of Manganese Oxides with Tunnel Structures, Modern Analytical Techniques for Analysis of Petroleum, presented at Symposium on Advances in Zeolites and Pillared Clay Structures before the Division of Petroleum Chemistry, Inc., American Chemical Society, NYC Meeting, Aug. 25–30, 1991 beginning at p. 348.

McKenzie, The Synthesis of Birnessite, Cryptomelane, and Some Other Oxides and Hydroxides of Manganese, Mineralogical Magazine, Dec. 1971, vol. 38, pp. 493–502.

Newspaper Article with informal Translation—Mobile Air Purification.

Newspaper Article with Informal Translation—Super–Kat in cars ensures clean air forever.

METHOD AND APPARATUS FOR TREATING THE ATMOSPHERE

RELATED APPLICATIONS

This application is a continuation-in-part of Appl. Ser. No. 08/549,996, filed Oct. 27, 1995 abandoned, which is a continuation-in-part of Appl. Ser. No. 08/537,206 abandoned, filed Sep. 29, 1995, which is a continuation-in-part of Appl. Ser. No. 08/410,445 abandoned, filed Mar. 24, 1995, which is a continuation-in-part of Appl. Ser. No. 08/376,332 abandoned, filed Jan. 20, 1995, all of which are incorporated herein by reference. Appl. Ser. No. 08/549,996 abandoned, is also a continuation-in-part of Appl. Ser. No. 08/412,525 abandoned, filed Mar. 29, 1995, which is a continuation-in-part of Appl. Ser. No. 08/410,445 abandoned, filed Mar. 24, 1995, which is a continuation-in-part of Appl. Ser. No. 08/376,332 abandoned, filed Jan. 20, 1995, all of which are incorporated herein by reference.

BACKGROUND OF THE INVENTION

1. Field of the Invention

The present invention relates to a method and apparatus for cleaning the atmosphere; and more particularly to a stationary substrate comprising at least one atmosphere contacting surface having a pollutant treating material thereon.

2. Discussion of the Related Art

A review of literature relating to pollution control reveals many references discussing the general approach of cleaning waste gas streams entering the environment. If too much of one pollutant or another is detected as being discharged, steps are taken to reduce the level of that pollutant, either by treating the gas stream or by modifying the process that produces the pollutant. However, there has been little effort to treat pollutants which are already in the environment; the environment has been left to its own self cleansing systems.

U.S. Pat. No. 3,738,088 discloses an air filtering assembly for cleaning pollution from the ambient air by utilizing a vehicle as a mobile cleaning device. A variety of elements are used in combination with a vehicle to clean the ambient air as the vehicle is driven through the environment. In particular, modified vehicles include ducting to control air stream velocity and direct the air to a variety of filters, electronic precipitators and catalyzed postfilters.

German Patent DE 43 18 738 C1 also discloses a process for the physical and chemical cleaning of outside air. Motor vehicles are used as carriers of conventional filters and/or catalysts, which do not constitute operational components of the vehicle but are used to directly clean atmospheric air.

Another approach is discussed in U.S. Pat. No. 5,147,429, which is directed to a mobile airborne air cleaning station. In particular, this patent features a dirigible for collecting air with a plurality of different types of air cleaning devices contained therein. The air cleaning devices disclosed include wet scrubbers, filtration machines, and cyclonic spray scrubbers.

The difficulty with devices previously disclosed for cleaning ambient air in the atmosphere is that they require new and additional equipment, and may be required to be operated separately just to accomplish such cleaning. For example, the modified vehicle disclosed in U.S. Pat. No. 3,738,088 requires separate ducting and filters, and the equipment laden dirigible of U.S. Pat. No. 5,147,429 is operated solely for such cleaning purposes.

German patent DE 40 07 965 C2 to Klaus Hager discloses a catalyst comprising copper oxides for converting ozone and a mixture of copper oxides and manganese oxides for converting carbon monoxide. The catalyst can be applied as a coating to a self heating radiator, oil coolers or charged-air coolers. The catalyst coating comprises heat resistant binders which are also gas permeable. It is indicated that the copper oxides and manganese oxides are widely used in gas mask filters and have the disadvantage of being poisoned by water vapor. However, the heating of the surfaces of the automobile during operation evaporates the water. In this way, continuous use of the catalyst is possible since no drying agent is necessary.

Manganese oxides are known to catalyze the oxidation of ozone to form oxygen. Many commercially available types of manganese compound and compositions, including alpha manganese oxide are disclosed to catalyze the reaction of ozone to form oxygen. In particular, it is known to use the cryptomelane form of alpha manganese oxide to catalyze the reaction of ozone to form oxygen.

Alpha manganese oxides are disclosed in references such as O'Young, Hydrothermal Synthesis of Manganese Oxides with Tunnel Structures, Modern Analytical Techniques for Analysis of Petroleum, presented at the Symposium on Advances in Zeolites and Pillared Clay Structures before the Division of Petroleum Chemistry, Inc. American Chemical Society New York City Meeting, Aug. 25–30, 1991 beginning at page 348. Such materials are also disclosed in U.S. Pat. No. 5,340,562 to O'Young, et al. Additionally, forms of $\alpha$-$MnO_2$ are disclosed in McKenzie, the Synthesis of Birnessite, Cryptomelane, and Some Other Oxides and Hydroxides of Manganese, Mineralogical Magazine, December 1971, Vol. 38, pp. 493–502. For the purposes of the present invention, $\alpha$-$MnO_2$ is defined to include hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$). O'Young discloses these materials to have a three dimensional framework tunnel structure (U.S. Pat. No. 5,340,562 and O'Young Hydrothermal Synthesis of Manganese Oxides with Tunnel Structures both hereby incorporated by reference). For the purposes of the present invention, $\alpha$-$MnO_2$ is considered to have a 2×2 tunnel structure and to include hollandite, cryptomelane, manjiroite and coronadite.

Commonly assigned U.S. Pat. No. 5,422,331, incorporated herein by reference, discloses methods and catalyst compositions for abating noxious substances, particularly ozone, contained in air. The treatment of carbon monoxide, hydrogen sulfide and hydrocarbons is also discussed. A primary focus of this patent is methods of treating air taken into and/or circulated in aircraft cabins, with the cabins of trains, buses and other vehicles being mentioned as well. The patent also indicates that the disclosed catalysts can be used to abate ozone in equipment, such as xerographic copy machines, which generate ozone. Further, the patent indicates that the catalysts can be applied to surfaces in air handling systems for residences, office and factory buildings, public buildings, hospitals and the like. For this method, the catalyst can be applied to existing substrates of the air handling system, such as fan blades in air handling fans or compressors, grills, louvers or any other surface exposed to the air stream.

Responsive to the difficulties associated with devices for proactively treating the atmosphere, the Assignee herein in U.S. Appl. Ser. No. 08/410,445, filed Mar. 24, 1995, disclosed apparatus and related methods for treating the atmosphere by employing a moving vehicle. In preferred embodiments a portion of the cooling system (e.g. the radiator) is coated with a catalytic or adsorption composition.

Additionally, a fan associated with the cooling system can operate to draw or force air into operative contact with the radiator. Pollutants contained within the air such as ozone and/or carbon monoxide are then converted to non-polluting compounds (e.g. oxygen gas and carbon dioxide).

U.S. Appl. Ser. No. 08/412,525 ('525), of which the present application is a continuation-in-part, discloses methods and apparatus for treating pollutants present in the atmosphere, by the use of a stationary substrate coated with pollutant treating composition. The present application is directed to particular embodiments of the invention set forth in the '525 application, directed at coating various surfaces which contact the atmosphere with pollution treating compositions.

SUMMARY OF THE INVENTION

The present invention relates to apparatus, methods and compositions to treat the atmosphere to remove pollutants therefrom. The term "atmosphere" is defined herein as the mass of air surrounding the earth. The term "ambient air" shall mean the atmosphere which is naturally or purposefully drawn or forced towards a pollutant treating substrate. It is also intended to include air which has been heated either incidentally or by a heating means.

The present invention is generally directed to a method for treating the atmosphere comprising passing ambient air over a stationary substrate having at least one air contacting surface having a pollutant treating material thereon. The stationary substrate is any substrate that can be modified, for example by coating, to contain the pollutant treating material. For purposes of this application, a substrate is considered stationary when it is operatively attached to a non-moving structure. For example, the fan or adjustable louvers of an air handling system for a building are considered stationary, even though the fan revolves and the louvers can be moved.

In one embodiment of the present invention, the pollutant treating substrate is a surface which already exists on a stationary object. This includes surfaces, as discussed above and further below, such as heat exchange surfaces, fan blades, building exteriors, duct surfaces, and so forth.

Preferably the surface is one which permits periodic rejuvenating of the pollutant treating material. Such rejuvenating may include cleaning, reactivating and/or replacing the pollutant treating material on the substrate, or any other process which restores the active properties of the material. Suitable cleaning processes include water washing, steam washing or air lancing. Such cleaning processes can be used to remove contaminants from the pollutant treating material, or to remove some or all of the material prior to applying fresh material to the substrate. Reactivating steps include, but are not limited to, thermal processes to remove volatile pollutants or other contaminants which can be volatilized by thermal treatment, and chemical processes to restore the pollutant treating properties of the material.

In another embodiment of the present invention, the pollutant treating substrate can be a surface of an additional component which can be added to a stationary object. For example, a pollutant treating substrate can be included in a device which is permanently or removably mounted on an existing air-handling system so as to provide a pollutant treating substrate in the path of the air flow without substantial alteration to the existing equipment. The added substrate is preferably in the form of a replaceable device, to facilitate replacement or rejuvenation of the pollutant treating material. Alternatively, the substrate may be permanently mounted in a manner which permits rejuvenating of the pollutant treating material in place.

A key aspect of the present invention is that it is directed to reducing levels of pollutants in the atmosphere in general, rather than to treating an airstream being drawn or forced into or out of a confined space, such as a building. The ambient air may be drawn over the substrate by natural wind currents or by the use of an air drawing means such as a fan or the like to draw or force ambient air into operative contact with the substrate having the pollutant treating composition thereon.

In one embodiment of the present invention, the pollutant treating process is carried out at or below ordinary room temperature, which is defined for purposes of this application as about 25° C. As discussed below, most adsorbents and many catalysts can be used at such temperatures. Methods and apparatus which can operate at below ordinary ambient temperatures are desirable because they do not require additional heating.

In another embodiment, the pollutant treating process is carried out at temperatures above the 25° C. ordinary room temperature. Such elevated temperatures may be necessary to activate the pollutant treating material, particularly certain catalysts, or may simply improve the efficiency of the treatment process. The elevated temperatures may be provided by either heating the air prior to its contact with the treatment surface, by heating the treatment surface, or by heating both. Such heating may be the result of purposefully heating the air or the surface, or by the use of a system in which the air or the surface is normally at a temperature above 25° C. Furthermore, it is not necessary that the heating be continuous, but only that the temperature at the air contacting surface be above the desired temperature for at least a measurable period of time, to allow the treatment to proceed for that period of time. For example, an exterior surface which is heated during the daylight by the sun, could be catalytically active just during the day, and this may be satisfactory for treating a pollutant which is at particularly high levels during the day. The present invention is also applicable to processes where the ambient air or treatment surface is heated by contact with a object which is normally heated for other purposes, either continuously or intermittently, such as the coils of an air conditioning condenser.

The present invention is directed to compositions, methods and articles to treat pollutants in air. Such pollutants may typically comprise from 0 to 400 parts, more typically 1 to 300, and yet more typically 1 to 200, parts per billion (ppb) ozone; 0 to 30 parts, and more typically 1 to 20, parts per million (ppm) carbon monoxide; and 2 to 3000 ppb unsaturated hydrocarbon compounds such as $C_2$ to about $C_{20}$ olefins and partially oxygenated hydrocarbons such as alcohols, aldehydes, esters, ethers, ketones and the like. Other pollutants present may include nitrogen oxides and sulfur oxides. The National Ambient Air Quality Standard for ozone is 120 ppb, and for carbon monoxide is 9 ppm.

Pollutant treating compositions include catalyst compositions useful for catalyzing the conversion of pollutants present in the atmosphere to non-objectionable materials. Alternatively, adsorption compositions can be used as the pollutant treating composition to adsorb pollutants which can be destroyed upon adsorption, or stored for further treatment at a later time.

Catalyst compositions can be used which can assist in the conversion of the pollutants to harmless compounds or to less harmful compounds. Useful and preferred catalyst compositions include compositions which catalyze the reaction of ozone to form oxygen, catalyze the reaction of carbon monoxide to form carbon dioxide, and/or catalyze the reaction of hydrocarbons to form water and carbon dioxide. Specific and preferred catalysts to catalyze the reaction of hydrocarbons are useful for catalyzing the reaction of low molecular weight unsaturated hydrocarbons having from two to twenty carbons and at least one double bond, such as $C_2$ to about $C_8$ mono-olefins. Such low molecular weight hydrocarbons have been identified as being sufficiently reactive to cause smog. Particular olefins which can be reacted include propylene and butylene. A useful and preferred catalyst can catalyze the reactions of both ozone and carbon monoxide; and preferably ozone, carbon monoxide and hydrocarbons.

Ozone—Useful and preferred catalyst compositions to treat ozone include a composition comprising manganese compounds including oxides such as $Mn_2O_3$ and $MnO_2$ with a preferred composition comprising α-$MnO_2$, and cryptomelane being most preferred. Other useful and preferred compositions include a mixture of $MnO_2$ and CuO. Specific and preferred compositions comprise hopcalite which contains CuO and MnO2 and, more preferably Carulite® which contains $MnO_2$, CuO and $Al_2O_3$ and sold by the Carus Chemical Co. An alternative composition comprises a refractory metal oxide support on which is dispersed a catalytically effective amount of a palladium component and preferably also includes a manganese component. Also useful is a catalyst comprising a precious metal component, preferably a platinum component on a support of coprecipitated zirconia and manganese oxide. The use of this coprecipitated support has been found to be particularly effective to enable a platinum component to be used to treat ozone. Yet another composition which can result in the conversion of ozone to oxygen comprises carbon, and palladium or platinum supported on carbon, manganese dioxide, Carulite® and/or hopcalite. Manganese supported on a refractory oxide such as alumina has also been found to be useful.

Carbon Monoxide—Useful and preferred catalyst compositions to treat carbon monoxide include a composition comprising a refractory metal oxide support on which is dispersed a catalytically effective amount of a platinum or palladium component, preferably a platinum component. A most preferred catalyst composition to treat carbon monoxide comprises a reduced platinum group component supported on a refractory metal oxide, preferably titania. Useful catalytic materials include precious metal components including platinum group components which include the metals and their compounds. Such metals can be selected from platinum, palladium, rhodium and ruthenium, gold and/or silver components. Platinum will also result in the catalytic reaction of ozone. Also useful is a catalyst comprising a precious metal component, preferably a platinum component on a support of coprecipitated zirconia and manganese dioxide. Preferably, this catalyst embodiment is reduced. Other useful compositions which can convert carbon monoxide to carbon dioxide include a platinum component supported on carbon or a support comprising manganese dioxide. Preferred catalysts to treat such pollutants are reduced. Another composition useful to treat carbon monoxide comprises a platinum group metal component, preferably a platinum component, a refractory oxide support, preferably alumina and titania and at least one metal component selected from a tungsten component and rhenium component, preferably in the metal oxide form.

Hydrocarbons—Useful and preferred catalyst compositions to treat unsaturated hydrocarbons including $C_2$ to about $C_{20}$ olefins and typically $C_2$ to $C_8$ mono-olefins such as propylene and partially oxygenated hydrocarbons as recited have been found to be the same type as recited for use in catalyzing the reaction of carbon monoxide with the preferred compositions for unsaturated hydrocarbons comprising a reduced platinum component and a refractory metal oxide support for the platinum component. A preferred refractory metal oxide support is titania. Other useful compositions which can convert hydrocarbons to carbon dioxide and water include a platinum component supported on carbon or a support comprising manganese dioxide. Preferred catalysts to treat such pollutants are reduced. Another composition useful to convert hydrocarbons comprises a platinum group metal component, preferably a platinum component, a refractory oxide support, preferably alumina and titania and at least one metal component selected from a tungsten component and rhenium component, preferably in the metal oxide form.

Ozone and Carbon Monoxide—A useful and preferred catalyst which can treat both ozone and carbon monoxide comprises a support such as a refractory metal oxide support on which is dispersed a precious metal component. The refractory oxide support can comprise a support component selected from the group consisting of ceria, alumina, silica, titania, zirconia, and mixtures thereof. Also useful as a support for precious metal catalyst components is a coprecipitate of zirconia and manganese oxides. Most preferably, this support is used with a platinum component and the catalyst is in reduced form. This single catalyst has been found to effectively treat both ozone and carbon monoxide. Other useful and preferred precious metal components are comprised of precious metal components selected from palladium and also platinum components with palladium preferred. A combination of a ceria support with a palladium component results in an effective catalyst for treating both ozone and carbon monoxide. Other useful and preferred catalysts to treat both ozone and carbon monoxide include a platinum group component, preferably a platinum component or palladium component and more preferably a platinum component, on titania or on a combination of zirconia and silica. Other useful compositions which can convert ozone to oxygen and carbon monoxide to carbon dioxide include a platinum component supported on carbon or on a support comprising manganese dioxide. Preferred catalysts are reduced.

Ozone, Carbon Monoxide and Hydrocarbons—A useful and preferred catalyst which can treat ozone, carbon monoxide and hydrocarbons, typically low molecular weight olefins ($C_2$ to about $C_{20}$) and typically $C_2$ to $C_8$ mono-olefins and partially oxygenated hydrocarbons as recited comprises a support, preferably a refractory metal oxide support on which is dispersed a precious metal component. The refractory metal oxide support can comprise a support component selected from the group consisting of ceria, alumina, titania, zirconia and mixtures thereof with titania most preferred. Useful and preferred precious metal components are comprised of precious metal components selected from platinum group components including palladium and platinum components with platinum most preferred. It has been found that a combination of a titania support with a platinum component results in the most effective catalyst for treating ozone, carbon monoxide and low molecular weight gaseous olefin compounds. It is preferred to reduce the platinum group components with a suitable reducing agent. Other useful compositions which can convert ozone to oxygen, carbon monoxide to carbon dioxide, and hydrocarbons to carbon dioxide include a platinum component supported on carbon, a support comprising manganese dioxide, or a support comprising a coprecipitate of manganese oxides and zirconia. Preferred catalysts are reduced.

The above compositions can be applied by coating to at least one atmosphere contacting surface. Particularly preferred compositions catalyze the destruction of ozone, carbon monoxide and/or unsaturated low molecular weight olefinic compounds at ambient conditions or ambient operating conditions. Ambient conditions are the conditions of the atmosphere. By ambient operating conditions it is meant the conditions, such as temperature, of the atmosphere contacting surface during normal operation without the use of additional energy directed to heating the pollutant treating composition. Certain atmosphere contacting surfaces can be at the same or similar temperature as the atmosphere. It has been found that preferred catalysts which catalyze the reaction of ozone can catalyze the reaction of ozone at ambient conditions in ranges as low as 5° C. to 30° C.

Atmosphere contacting surfaces may have higher temperatures than the ambient atmospheric temperatures due to the nature of the operation of the component underlying the surface. For example, among the preferred atmosphere contacting surfaces are the heat transfer surfaces of air conditioning or steam condensers due to their high surface area and elevated temperatures during normal operation, due to the nature of their operation. The actual surface temperature will vary widely depending on the type of equipment in use. Typical home air conditioning condensers may operate at surface temperatures which range up to about 60° C. and typically are from about 40° C. to 50° C. Steam condensers may operate over a wide range of surface temperatures, depending on the temperature and pressure of the steam. The temperature range of these atmosphere contacting surfaces helps to enhance the conversion rates of the ozone, carbon monoxide and hydrocarbon catalysts supported on such surfaces. The catalysts useful in the present invention are particularly effective at the higher temperatures present on the surfaces of such equipment.

Various of the catalyst compositions can be combined, and a combined coating applied to the atmosphere contacting surface. Alternatively, different surfaces or different parts of the same surface can be coated with different catalyst compositions.

The method and apparatus of the present invention are preferably designed so that the pollutants can be treated at ambient conditions or at the ambient operating conditions of the atmosphere contacting surface. The present invention is particularly useful for treating ozone by coating atmosphere contacting surfaces with suitable catalysts useful to destroy such pollutants even at ambient conditions, and at surface temperatures typically from at least 0° C., preferably from 10° C. to 105° C., and more preferably from 40° C. to 100° C. Carbon monoxide is preferably treated at atmosphere contacting surface temperatures from 20° C. to 105° C. Low molecular weight hydrocarbons, typically unsaturated hydrocarbons having at least one unsaturated bond, such as $C_2$ to about $C_{20}$ olefins and typically $C_2$ to $C_8$ mono-olefins, are preferably treated at atmosphere contacting surface temperatures of from 40° C. to 105° C. The percent conversion of ozone, carbon monoxide and/or hydrocarbons depends on the temperature and space velocity of the atmospheric air relative to the atmosphere contacting surface, and the temperature of the atmosphere contacting surface.

Thus, in a preferred embodiment of the present invention, ambient levels of ozone, carbon monoxide and/or hydrocarbon are reduced without the addition of any mechanical features or energy source to existing stationary substrates. The pollutant treating surface may be one which is already present on the stationary substrate, or one which is added as a removable or permanently mounted unit. Preferably, the catalytic reaction takes place at the normal ambient operating conditions experienced by the surfaces of stationary substrate so that no changes in the construction or method of operation are required.

While the preferred embodiments of the present invention are directed to the destruction of pollutants at the ambient operating temperatures of the atmosphere contacting surface, it is also desirable to treat pollutants which have a catalyzed reaction temperature higher than the ambient temperature or ambient operating temperature of the available atmosphere contacting surface. Such pollutants include hydrocarbons and nitrogen oxides and any carbon monoxide which bypasses or is not treated at the atmosphere contacting surface.

These pollutants can be treated at higher temperatures typically in the range of at least 100 to 450° C. This can be accomplished, for example, by the use of an auxiliary heated catalyzed surface. By an auxiliary heated surface, it is meant that there are supplemental means to heat the surface. A preferred auxiliary heated surface is the surface of an electrically heated catalyzed monolith such as an electrically heated catalyzed metal honeycomb of the type known to those skilled in the art. Another preferred auxiliary heated surface is one heated by a process stream, such as steam or hot water, which may be readily available in industrial plants or commercial facilities. Furthermore, when the air is being forced through a heat exchanger, then a heated fluid passing in or out of the heat exchanger, or a side stream thereof, can be used as the source of heat for the auxiliary surface.

The catalyst composition can be any well known oxidation and/or reduction catalyst, preferably a three way catalyst (TWC) comprising precious group metals such as platinum, palladium, rhodium and the like supported on refractory oxide supports. An auxiliary heated catalyzed surface can be used in combination with, and preferably downstream of, an ambient temperature atmosphere contacting surface to further treat the pollutants.

As previously stated, adsorption compositions can also be used to adsorb pollutants such as hydrocarbons and/or particulate matter for later oxidation or subsequent removal. Useful and preferred adsorption compositions include zeolites, other molecular sieves, carbon, and Group IIA alkaline earth metal oxides such as calcium oxide. Hydrocarbons and particulate matter can be adsorbed from 0° C. to 110° C. and subsequently treated by desorption followed by catalytic reaction or incineration.

It is preferred to coat areas of the stationary substrate that have a relatively high surface area exposed to a large flow rate of atmospheric air. For this reason, the surfaces of air-cooled heat exchangers are particularly desirable, because they are designed for high surface area and high exposure to air flow. When a separate pollutant treating device is added onto existing equipment, then such a device can desirably be modeled as a heat exchanger, to provide maximum air contact area. Furthermore, if a heat exchanger is used as an add-on device, then a heating fluid can be channeled through the heat exchanger to elevate the temperature of the pollutant treating substrate. This may be particularly desirable when catalysts which require elevated temperatures are used.

The present invention also includes methods to coat pollutant treating compositions onto atmosphere contacting surfaces of stationary substrates.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
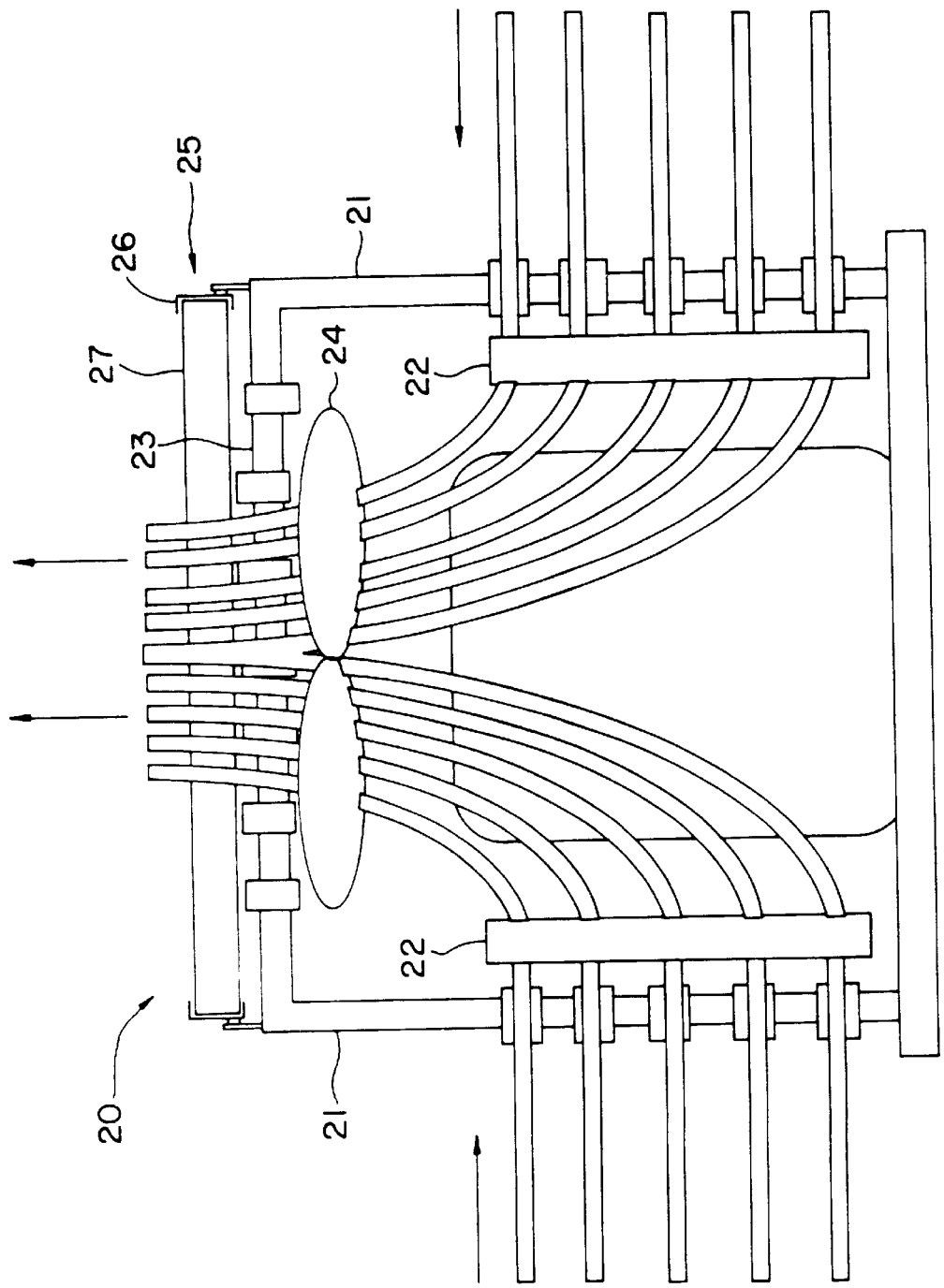
FIG. 1 is a schematic representation of one embodiment of an atmospheric pollutant treating device in accordance with the present invention, wherein the device is an air conditioning condenser.

The present invention is directed to apparatus and methods for treating the atmosphere in which a stationary substrate has a pollutant treating composition thereon. When air is drawn or forced into contact with the substrate the pollutants are caused to change into non-polluting compounds. The atmosphere contacting surface of the substrate which has the pollutant treating composition thereon is one which is in direct contact with the ambient air.

There are many atmosphere contacting surfaces which can be used as the pollutant treating substrates in accordance with the present invention. The substrate may be part of an existing air handling systems, such as those used in residential, commercial and industrial buildings, as well as power plants, oil refineries, chemical plants and any other facility in which air is drawn or forced over coatable surfaces. Such air handling systems include the outdoor components of heating, ventilation and air conditioning systems (referred to collectively as HVAC systems), industrial cooling systems, or any other system in which ambient air is naturally or purposefully forced into contact with a suitable substrate.

The outdoor components of HVAC systems, particularly condensers, include fans for blowing or forcing ambient air over external heat transfer surfaces, such as cooling coils or fins. In such systems, the ambient air passes over the heat transfer surface and returns to the atmosphere. Suitable substrates for applying pollutant treating materials include any exposed surfaces, such as fan blades, duct and plenum surfaces, louvers, grills, motor housings, filtration media, screens, and heat transfer surfaces.

As discussed above, heat transfer surfaces in HVAC, as well as other air handling systems, include various coils, fins, plates or other surfaces which are designed to transfer heat to or from ambient air. Of particular use as substrates for catalytic pollutant treating materials are those surfaces which are at elevated temperatures above standard ambient temperature of about 25° C. Desirably, the substrates are of even higher temperatures, because many catalysts are more effective at higher temperatures. In air conditioning systems, the coils or fins used to dissipate accumulated heat to the atmosphere are usually at temperatures above 25° C., and often much higher, depending on the coolant and operating parameters. Such heat dissipation apparatus can be as small as the external coils of a window air conditioner, or as large as the cooling towers used for commercial buildings. In addition, surfaces downstream from the heat transfer equipment, such as plenum or duct walls, fan blades or grills, may also be at elevated temperatures for improved catalytic activity.

Air handling systems are also used for many operations other than HVAC. Cooling towers are used to dissipate excess heat from various industrial sources. In power plants, cooling towers dissipate heat from relatively low temperature (but above 25° C.) water or steam from which no further useful power can be extracted. In such systems, huge amounts of air are blown over heat transfer surfaces, or directly over or through the water being cooled. Suitable substrates for coating in accordance with the present invention include fan blades, walls of cooling towers, heat transfer surfaces and any other surfaces exposed to the flow of air.

In chemical plants, oil refineries and the like, there are many surfaces suitable for use as pollutant treating substrates. Such plants include large air handling systems and cooling towers, as generally discussed above. For example, low temperature process steam is cooled to condense it to water prior to returning it to the boiler. Various operating units may include air cooling systems, such as external fins, to dissipate excess heat.

As discussed above, many air handling systems provide a means, such as a fan, to circulate air ambient air over a heated surface for the purpose of cooling that surface. Generally the fan only circulates air over the surface when the equipment is operating. In accordance with a preferred embodiment of the present invention, the fan in such an intermittently operated system can be set to operate continuously to allow the pollutant treating process to continue even when the equipment is not otherwise operating. In a variation on this process, a temperature sensor can be provided in the air handling system, which can switch the circulating fan on or off in response to the temperature at one or more points in the system. Thus, even when a condenser or heat exchanger is not operating, the latent heat can still be used to catalyze pollutants. The operation of such a system would depend on the desired temperature needed to treat a particular pollutant. Alternatively, the fan can be set to operate in response to some other external variable, such as the level of a particular pollutant, or at particular time intervals. In another alternative, a manual or remote control switch could be provided to actuate the fan of one or multiple air handling systems. For example, all of the air circulating fans in an area could be actuated simultaneously from a central controller in response to detection of a high level of a pollutant, or at particular times of the day.

In addition to the substrates which can be coated in active air handling systems, there are many surfaces which are naturally or passively exposed to a flow of ambient air. Some of these surfaces are particularly suitable for coating with pollutant treating compositions in accordance with the present invention. In this regard, surfaces which are also at elevated temperatures, either by contact with a source of heat or by exposure to the sun, are especially suitable. For example, the exterior surfaces of buildings or industrial equipment may be suitable substrates. As air blows over these surfaces, pollutant treating compositions can reduce the levels of pollutants in the air. Exposed surfaces of buildings may be at elevated temperature due to solar heating or heat loss from the building. Process equipment in refineries and chemical plants is often at elevated temperatures, making them particularly suitable for catalytic substrates.

When such passive treatment systems are used with a pollutant treatment material which is more effective at an elevated temperature, it is not necessary for the surface or air to be at such elevated temperature continuously. It is enough for the contacting surface to attain the desired temperature for any measurable period of time. Then, at least during that period of time, the pollutant treating process can operate at such desired temperature.

Roofs of buildings are of particular interest as pollutant treating substrates, because they are especially heated by the sun and internal heat from the building, and are naturally exposed to ambient air flow. Pollutant treating compositions can be incorporated into various roofing materials, such as shingles, tar or tar paper, or may be sprayed or painted onto existing surfaces. In like manner, road surfaces are also an excellent substrate to support pollutant treating compositions. As with roofs, road surfaces are heated by the sun and exposed to large flows of ambient air. In addition, exhaust from the vehicles on the roads results in localized concentrations of pollutants, rendering treated road surfaces particularly useful and efficient for reducing atmospheric pollution. The pollutant treating compositions can be incorporated into the paving materials, or applied as a topcoat to existing roadways.

Another reason why chemical plants, oil refineries and power plants are specifically identified for treatment by the methods of the present invention is that these facilities are already subject to stringent air pollution requirements, and reductions in ambient pollution levels can translate into increased profit. Furthermore, equipment and processes in such plants may produce various localized areas of high pollutant concentration, where the treatment compositions can be most effective. For example, industrial plants include many electric motors, some particularly large, which may produce relatively high localized ozone levels due to electric arcing. Ozone treating materials can be applied to the motor casings, or to other surfaces in the vicinity of the motors. Further, ventilation systems exhausting air from buildings or enclosures containing electrical equipment which produces ozone, such as motors or transformers, can be coated to reduce ozone levels. Furthermore, transformers may also emit other pollutants, such as hydrocarbons, which may also be treated.

Another possible source of ozone in industrial plants are electrostatic precipitators. These are commonly found in dust handling equipment, such as bag houses, in which electric fields are used to remove dust from an air stream. In generating the electric fields, arcing may occur, which can result in the formation of large amounts of ozone. Treatment surfaces can be in the path of the air flow, as discussed above for air-handling systems, or can be on the exterior of the equipment or the enclosures housing the equipment where there may be high localized ozone concentrations.

Parent U.S. patent application Ser. No. 08/412,525, already incorporated by reference, also discusses applying pollutant treating compositions to free standing objects such as billboards or signs. More generally, any free standing object with exposed surfaces could be used as a substrate in accordance with the present invention. In addition to billboards and signs, such objects may include flagpoles, utility poles, including wires and equipment carried thereon, transmission antennae (which may also have localized high levels of ozone), storage tanks, bridges or the like. The key point is that the object include a surface which is exposed to ambient air and can act as a substrate for carrying a pollutant treating composition. Preferably, the surface is also heated, either naturally or by some source of applied heat.

Another variation on coating free standing objects is to erect structures specifically designed for treating air. This can included adding baffles, wings or other structures to buildings at the locations of exceptional wind flow. For example, wings could extend from the corners of buildings, taking advantage of the geometry of the building and the prevailing ambient wind currents. Such baffles or wings can either be solid or porous, with porous structures offering the ability to increase active surface area.

An advantage of the present invention is that the atmosphere contacting surface useful to support a pollution treating composition can be any existing surface which lies in the path of a flow of ambient air. Accordingly, the apparatus and method of the present invention can be located on new components or retrofitted onto old ones.

Pollutant treating compositions include catalyst compositions useful for catalyzing the conversion of pollutants present in the atmosphere to non-objectionable materials. Alternatively, adsorption compositions can be used as the pollutant treating composition to adsorb pollutants which can be destroyed upon adsorption, or stored for further treatment at a later time.

Catalyst compositions can be used which can convert the pollutants to harmless compounds or to less harmful compounds. Useful and preferred catalyst compositions include compositions which catalyze the reaction of ozone to form oxygen. The compositions can be applied by coating at least one atmosphere contacting surface. Particularly preferred compositions catalyze the destruction of ozone at ambient conditions.

Various catalyst compositions can be combined, and a combined coating applied to the atmosphere contacting surface. Alternatively, different surfaces or different parts of the same surface can be coated with different catalyst compositions.

The method and apparatus of the present invention are preferably designed so that the pollutants can be treated at ambient conditions, requiring no heating means or incidental heat. The present invention is particularly useful for treating ozone by coating a surface with suitable catalysts useful to destroy such pollutants at ambient conditions. The percent conversion of ozone depends on the temperature and space velocity of the atmospheric air relative to the catalyst surface, and the temperature of the atmosphere contacting surface.

Accordingly, the present invention, in one embodiment results in at least reducing the ozone levels present in the atmosphere without the addition of any mechanical features or energy source to existing substrates. Additionally, the catalytic reaction of ozone to oxygen takes place at the normal ambient conditions experienced by the surfaces of these substrates so that minimal changes in the construction or method of operation are required.

While some embodiments of the present invention are directed to the destruction of pollutants at ambient operating temperatures, it will be noted that the ambient air may be heated by a heating means such as a heater or by incidental contact with a heated component of the stationary substrate. This may allow other pollutants to be catalyzed which require a higher reaction temperature than the ambient temperature or ambient operating temperature of the atmosphere contacting surface. Such pollutants include carbon monoxide, hydrocarbons and nitrogen oxides. These pollutants can be treated at higher temperatures typically in the range of about 40° C. to 450° C.

It is preferred to coat areas of the substrate that have a relatively high surface area exposed to a large flow rate of atmospheric air. Air is drawn or forced over the catalytic surface. The present invention includes methods to coat pollutant treating compositions onto ambient air contacting surfaces as described herein. In particular, the present invention includes a method to coat catalyst compositions onto various metallic surfaces.

The present invention can be applied to any stationary substrate with at least one atmosphere contacting surface comprising a pollutant treating composition (e.g. a catalyst or an adsorber) located thereon. As the atmospheric air encounters the pollutant treating composition, various pollutants including particulate matter and/or gaseous pollutants carried in the air can be catalytically reacted or adsorbed as the case may be by the pollutant treating composition located on the atmosphere contacting surface.

FIG. 1 is a schematic representation of one embodiment of an atmospheric pollutant treating device in accordance with the present invention, wherein the device is an air conditioning condenser. Such condensers are generally located outdoors, and are used to air cool an air conditioning fluid which is transported through coils in the unit. In FIG. 1, ambient air which may contain ozone enters condenser 20 through one or more inlet grills 21, passes through one or more heat exchangers 22, and exits the condenser through one or more outlet grills 23. The air is forced through the condenser by fan 24, which is shown in this embodiment mounted to the top of the condenser housing. It will be readily recognized by one skilled in the art that the components of such a condenser can be arranged in any suitable operating configuration, provided that the ambient air passes in operative contact with a heat exchanger and returns to the atmosphere. Thus, the inlet can be on the sides, as shown, or on the bottom or top of the unit, and the outlet can be at the top as shown, or on the sides or bottom of the unit. The heat exchangers can be next to the inlets, as shown or next to the outlet. The fan can be between the heat exchangers and the outlet, as shown, or at any other location in the air stream. The condenser unit can be of any suitable shape, such as cubic, rectangular or cylindrical.

In accordance with one embodiment of the invention, a pollutant treating material is applied to a surface in the flow path of the air passing through the condenser. Suitable surfaces for this material are inlet grill 21, heat exchanger 22, outlet grill 23 or the blades of fan 24. When the pollutant treating material includes an ozone catalyst, as discussed elsewhere in the present specification, it is generally more effective to operate at the highest available temperature. Because heat exchanger 22 is at an elevated temperature during normal operation of the condenser, the pollutant treating surface is therefore preferably located on the heat exchanger or down stream of the heat exchanger. In the embodiment shown in FIG. 1, fan 24 and outlet grill 23 are both downstream from heat exchanger 22, and therefore would be preferred sites for the pollutant treating surface.

In another embodiment of this invention, a separate treatment device 25 is provided, which contains the pollutant treating surface. Device 25 may be at any suitable location in the airstream passing through the condenser. In the embodiment as shown, device 25 is mounted on the exterior of condenser 20, to receive the air flowing out of outlet grill 23. It will be readily seen that device 25 could be located anywhere in the airstream passing through the condenser, such as at the inlet, after the heat exchanger, or next to the fan. As discussed above, when a heat sensitive catalyst is being used, then device 25 is preferably located downstream of heat exchanger 22 to take advantage of the elevated temperature of the air passing therethrough.

Treatment device 25 may be permanently or removably mounted to condenser 20. Preferably, device 25 is removably mounted to permit replacement or rejuvenation of the pollutant treating material. In a preferred embodiment, treatment device 25 includes a housing 26 which is attached to condenser 20 for receiving and holding a removable treatment cartridge 27. Treatment cartridge 27 may be of any suitable configuration, such as a honeycomb, filter pad, frame or screen coated with the catalyst or adsorbent material. The cartridge can be designed to be discarded after a single use, or to be cleaned or otherwise rejuvenated and reused.

A dust filter (not shown) may be provided to protect the active pollutant treating surface of treatment cartridge 27. Such a dust filter can be located anywhere in unit 20 or device 25 upstream of cartridge 27, or can even be integral with cartridge 27, upstream of the active surface.

In a test of a condenser such as that depicted in FIG. 1, an automobile radiator which had been coated with ozone treating catalyst was used as treatment device 25. Such automobile radiators are described in Example 1 et seq. below, and are conveniently used as test devices on the stationary apparatus of the present invention.

Figure 2:
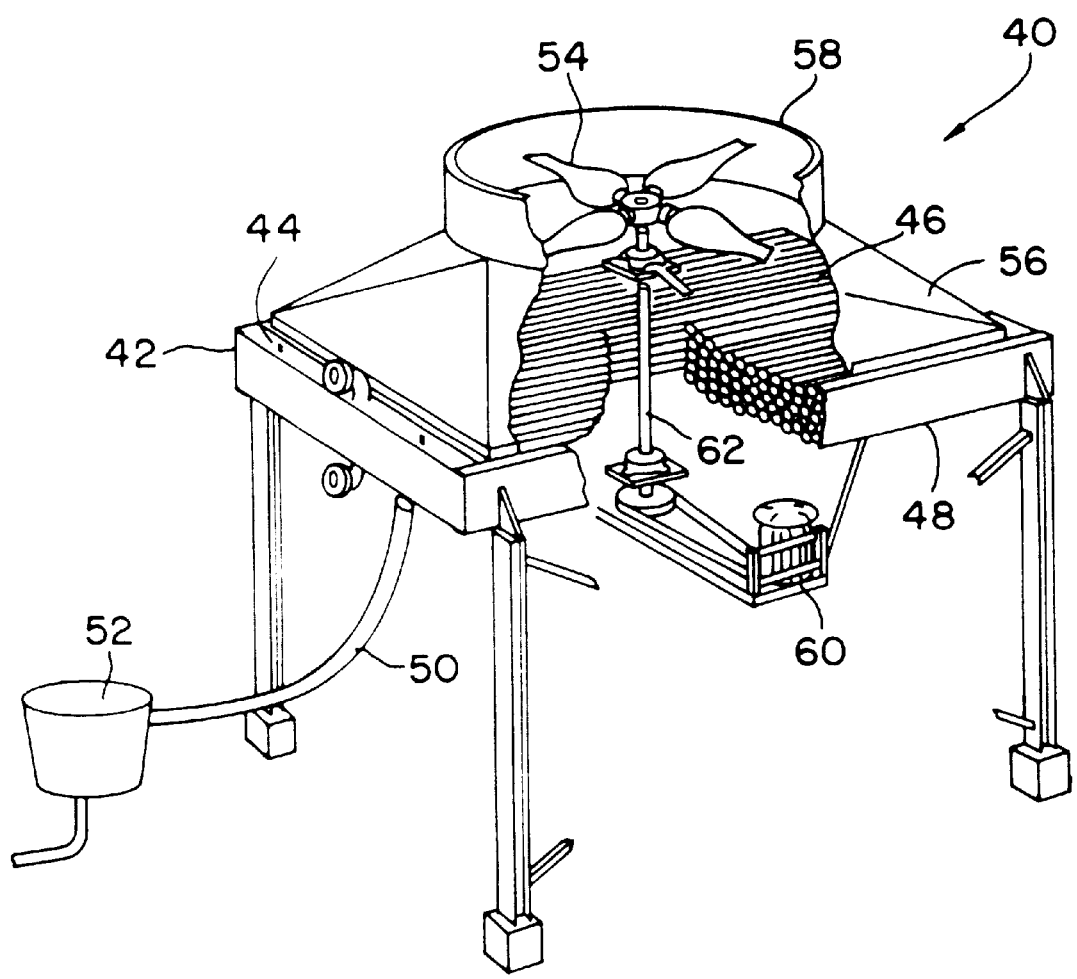
FIG. 2 is a schematic representation of another embodiment of the present invention, in which a pollutant treating substrate is added to a commercial or industrial air cooled heat exchanger.

FIG. 2 is a schematic representation of another embodiment of the present invention, in which a pollutant treating substrate is added to a commercial or industrial air cooled heat exchanger 40. Such heat exchangers are commonly used to condense low pressure steam into water, and may be found in industrial plants, power plants, commercial heating systems, and other steam handling facilities. As depicted in FIG. 2, steam is fed to header portion 42 (shown cut-away) of air-cooled heat exchanger 40, which is provided with top vents 44 for removing non-condensibles. The steam circulates back and forth through finned tube bundle 46 mounted in channel frame 48 where it is cooled and condensed by the air flow. The condensate is removed by bottom drains (not shown) and carried by drain line 50 to condensate tank 52. Air flow is provided by axial flow fan 54 which is shown mounted above the tube bundle 46, in a plenum 56 which channels the air flow to fan ring 58. Fan 54 is driven by electric motor 60, shown mounted below tube bundle 46, which is connected directly or indirectly to drive shaft 62. In operation, air is drawn by fan 54 through tube bundle 46 and out through fan ring 58.

It will be readily recognized by one skilled in the art that the components of such a heat exchanger can be arranged in any suitable operating configuration, provided that the ambient air passes in operative contact with the tube bundle and returns to the atmosphere. Thus, tube bundle 46 may be mounted horizontally (as shown), vertically or diagonally. Further, the tube bundle can be of any suitable design which allows condensing of steam passing therethrough. Fan 54 may be located on the output side of tube bundle 46 (as shown), at the inlet or even between separate heat exchange elements. Ducting to direct the air flow, may be included on the inlet and/or outlet sides of the heat exchanger, as well as protective screens or grills.

In accordance with one embodiment of the invention, the pollutant treating material may be applied to an existing surface in the flow path of the air passing through the heat exchanger. Suitable surfaces for this material include tube bundle 46, the blades of fan 54, and the inner surfaces of plenum 56 and fan ring 58. Alternatively, the material could be applied to any other ducting, screens or grills which are in the air flow path. As discussed elsewhere in the present specification, when the pollutant treating material includes an ozone catalyst or any other catalyst which is more effective at an elevated temperature, it is preferred to apply the material to a surface with the highest available temperature. Because tube bundle 46 is at an elevated temperature during normal operation of the condenser, the pollutant treating surface is preferably located on the tube bundle or downstream thereof. In the embodiment shown in FIG. 2, fan 54, plenum 56 and fan ring 58 are all downstream of tube bundle 46, and would therefore be preferred sites for the pollutant treating surface.

In another embodiment of this invention, a separate treatment device (not shown) may be provided, which contains the pollutant treating surface. Such a device may be at any suitable location in the airstream passing through the heat exchanger. In the embodiment as shown, the treatment device could desirably be mounted at the outlet of fan ring 58, or within plenum 56 between tube bundle 46 and fan 54. The treatment device could also be located on the inlet side of tube bundle 46. However, as discussed above, when a heat sensitive catalyst is being used, then the treatment device is preferably located downstream of tube bundle 46 to take advantage of the elevated temperature of the air passing therethrough.

As with the embodiment depicted in FIG. 1, the treatment device for the present air-cooled heat exchanger 40 may be permanently or removably mounted to the unit. Preferably, the device is removably mounted to permit replacement or rejuvenation of the pollutant treating material. In a preferred embodiment, the treatment device includes a housing which is attached to heat exchanger 40 for receiving and holding a removable treatment substrate. The treatment substrate may be of any suitable configuration, and can be designed to be discarded after a single use, or to be cleaned or otherwise rejuvenated and reused.

For industrial applications, a high surface area structure, such as a ceramic or metal honeycomb, can provide an excellent substrate to support the pollutant treating material. The high surface area structure can also be any type of filter, screen or grill capable of supporting the treatment material.

Alternatively, the substrate can be a separate heat exchanger, in which a separate source of heat may be provided to increase the working temperature of the pollutant treating material, particularly when a catalyst is being used. The separate source of heat can be a side stream of the steam which is entering or the condensate which is exiting the principal heat exchanger 40, or an independent heated stream. Alternatively, electric or combustion heating could be used.

As with the condenser embodiment of FIG. 1, automobile radiators which had been coated with ozone treating catalyst in accordance with Example 1 et seq. below, have been conveniently used as test treatment devices on the stationary heat exchangers of the present embodiment.

Figure 3:
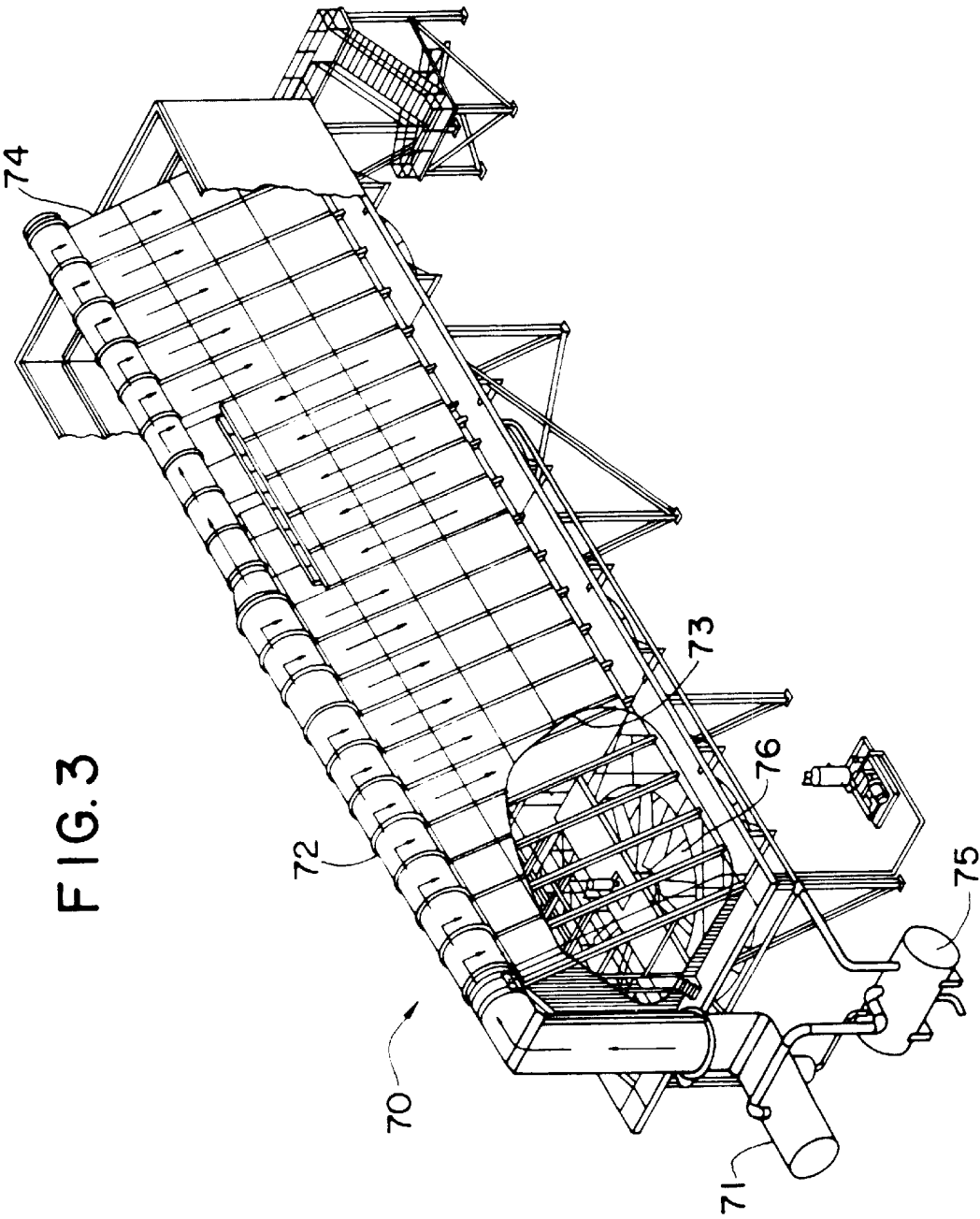
FIG. 3 is a schematic representation of a particular type of air cooled heat exchanger.

FIG. 3 is a schematic representation of a particular type of air cooled heat exchanger 70, which is in use in some power plants to condense large volumes of low pressure steam. Steam enters the unit at inlet 71, and is distributed through a top-mounted plenum 72. The steam passes through diagonally disposed heat exchange tubes 73 mounted in housing 74, and the condensate is collected in condensate tank 75. Air flow is provided by bottom mounted forced draft fans 76, which direct the air upwardly through the tube bundles and then to the atmosphere.

In this embodiment, the diagonally disposed heat exchange tubes may be directly coated with the pollutant treating material. Alternatively, separate pollutant treating devices may be permanently or removably affixed to the inside or outside of the diagonal surface of housing 74. In a preferred embodiment, the treating devices are pivotably mounted to the housing so that they can be swung out of the way to permit cleaning and servicing of the underlying tubes 73.

As discussed above, test units of catalyzed automobile radiators can be attached to, or simply laid on, the exterior of such a heat exchanger to test the catalysts of the present invention.

The pollutant treating composition is preferably a catalytic composition or adsorption composition. Useful and preferred catalyst compositions are compositions which can catalytically cause the reaction of targeted pollutants at the space velocity of the air as it contacts the surface, and at the temperature of the surface at the point of contact. Typically, these catalyzed reactions will be in the temperature range at the atmosphere contacting surface of from 0° C. to 130° C., more typically 20° C. to 105° C. and yet more typically from about 40° C. to 100° C. There is no limit on the efficiency of the reaction as long as some reaction takes place. Preferably, there is at least a 1% conversion efficiency with as high a conversion efficiency as possible. Useful conversion efficiencies are preferably at least about 5% and more preferably at least about 10%. Preferred conversions depend on the particular pollutant and pollutant treating composition. Where ozone is treated with a catalytic composition on an atmosphere contacting surface it is preferred that the conversion efficiency be greater than about from 30% to 40%, preferably greater than 50%, and more preferably greater than 70%. Preferred conversion for carbon monoxide is greater than 30% and preferably greater than 50%. Preferred conversion efficiency for hydrocarbons and partially oxygenated hydrocarbons is at least 10%, preferably at least 15%, and most preferably at least 25%. These conversion rates are particularly preferred where the atmosphere contacting surface is at ambient operating conditions of up to about 110° C. These temperatures are the surface temperatures typically experienced during normal operation of atmosphere contacting surfaces of the vehicle including the surfaces of the radiator and air conditioning condenser. Where there is supplemental heating of the atmosphere contacting surface such as by having an electrically heated catalytic monolith, grid, screen, gauze or the like, it is preferred that the conversion efficiency be greater than 90% and more preferably greater than 95%. The conversion efficiency is based on the mole percent of the particular pollutants in the air which react in the presence of the catalyst composition.

Ozone treating catalyst compositions comprise manganese compounds including manganese dioxide, including non stoichiometric manganese dioxide (e.g., $MnO_{(1.5-2.0)}$), and/or $Mn_2O_3$. Preferred manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

Useful and preferred manganese dioxides are alpha manganese dioxides nominally having a molar ratio of manganese to oxygen of from 1 to 2. Useful alpha manganese dioxides are disclosed in U.S. Pat. No. 5,340,562 to O'Young, et al.; also in O'Young, Hydrothermal Synthesis of Manganese Oxides with Tunnel Structures presented at the Symposium on Advances in Zeolites and Pillared Clay Structures presented before the Division of Petroleum Chemistry, Inc. American Chemical Society New York City Meeting, August 25–30, 1991 beginning at page 342, and in McKenzie, the Synthesis of Birnessite, Cryptomelane, and Some Other Oxides and Hydroxides of Manganese, Mineralogical Magazine, December 1971, Vol. 38, pp. 493–502. For the purposes of the present invention, the preferred alpha manganese dioxide is a 2×2 tunnel structure which can be hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$).

The manganese dioxides useful in the present invention preferably have a surface area of greater than 150 $m^2/g$, more preferably greater than 200 $m^2/g$, yet more preferably greater than 250 $m^2/g$ and most preferably greater than 275 $m^2/g$. The upper range of such materials can be as high as 300 $m^2/g$, 325 $m^2/g$ or even 350 $m^2/g$. Preferred materials are in the range of 200–350 $m^2/g$, preferably 250–325 $m^2/g$ and most preferably 275–300 $m^2/g$. The composition preferably comprises a binder as of the type described below with preferred binders being polymeric binders. The composition can further comprise precious metal components with preferred precious metal components being the oxides of precious metal, preferably the oxides of platinum group metals and most preferably the oxides of palladium or platinum also referred to as palladium black or platinum black. The amount of palladium or platinum black can range from 0 to 25%, with useful amounts being in ranges of from about 1 to 25 and 5 to 15% by weight based on the weight of the manganese component and the precious component.

It has been found that the use of compositions comprising the cryptomelane form of alpha manganese oxide, which also contain a polymeric binder can result in greater than 50%, preferably greater than 60% and most preferably from 75–85% conversion of ozone in a concentration range of from 0 to 400 parts per billion (ppb) and an air stream moving across a radiator at space velocity of from 300,000 to 650,000 reciprocal hours. Where a portion of the cryptomelane is replaced by up to 25% and preferably from 15–25% parts by weight of palladium black (PdO), ozone conversion rates at the above conditions range from 95–100% using a powder reactor.

The preferred cryptomelane manganese dioxide has a crystallite size ranging from 2 to 10 and preferably from less than 5 nm. It can be calcined at a temperature range of from 250° C. to 550° C. and preferably below 500° C. and greater than 300° C. for at least 1.5 hours and preferably at least 2 hours up to about 6 hours.

The preferred cryptomelane can be made in accordance described in the above referenced articles and patents to O'Young and McKenzie. The cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha manganese useful in the present invention can contain one or more of hollandite, cryptomelane, manjiroite or coronadite compounds. Even when making cryptomelane minor amounts of other metal ions such as sodium may be present. Useful methods to form the alpha manganese dioxide are described in the above references which are incorporated by reference.

The preferred alpha manganese for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate. It has been found that the use of such a material which has been calcined is "clean". The use of material containing inorganic anions can result in conversion of ozone to oxygen of up to about 60%. The use of cryptomelane with a "clean" surface results in conversions of up about 80%.

Figure 16:
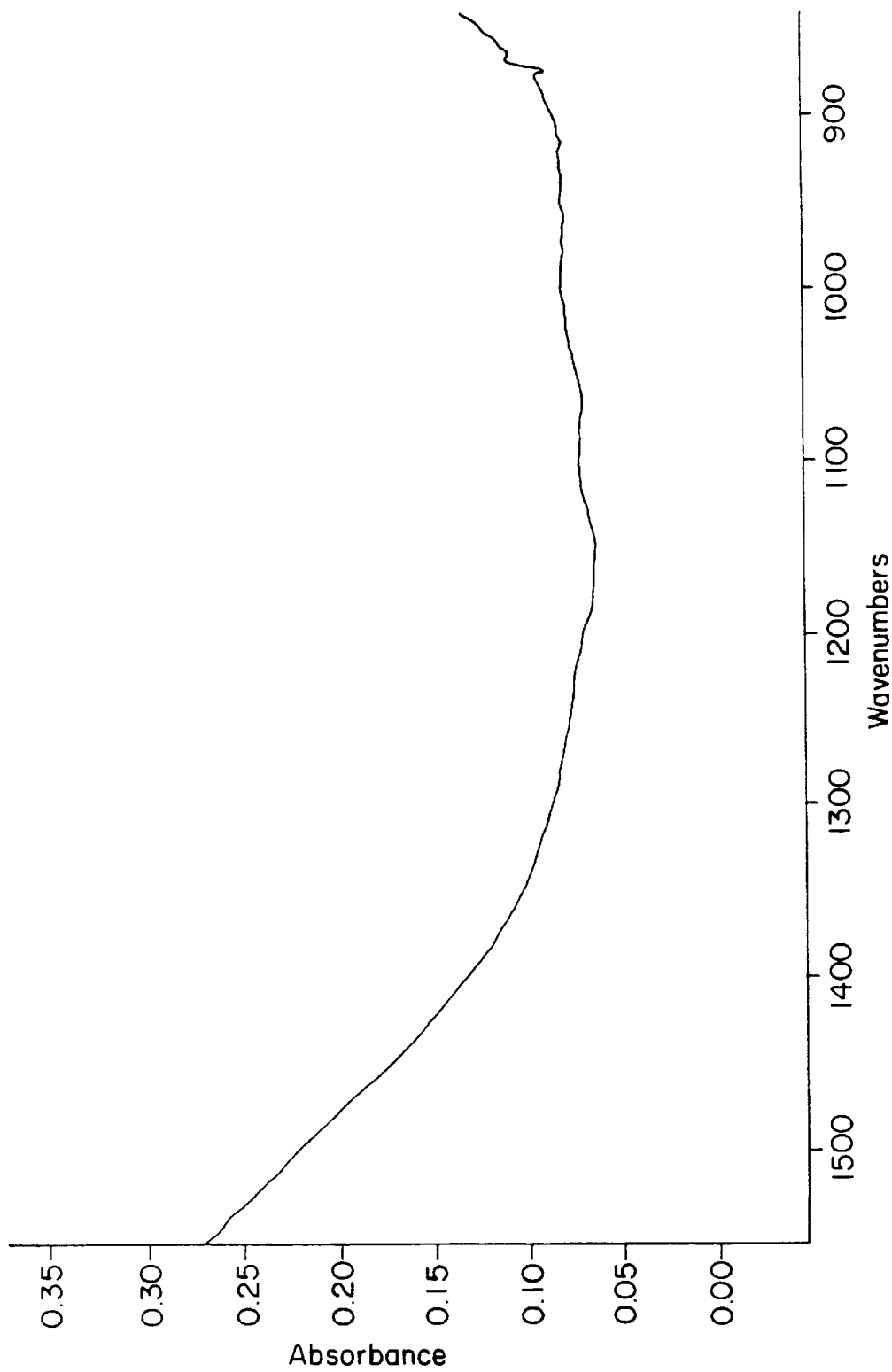
FIG. 16 is an IR spectrum for cryptomelane.
Figure 17:
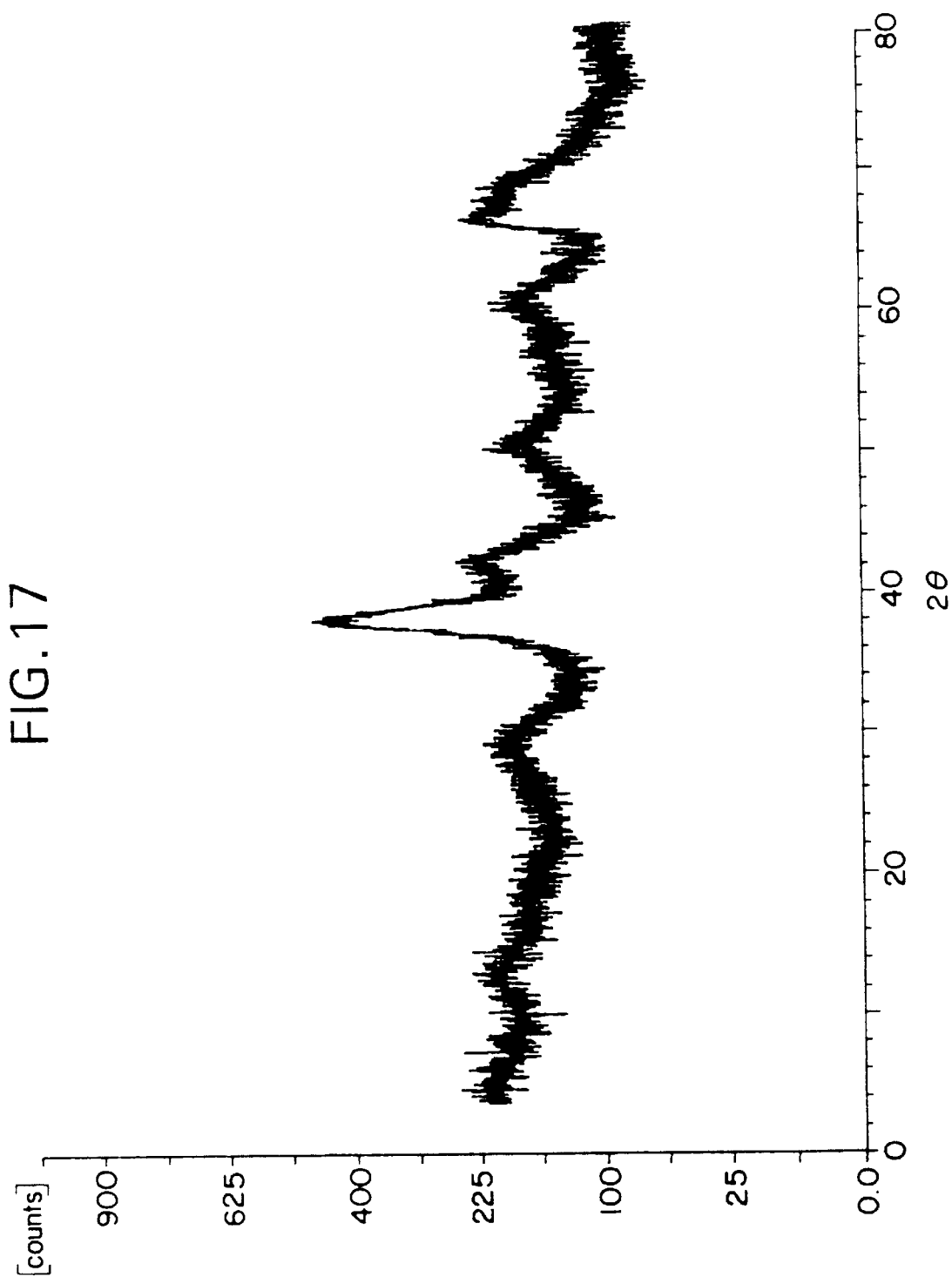
FIG. 17 is an XRD pattern for cryptomelane shown as counts using an square root scale versus the Bragg angle, $2\theta$.

It is believed that the carboxylates are burned off during the calcination process. However, inorganic anions remain on the surface even during calcination. The inorganic anions such as sulfates can be washed away with an aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The "clean" alpha manganese dioxide is characterized as having an IR spectra as illustrated in FIG. 16 and in X-ray diffraction (XRD) pattern as illustrated in FIG. 17. Such a cryptomelane preferably has a surface area greater than 200 $m^2/g$ and more preferably greater than 250 $m^2/g$.

A preferred method of making cryptomelane useful in the present invention comprises mixing an aqueous acidic manganese salt solution with a potassium permanganate solution. The acidic manganese salt solution has a pH of from 0.5 to 3 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 200 $m^2/g$ to 350 $m^2/g$.

A review of the IR spectrum for the most preferred cryptomelane, shown in FIG. 16 is characterized by the absence of peaks assignable to carbonate, sulfate and nitrate groups. Expected peaks for carbonate groups appear in the range of from 1320 to 1520 wavenumbers; and for sulfate groups appear in the range of from 950 to 1250 wavenumbers. FIG. 17 is a powder X-ray diffraction pattern for high surface area cryptomelane prepared in Example 25. The X-ray pattern for cryptomelane useful in the present invention is characterized by broad peaks resulting from small crystallite size (~5–10nm). Approximate peak positions (±0.15°2θ) and approximate relative intensities (±5) for cryptomelane using $CuK_\alpha$ radiation as shown in FIG. 17 are: 2θ/Relative Intensities—12.1/9; 18/9; 28.3/10; 37.5/100; 41.8/32; 49.7/16; 53.8/5; 60.1/13; 55.7/38; and 68.0/23.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 200 $m^2/g$ to 350 $m^2/g$.

Other useful compositions comprise manganese dioxide and optionally copper oxide and alumina and at least one precious metal component such as a platinum group metal supported on the manganese dioxide and where present copper oxide and alumina. Useful compositions contain up to 100, from 40 to 80 and preferably 50 to 70 weight percent manganese dioxide and 10 to 60 and typically 30 to 50 percent copper oxide. Useful compositions include hopcalite which is about 60 percent manganese dioxide and about 40 percent copper oxide; and Carulite® 200 (sold by Carus Chemical Co.) which is reported to have 60 to 75 weight percent manganese dioxide, 11 to 14 percent copper oxide and 15 to 16 percent aluminum oxide. The surface area of Carulite® is reported to be about 180 $m^2/g$. Calcining at 450° C. reduces the surface area of the Carulite® by about fifty percent (50%) without significantly affecting activity. It is preferred to calcine manganese compounds at from 300° C. to 500° C. and more preferably 350° C. to 450° C. Calcining at 550° C. causes a great loss of surface area and ozone treatment activity. Calcining the Carulite® after ball milling with acetic acid and coating on a substrate can improve adhesion of the coating to a substrate.

Other compositions to treat ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from 0.1 to 5 weight percent, with useful and preferred amounts on pollutant treating catalyst volume, based on the volume of the supporting article, ranging from about 0.5 to about 70 $g/ft^3$. The amount of palladium component preferably ranges from about 2 to about 10 weight percent of the composition, with useful and preferred amounts on pollutant treating catalyst volume ranging from about 10 to about 250 $g/ft^3$.

Various useful and preferred pollutant treating catalyst compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica-zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 μm or in sol form also having a particle size ranging from about 1 to about 50 and preferably about 1 to about 10 nm. A preferred titania sol support comprises titania having a particle size ranging from about 1 to about 10, and typically from about 2 to 5 nm.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450°–500° C.

A useful support for a catalyst to treat ozone is selected from a refractory oxide support, preferably alumina and silica-alumina with a more preferred support being a silica-alumina support comprising from about 1% to 10% by weight of silica and from 90% to 99% by weight of alumina.

Useful refractory oxide supports for a catalyst comprising a platinum group metal to treat carbon monoxide are selected from alumina, titania, silica-zirconia, and manganese-zirconia. Preferred supports for a catalyst composition to treat carbon monoxide is a zirconia-silica support as recited in U.S. Pat. No. 5,145,825, a manganese-zirconia support as recited in U.S. Pat. No. 5,283,041 and high surface area alumina. Most preferred for treatment of carbon monoxide is titania. Reduced catalysts having titania supports resulted in greater carbon monoxide conversion than corresponding non reduced catalysts.

The support for catalyst to treat hydrocarbons, such as low molecular weight hydrocarbons, particularly low molecular weight olefinic hydrocarbons having about from two up to about twenty carbons and typically two to about eight carbon atoms, as well as partially oxygenated hydrocarbons is preferably selected from refractory metal oxides including alumina and titania. As with catalysts to treat carbon monoxide reduced catalysts results in greater hydrocarbon conversion. Particularly preferred is a titania support which has been found useful since it results in a catalyst composition having enhanced ozone conversion as well as significant conversion of carbon monoxide and low molecular weight olefins. Also useful are high surface area, macroporous refractory oxides, preferably alumina and titania having a surface area of greater than 150 $m^2/g$ and preferably ranging from about 150 to 350, preferably from 200 to 300, and more preferably from 225 to 275 $m^2/g$; a porosity of greater than 0.5 cc/g, typically ranging from 0.5 to 4.0 and preferably about from 1 to 2 cc/g measured based on mercury porosometry; and particle sizes range from 0.1 to 10 μm. A useful material is Versal GL alumina having a surface area of about 260 $m^2/g$, a porosity of 1.4 to 1.5 cc/g and supplied by LaRoche Industries.

A preferred refractory support for platinum for use in treating carbon monoxide and/or hydrocarbons is titania dioxide. The titania can be used in bulk powder form or in the form of titania dioxide sol. The catalyst composition can be prepared by adding a platinum group metal in a liquid media preferably in the form of a solution such as platinum nitrate with the titania sol, with the sol most preferred. The obtained slurry can then be coated onto a suitable substrate such as an atmosphere treating surface such as a radiator, metal monolith substrate or ceramic substrate. The preferred platinum group metal is a platinum compound. The platinum titania sol catalyst obtained from the above procedure has high activity for carbon monoxide and/or hydrocarbon oxidation at ambient operating temperature. Metal components other than platinum components which can be combined with the titania sol include gold, palladium, rhodium and silver components. A reduced platinum group component, preferably a platinum component on titanium catalyst which is indicated to be preferred for treating carbon monoxide, has also been found to be useful and preferred for treating hydrocarbons, particularly olefinic hydrocarbons.

A preferred titania sol support comprises titania having a particle size ranging from about 1 to about 10, and typically from about 2 to 5 nm.

A preferred bulk titania has a surface area of about from 25 to 120 $m^2/g$, and preferably from 50 to 100 $m^2/g$; and a particle size of about from 0.1 to 10 $\mu m$. A specific and preferred bulk titania support has a surface area of 45–50 $m^2/g$, a particle size of about 1 $\mu m$, and is sold by DeGussa as P-25.

A preferred silica-zirconia support comprises from 1 to 10 percent silica and 90 to 99 percent zirconia. Preferred support particles have high surface area, e.g. from 100 to 500 square meters per gram ($m^2/g$) surface area, preferably from 150 to 450 $m^2/g$, more preferably from 200 to 400 $m^2/g$, to enhance dispersion of the catalytic metal component or components thereon. The preferred refractory metal oxide support also has a high porosity with pores of up to about 145 nm radius, e.g., from about 0.75 to 1.5 cubic centimeters per gram ($cm^3/g$), preferably from about 0.9 to 1.2 $cm^3/g$, and a pore size range of at least about 50% of the porosity being provided by pores of 5 to 100 nm in radius.

A useful ozone treating catalyst comprises at least one precious metal component, preferably a palladium component dispersed on a suitable support such as a refractory oxide support. The composition comprises from 0.1 to 20.0 weight percent, and preferably 0.5 to 15 weight percent of precious metal on the support, such as a refractory oxide support, based on the weight of the precious metal (metal and not oxide) and the support. Palladium is preferably used in amounts of from 2 to 15, more preferably 5 to 15 and yet more preferably 8 to 12 weight percent. Platinum is preferably used at 0.1 to 10, more preferably 0.1 to 5.0, and yet more preferably 2 to 5 weight percent. Palladium is most preferred to catalyze the reaction of ozone to form oxygen. The support materials can be selected from the group recited above. In preferred embodiments, there can additionally be a bulk manganese component as recited above, or a manganese component dispersed on the same or different refractory oxide support as the precious metal, preferably palladium component. There can be up to 80, preferably up to 50, more preferably from 1 to 40 and yet more preferably 5 to 35 weight percent of a manganese component based on the weight of palladium and manganese metal in the pollutant treating composition. Stated another way, there is preferably about 2 to 30 and preferably 2 to 10 weight percent of a manganese component. The catalyst loading is from 20 to 250 grams and preferably about 50 to 250 grams of palladium per cubic foot ($g/ft^3$) of catalyst volume. The catalyst volume is the total volume of the finished catalyst composition and therefore includes the total volume of air conditioner condenser or radiator including void spaces provided by the gas flow passages. Generally, the higher loading of palladium results in a greater ozone conversion, i.e., a greater percentage of ozone decomposition in the treated air stream.

Conversions of ozone to oxygen attained with a palladium/manganese catalyst on alumina support compositions at a temperature of about 40° C. to 50° C. have been about 50 mole percent where the ozone concentrations range from 0.1 to 0.4 ppm and the face velocity was about 10 miles per hour. Lower conversions were attained using a platinum on alumina catalyst.

Of particular interest is the use of a support comprising the above described coprecipitated product of a manganese oxide, and zirconia which is used to support a precious metal, preferably selected from platinum and palladium, and most preferably platinum. Platinum is of particular interest in that it has been found that platinum is particularly effective when used on this coprecipitated support. The amount of platinum can range from 0.1 to 6, preferably 0.5 to 4, more preferably 1 to 4, and most preferably 2 to 4 weight percent based on metallic platinum and the coprecipitated support. The use of platinum to treat ozone has been found to be particularly effective on this support. Additionally, as discussed below, this catalyst is useful to treat carbon monoxide. Preferably the precious metal is platinum and the catalyst is reduced.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Ser. No. 08/202,397 filed Feb. 25, 1994, now U.S. Pat. No. 5,422,331 and entitled, "Light Weight, Low Pressure Drop Ozone Decomposition Catalyst for Aircraft Applications" hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

Carbon monoxide treating catalysts preferably comprise at least one precious metal component, preferably selected from platinum and palladium components with platinum components being most preferred. The composition comprises from 0.01 to 20 weight percent, and preferably 0.5 to 15 weight percent of the precious metal component on a suitable support such as refractory oxide support, with the amount of precious metal being based on the weight of precious metal (metal and not the metal component) and the support. Platinum is most preferred and is preferably used in amounts of from 0.01 to 10 weight percent and more preferably 0.1 to 5 weight percent, and most preferably 1.0 to 5.0 weight percent. Palladium is useful in amounts from 2 to 15, preferably 5 to 15 and yet more preferably 8 to 12 weight percent. The preferred support is titania, with titania sol most preferred as recited above. When loaded onto a monolithic structure such as a radiator or onto other atmosphere contacting surfaces the catalyst loading is preferably about 1 to 150, and more preferably 10 to 100 grams of platinum per cubic foot ($g/ft^3$) of catalyst volume and/or 20 to 250 and preferably 50 to 250 grams of palladium per $g/ft^3$ of catalyst volume. Preferred catalysts are reduced. Conversions of 5 to 80 mole percent of carbon monoxide to carbon dioxide were attained using coated core samples from automotive radiator having from 1 to 6 weight percent (based on metal) of platinum on titania compositions at temperatures from 250 to 90° C. where the carbon monoxide concentration was 15 to 25 parts per million and the space velocity was 300,000 to 500,000 reciprocal hours. Also, conversions of 5 to 65 mole percent of carbon monoxide to carbon dioxide were attained using 1.5 to 4.0 weight percent platinum on alumina support compositions at a temperature of about up to 95° C. where the carbon monoxide concentration was about 15 parts per million and the space velocity was about 300,000 reciprocal hours. Lower conversions have been attained with palladium on a ceria support.

An alternate and preferred catalyst composition to treat carbon monoxide comprises a precious metal component supported on the above described coprecipitate of a manganese oxide and zirconia. The coprecipitate is formed as described above. The preferred ratios of manganese to zirconia are 5:95 to 95:5; 10:90 to 75:25; 10:90 to 50:50; and 15:85 to 25:75 with a preferred coprecipitate having a manganese oxides to zirconia of 20:80. The percent of platinum supported on the coprecipitate based on platinum metal ranges from 0.1 to 6, preferably 0.5 to 4, more preferably 1 to 4, and most preferably 2–4 weight percent. Preferably the catalyst is reduced. The catalyst can be reduced in powder form or after it has been coated onto a supporting substrate. Other useful compositions which can convert carbon monoxide to carbon dioxide include a platinum component supported on carbon or a support comprising manganese dioxide.

Catalysts to treat hydrocarbons, typically unsaturated hydrocarbons, more typically unsaturated mono-olefins having from two to about twenty carbon atoms and, in particular, from two to eight carbon atoms, and partially oxygenated hydrocarbons of the type referred to above, comprise at least one precious metal component, preferably selected from platinum and palladium with platinum being most preferred. Useful catalyst compositions include those described for use to treat carbon monoxide. Composition to treat hydrocarbons comprise from 0.01 to 20 wt. % and preferably 0.5 to 15 wt. % of the precious metal component on a suitable support such as a refractory oxide support, with the amount of precious metal being based on the weight of the precious metal, (not the metal component) and the support. Platinum is the most preferred and is preferably used in amounts of from 0.01 to 10 wt. % and more preferably 0.1 to 5 wt. % and most preferably 1.0 to 5 wt. %. When loaded onto a monolithic structure such as a motor vehicle radiator or on to other atmospheric contacting surfaces, the catalyst loading is preferably about 1 to 150, and more preferably 10 to 100 grams of platinum per cubic foot ($g/ft^3$) of catalyst volume. The preferred refractory oxide support is a metal oxide refractory which is preferably selected from ceria, silica, zirconia, alumina, titania and mixtures thereof with alumina and titania being most preferred. The preferred titania is characterized by as recited above with titania sol most preferred. The preferred catalyst is reduced. Testing on a coated automotive radiator resulted in conversions of a low molecular weight mono-olefin such as propylene to water and carbon dioxide with 1.5 to 4 wt. % of platinum on an alumina or titania support have been between 15 and 25% where the propylene concentration was about 10 parts per million propylene and the space velocity was about 320,000 reciprocal hours. These catalysts were not reduced. Reduction of the catalyst improves conversion.

Catalysts useful for the oxidation of both carbon monoxide and hydrocarbons generally include those recited above as useful to treat either carbon monoxide or hydrocarbons. Most preferred catalysts which have been found to have good activity for the treatment of both carbon monoxide and hydrocarbon such as unsaturated olefins comprise platinum component supported on a preferred titania support. The composition preferably comprises a binder and can be coated on a suitable support structure in amounts of from 0.8 to 1.0 g/in. A preferred platinum concentration ranges from 2 to 6% and preferably 3 to 5% by weight of platinum metal on the titania support. Useful and preferred substrate cell densities are equivalent to about 300 to 400 cells per square inch. The catalyst is preferably reduced as a powder or on the coated article using a suitable reducing agent. Preferably the catalyst is reduced in the gas stream comprising about 7% hydrogen with the balance nitrogen at from 2000 to 500° C. or from 1 to 12 hours. The most preferred reduction or forming temperature is 400° C. for 2–6 hours. This catalyst has been found to maintain high activity in air and humidified air at elevated temperatures of up to 100° C. after prolonged exposure.

Useful catalysts which can treat both ozone and carbon monoxide comprise at least one precious metal component, most preferably a precious metal selected from palladium, platinum and mixtures thereof on a suitable support such as a refractory oxide support. Useful refractory oxide supports comprise ceria, zirconia, alumina, titania, silica and mixtures thereof including a mixture of zirconia and silica as recited above. Also useful and preferred as a support are the above described coprecipitates of manganese oxides and zirconia. The composition comprises from 0.1 to 20.0, preferably 0.5 to 15, and more preferably from 1 to 10 weight percent of the precious metal component on the support based on the weight of the precious metal and the support. Palladium is preferably used in amounts from 2 to 15 and more preferably from 3 to 8 weight percent. Platinum is preferably used in amounts of from 0.1 to 6 percent and more preferably 2 to 5 weight percent. A preferred composition is a composition wherein the refractory component comprises ceria and the precious metal component comprises palladium. This composition has resulted in relatively high ozone and carbon monoxide conversions. More particularly, testing of this composition on a coated radiator has resulted in a 21% conversion of carbon monoxide in an air stream comprising 16 ppm of carbon monoxide contacting a surface at 95° C. with a face velocity of the gas stream being 5 miles per hour. The same catalyst resulted in a 55% ozone conversion where the stream contained 0.25 ppm of ozone and the treating surface was at 25° C. with an air stream face velocity of 10 miles per hour. Also preferred is a composition comprising a precious metal, preferably a platinum group metal, more preferably selected from platinum and palladium components, and most preferably a platinum component and the above recited coprecipitate of manganese oxide and zirconia. This above recited precious metal containing catalyst in the form of a catalyst powder or coating on a suitable substrate is in reduced form. Preferred reduction conditions include those recited above with the most preferred condition being from 250° to 350° C. for from 2 to 4 hours in a reducing gas comprising 7% hydrogen and 93% nitrogen. This catalyst has been found to be particularly useful in treating both carbon monoxide and ozone. Other useful compositions to convert ozone to oxygen and carbon monoxide to carbon dioxide comprise a platinum component supported on carbon, manganese dioxide, or a refractory oxide support, and optionally having an additional manganese component.

A useful and preferred catalyst which can treat ozone, carbon monoxide and hydrocarbons, as well as partially oxygenated hydrocarbons, comprises a precious metal component, preferably a platinum component on a suitable support such as a refractory oxide support. Useful refractory oxide supports comprise ceria, zirconia, alumina, titania, silica and mixtures thereof including a mixture of zirconia and silica as recited above. Also useful is a support including the above-recited coprecipitate of manganese oxide and zirconia. The composition comprises from 0.1 to 20, preferably 0.5 to 15 and more preferably 1 to 10 wt. % of the precious metal component on the refractory support based on the weight of the precious metal and the support. Where the hydrocarbon component is sought to be converted to carbon dioxide and water, platinum is the most preferred catalyst and is preferably used in amounts of from 0.1 to 5% and more preferably 2 to 5% by weight. In specific embodiments, there can be a combination of catalysts including the above recited catalyst as well as a catalyst which is particularly preferred for the treatment of ozone such as a catalyst comprising a manganese component. The manganese component can be optionally combined with a platinum component. The manganese and platinum can be on the same or different supports. There can be up to 80, preferably up to 50, more preferably from 1 to 40 and yet more preferably from 10 to 35 wt. % of the manganese component based on the weight of the precious metal and manganese in the pollutant treating composition. The catalyst loading is the same at that recited above with regard to the ozone catalyst. A preferred composition is a composition wherein the refractory component comprises an alumina or titania support and the precious metal component comprises a platinum component. Testing of such a composition coated onto a radiator has resulted in 68 to 72% conversion of carbon monoxide, 8 to 15% conversion of ozone and 17 to 18% conversion of propylene when contacting a surface at 95° C. with a face velocity of the gas stream being about ten miles per hour (hourly space velocity of 320,000 per reciprocal hours) with air dew point at 35° F. Generally, as the contacting surface temperature decreases and the space velocity or face velocity of the atmosphere air flow over the pollutant contacting surface increases, the percent conversion decreases.

Catalyst activity, particularly to treat carbon monoxide and hydrocarbons can be further enhanced by reducing the catalyst in a forming gas such as hydrogen, carbon monoxide, methane or hydrocarbon plus nitrogen gas. Alternatively, the reducing agent can be in the form of a liquid such as a hydrazine, formic acid, and formate salts such as sodium formate solution. The catalyst can be reduced as a powder or after coating onto a substrate. The reduction can be conducted in gas at from 150°–500° C., preferably 200°–400° C. for 1 to 12 hours, preferably 2 to 8 hours. In a preferred process, coated article or powder can be reduced in a gas comprising 7% hydrogen in nitrogen at 275°–350° C. for 2 to 4 hours.

An alternate composition for use in the method and apparatus of the present invention comprises a catalytically active material selected from the group consisting of precious metal components including platinum group metal components, gold components and silver components and a metal component selected from the group consisting of tungsten components and rhenium components. The relative amounts of catalytically active material to the tungsten component and/or rhenium component based on the weight of the metal are from 1:25, to 15:1.

The composition containing a tungsten component and/or a rhenium component preferably comprises tungsten and/or rhenium in the oxide form. The oxide can be obtained by forming the composition using tungsten or rhenium salts and the composition can subsequently be calcined to form tungsten and/or rhenium oxide. The composition can comprise further components such as supports including refractory oxide supports, manganese components, carbon, and coprecipitates of a manganese oxide and zirconia. Useful refractory metal oxides include alumina, silica, titania, ceria, zirconia, chromia and mixtures thereof. The composition can additionally comprise a binder material, such as metal sols including alumina or titania sols or polymeric binder which can be provided in the form of a polymeric latex binder.

In preferred compositions, there are from 0.5 to 15, preferably 1 to 10, and most preferably from 3 to 5 percent by weight of the catalytically active material. The preferred catalytically active materials are platinum group metals with platinum and palladium being more preferred and platinum being most preferred. The amount of tungsten and/or rhenium component based on the metals ranges 1 to 25, preferably 2 to 15 and most preferably 3 to 10 weight percent. The amount of binder can vary from 0 to 20 weight percent, preferably 0.5 to 20, more preferably 2 to 10 and most preferably 2 to 5 weight percent. Depending on the support material a binder is not necessary in this composition. Preferred compositions comprise from 60 to 98.5 weight percent of a refractory oxide support, from 0.5 to 15 weight percent of the catalytically active material, from 1 to 25 weight of the tungsten and/or rhenium component, and from 0 to 10 weight percent binder.

Compositions containing the tungsten component and rhenium component can be calcined under conditions as recited above. Additionally, the composition can be reduced. However, as shown in the examples below, the compositions need not be reduced and the presence of the tungsten and/or rhenium component can result in conversions of carbon monoxide and hydrocarbons comparable to compositions containing platinum group metals which have been reduced.

The pollutant treating compositions of the present invention preferably comprise a binder which acts to adhere the composition and to provide adhesion to the atmosphere contacting surface. It has been found that a preferred binder is a polymeric binder used in amounts of from 0.5 to 20, more preferably 2 to 10, and most preferably to 2 to 5 percent by weight of binder based on the weight of the composition. Preferably, the binder is a polymeric binder which can be a thermosetting or thermoplastic polymeric binder. The polymeric binder can have suitable stabilizers and age resistors known in the polymeric art. The polymer can be a plastic or elastomeric polymer. Most preferred are thermosetting, elastomeric polymers introduced as a latex into the catalyst into a slurry of the catalyst composition, preferably an aqueous slurry. Upon application of the composition and heating the binder material can crosslink providing a suitable support which enhances the integrity of the coating, its adhesion to the atmosphere contacting surface and provides structural stability under vibrations encountered in motor vehicles. The use of preferred polymeric binder enables the pollutant treating composition to adhere to the atmosphere contacting surface without the necessity of an undercoat layer. The binder can comprise water resistant additives to improve water resistance and improve adhesion. Such additives can include fluorocarbon emulsions and petroleum wax emulsions.

Useful polymeric compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex as described in the accompanying examples.

Particularly preferred polymers and copolymers are vinyl acrylic polymers and ethylene vinyl acrylic copolymers. A preferred vinyl acetate polymer is a cross linking polymer sold by National Starch and Chemical Company as Xlink 2833. It is described as a vinyl acrylic polymer having a Tg of −15° C., 45% solids, a pH of 4.5 and a viscosity of 300 cps. In particular, it is indicated to have vinyl acetate CAS No. 108-05-4 in a concentration range of less than 0.5 percent. It is indicated to be a vinyl acetate copolymer. Other preferred vinyl acetate copolymers which are sold by the National Starch and Chemical Company include Dur-O-Set E-623 and Dur-O-Set E-646. Dur-O-Set E-623 is indicated to be ethylene vinyl acetate copolymers having a Tg of 0° C., 52% solids, a pH of 5.5 and a viscosity of 200 cps. Dur-O-Set E-646 is indicated to be an ethylene vinyl acetate copolymer with a Tg of −12° C., 52% solids, a pH of 5.5 and a viscosity of 300 cps.

An alternate and useful binding material is the use of a zirconium compound. Zirconyl acetate is preferred zirconium compound used. It is believed that zirconia acts as a high temperature stabilizer, promotes catalytic activity, and improves catalyst adhesion. Upon calcination, zirconium compounds such as zirconyl acetate are converted to $ZrO_2$ which is believed to be the binding material. Various useful zirconium compounds include acetates, hydroxides, nitrates, etc. for generating $ZrO_2$ in catalysts. In the case of using zirconyl acetate as a binder for the present catalysts, $ZrO_2$ will not be formed unless the radiator coating is calcined. Since good adhesion has been attained at a "calcination" temperature of only 120° C., it is believed that the zirconyl acetate has not decomposed to zirconium oxide but instead has formed a cross linked network with the pollutant treating material such as Carulite® particles and the acetates which were formed from ball milling with acetic acid. Accordingly, the use of any zirconium containing compounds in the present catalysts are not restricted only to zirconia. Additionally, the zirconium compounds can be used with other binders such as the polymeric binder recited above.

An alternate pollutant treating catalyst composition can comprise activated carbon composition. The carbon composition comprises activated carbon, a binder, such as a polymeric binder, and optionally conventional additives such as defoamers and the like. A useful activated carbon composition comprises from 75 to 85 weight percent activated carbon such as "coconut shell" carbon or carbon from wood and a binder such as an acrylic binder with a defoamer. Useful slurries comprise from 10 to 50 weight percent solids. The activated carbon can catalyze reduction of ozone to oxygen, as well as adsorb other pollutants.

Pollutant treating catalyst compositions of the present invention can be prepared in any suitable process. A preferred process is disclosed in U.S. Pat. No. 4,134,860 herein incorporated by reference. In accordance with this method, the refractory oxide support such as activated alumina, titania or activated silica alumina is jet milled, impregnated with a catalytic metal salt, preferably precious metal salt solution and calcined at a suitable temperature, typically from about 300° C. to about 600° C., preferably from about 350° C. to about 550° C., and more preferably from about 400° C. to about 500° C. for from about 0.5 to about 12 hours. Palladium salts are preferably a palladium nitrate or a palladium amine such as palladium tetraamine acetate, or palladium tetraamine hydroxide. Platinum salts preferably include platinum hydroxide solubilized in an amine. In specific and preferred embodiments the calcined catalyst is reduced as recited above.

In an ozone treating composition, a manganese salt, such as manganese nitrate, can then be mixed with the dried and calcined alumina supported palladium in the presence of deionized water. The amount of water added should be an amount up to the point of incipient wetness. Reference is made to the method reviewed in the above referenced and incorporated U.S. Pat. No. 4,134,860. The point of incipient wetness is the point at which the amount of liquid added is the lowest concentration at which the powdered mixture is sufficiently dry so as to absorb essentially all of the liquid. In this way a soluble manganese salt such as $Mn(NO_3)_2$ in water can be added into the calcined supported catalytic precious metal. The mixture is then dried and calcined at a suitable temperature, preferably 400 to 500° C. for about 0.5 to about 12 hours.

Alternatively, the supported catalytic powder (i.e., palladium supported on alumina) can be combined with a liquid, preferably water, to form a slurry to which a solution of a manganese salt, such as $Mn(NO_3)_2$ is added. Preferably, the manganese component and palladium supported on a refractory support such as activated alumina, more preferably activated silica-alumina is mixed with a suitable amount of water to result in a slurry having from 15 to 40% and preferable 20 to 35 weight percent solids. The combined mixture can be coated onto a carrier such as a radiator and the radiator dried in air at suitable conditions such as 50° C. to 150° C. for 1 to 12 hours. The substrate which supports the coating can then be heated in an oven at suitable conditions typically from 300° C. to 550° C., preferably 350° C. to 500° C., more preferably 350° C. to 450° C. and most preferably from 400° C. and 500° C. in an oxygen containing atmosphere, preferably air for about 0.5 to about 12 hours to calcine the components and help to secure the coating to the substrate atmosphere contacting surface. Where the composition further comprises a precious metal component, it is preferably reduced after calcining.

The method of the present invention includes forming a mixture comprising a catalytically active material selected from at least one platinum group metal component, a gold component, a silver component, a manganese component and water. The catalytically active material can be on a suitable support, preferably a refractory oxide support. The mixture can be milled, calcined and optionally reduced. The calcining step can be conducted prior to adding the polymeric binder. It is also preferred to reduce the catalytically active material prior to adding the polymeric binder. The slurry comprises a carboxylic acid compound or polymer containing carboxylic acid in an amount to result in a pH of about from 3 to 7, typically 3 to 6, and preferably from 0.5 to 15 weight percent of glacial acetic acid based on the weight of the catalytically active material and acetic acid. The amount of water can be added as suited to attain a slurry of the desired viscosity. The percent solids are typically 20 to 50 and preferably 30 to 40 percent by weight. The preferred vehicle is deionized water (D.I.). The acetic acid can be added upon forming the mixture of the catalytically active material, which may have been calcined, with water.

Alternatively, the acetic acid can be added with the polymeric binder. A preferred composition to treat ozone using manganese dioxide as the catalyst can be made using about 1,500 g of manganese dioxide which is mixed with 2,250 g of deionized water and 75 g or acetic acid. The mixture is combined in a 1 gallon ballmill and ballmilled for about 8 hours until approximately 90% of the particles are less than 8 micrometers. The ballmill is drained and 150 g of polymeric binder is added. The mixture is then blended on a rollmill for 30 minutes. The resulting mixture is ready for coating onto a suitable substrate such as an automobile radiator according to the methods described below.

The pollutant treating composition can be applied to the atmosphere contacting surface by any suitable means such as spray coating, powder coating, or brushing or dipping the surface into a catalyst slurry.

The atmosphere contacting surface is preferably cleaned to remove surface dirt, particularly oils which could result in poor adhesion of the pollutant treating composition to the surface. Where possible, it is preferred to heat the substrate on which the surface is located to a high enough temperature to volatilize or burn off surface debris and oils.

Where the substrate on which there is an atmosphere contacting surface is made of a material which can withstand elevated temperatures such as an aluminum radiator, the substrate surface can be treated in such a manner as to improve adhesion to the catalyst composition, preferably the ozone carbon monoxide, and/or hydrocarbon catalyst composition. One method is to heat the aluminum substrate such as the radiator to a sufficient temperature in air for a sufficient time to form a thin layer of aluminum oxide on the surface. This helps clean the surface by removing oils which may be detrimental to adhesion. Additionally, if the surface is aluminum a sufficient layer of oxidized aluminum has been found to be able to be formed by heating the radiator in air for from 0.5 to 24 hours, preferably from 8 to 24 hours and more preferably from 12 to 20 hours at from 350° C. to 500° C., preferably from 400 to 500° C. and more preferably 425 to 475° C. In some cases, sufficient adhesion without the use of an undercoat layer has been attained where an aluminum radiator has been heated at 450° C. for 16 hours in air. This method is particularly useful when applying the coating to new surfaces prior to assembly, either as original equipment or replacement.

Adhesion may improve by applying an undercoat or precoat to the substrate. Useful undercoats or precoats include refractory oxide supports of the type discussed above, with alumina preferred. A preferred undercoat to increase adhesion between the atmosphere contacting surface and an overcoat of an ozone catalyst composition is described in commonly assigned U.S. Pat. No. 5,422,331 herein incorporated herein by reference. The undercoat layer is disclosed as comprising a mixture of fine particulate refractory metal oxide and a sol selected from silica, alumina, zirconia and titania sols. In accordance with the method of the present invention, surfaces on existing stationary surfaces can be coated in place. The catalyst composition can be applied directly to the surface. Where additional adhesion is desired, an undercoat can be used as recited above.

Where it is practical to separate the radiator from the stationary substrate, a support material such as activated alumina, silica-alumina, bulk titania, titanium sol, silica zirconia, manganese zirconia and others as recited can be formed into a slurry and coated on the substrate preferably with a silica sol to improve adhesion. The precoated substrate can subsequently be coated with soluble precious metal salts such as the platinum and/or palladium salts, and optionally manganese nitrate. The coated substrate can then be heated in an oven in air for sufficient time (0.5 to 12 hours at 350° C. to 550° C.) to calcine the palladium and manganese components to form the oxides thereof.

The present invention can comprise adsorption compositions supported on the atmosphere contacting surface. The adsorption compositions can be used to adsorb gaseous pollutants such as hydrocarbons and sulfur dioxide as well as particulate matter such as particulate hydrocarbon, soot, pollen, bacteria and germs. Useful supported compositions can include adsorbents such as zeolite to adsorb hydrocarbons. Useful zeolitic compositions are described in Publication No. WO 94/27709 published Dec. 8, 1994 and entitled Nitrous Oxide Decomposition Catalyst hereby incorporated by reference. Particularly preferred zeolites are Beta zeolite, and dealuminated Zeolite Y.

Carbon, preferably activated carbon, can be formed into carbon adsorption compositions comprising activated carbon and binders such as polymers as known in the art. The carbon adsorption composition can be applied to the atmosphere contacting surface. Activated carbon can adsorb hydrocarbons, volatile organic components, bacteria, pollen and the like. Yet another adsorption composition can include components which can adsorb $SO_3$. A particularly useful $SO_3$ adsorbent is calcium oxide. The calcium oxide is converted to calcium sulfate. The calcium oxide adsorbent compositions can also contain a vanadium or platinum catalyst which can be used to convert sulfur dioxide to sulfur trioxide which can then be adsorbed onto the calcium oxide to form calcium sulfate.

In addition to treatment of atmospheric air containing pollutants at ambient condition or ambient operating conditions, the present invention contemplates the catalytic oxidation and/or reduction of hydrocarbons, nitrogen oxides and residual carbon monoxide using conventional three way catalysts supported on electrically heated catalysts such as are known in the art. The electrically heated catalysts can be located on an electrically heated catalyst monolith. Such electrically heated catalyst substrates are known in the art and are disclosed in references such as U.S. Pat. Nos. 5,308,591 and 5,317,869, both hereby incorporated by reference. For the purposes of the present invention, the electrically heated catalyst is a metal honeycomb having a suitable thickness in the flow direction, preferably of from ⅛ inch to 12 inches, and more preferably 0.5 to 3 inches. Preferred supports are monolithic carriers of the type having a plurality of fine, parallel gas flow passages extending therethrough from an inlet face to an outlet face of the carrier so that the passages are open to air flow entering from the front and passing through the monolith in the direction toward the fan. Preferably the passages are essentially straight from their inlet to their outlet and are defined by walls in which the catalytic material is coated as a wash coat so that the gases flowing through the passages contact the catalytic material. The flow passages of the monolithic carrier are thin wall channels which can be of any suitable cross-sectional shape and size such as trapezoidal, rectangular, square, sinusoidal, hexagonal, oval, circular or formed from metallic components which are corrugated and flat as are known in the art. Such structures may contain from about 60 to 600 or more gas inlet openings ("cells") per square inch of cross section. The monolith may be made of any suitable material and is preferably capable of being heated upon application of an electric current. A useful catalyst to apply is the three way catalyst (TWC) as recited above which can enhance the oxidation of hydrocarbons and carbon monoxide as well as the reduction of nitrogen oxides. Useful TWC catalysts are recited in U.S. Pat. Nos. 4,714,694; 4,738,947; 5,010,051; 5,057,483; and 5,139,992.

EXAMPLES

The present invention is illustrated further by the following examples which are not intended to limit the scope of this invention.

In some of the following examples, an automobile radiator is used as the test substrate. Although such a substrate would not be "stationary" in operation, the purpose of these examples is to show the effectiveness of certain catalysts in treating particular gaseous pollutants. In addition, a test of such catalysts for use on stationary substrates can be conducted by mounting such a catalyzed radiator in the path of an air stream at a stationary location. For example, a catalyzed radiator can be mounted on a stationary heat exchanger or in the path of an air handling system to determine whether the catalyst is suitable for treating the particular gaseous pollutants under the ambient conditions at that location.

Example 1

A 1993 Nissan Altima radiator core (Nissan part number 21460-1E400) was heat treated in air to 450° C. for 16 hours to clean and oxidize the surface and then a portion coated with high surface area silica-alumina undercoat (dry loading=0.23 g/in$^3$) by pouring a water slurry containing the silica-alumina through the radiator channels, blowing out the excess with an air gun, drying at room temperature with a fan, and then calcining to 450° C. The silica-alumina slurry was prepared by ball milling high surface area calcined SRS-II alumina (Davison) with acetic acid (0.5% based on alumina) and water (total solids ca. 20%) to a particle size of 90% <4 μm. The ball milled material was then blended with Nalco silica sol (#91SJ06S—28% solids) in a ratio of 25%/75%. The SRS-II alumina is specified to have a structure of xSiO$_2$.yAl$_2$O$_3$.zH$_2$O with 92–95% by weight Al$_2$O$_3$ and 4–7% by weight SiO$_2$ after activation. BET surface area is specified to be a minimum of 260 m$^2$/g after calcination.

A Pd/Mn/Al$_2$O$_3$ catalyst slurry (nominally 10% by weight palladium on alumina) was prepared by impregnating high surface area SRS-II alumina (Davison) to the point of incipient wetness with a water solution containing sufficient palladium tetraamine acetate. The resulting powder was dried and then calcined for 1 hour at 450° C. The powder was subsequently mixed under high shear with a water solution of manganese nitrate (amount equivalent to 5.5% by weight MnO$_2$ on the alumina powder) and sufficient dilution water to yield a slurry of 32–34% solids. The radiator was coated with the slurry, dried in air using a fan, and then calcined in air at 450° C. for 16 hours. This ozone destruction catalyst contained palladium (dry loading=263 g/ft$^3$ of radiator volume) and manganese dioxide (dry loading=142 g/ft$^3$) on high surface area SRS-II alumina. The partially coated radiator was reassembled with the coolant tanks, also referred to as headers.

Ozone destruction performance of the coated catalyst was determined by blowing an air stream containing a given concentration of ozone through the radiator channels at face velocities typical of driving speeds and then measuring the concentration of ozone exiting the back face of the radiator. The air used was at about 20° C. and had a dew point of about 35° F. Coolant fluid was circulated through the radiator at a temperature of about 50° C. Ozone concentrations ranged from 0.1–0.4 ppm. Ozone conversion was measured at linear air velocities (face velocities) equivalent to 12.5 miles per hour to be 43%; at 25 mph to be 33%; at 37.5 mph to be 30% and at 49 mph to be 24%.

Example 2 (Comparative)

A portion of the same radiator used in Example 1 which was not coated with catalyst was similarly evaluated for ozone destruction performance (i.e. control experiment). No conversion of ozone was observed.

Example 3

After heat treatment for 60 hours in air at 450° C., a Lincoln Town Car radiator core (part #F1VY-8005-A) was coated sequentially in 6"×6" square patches with a variety of different ozone destruction catalyst compositions (i.e., different catalysts; catalyst loadings, binder formulations, and heat treatments). Several of the radiator patches were pre-coated with a high surface area alumina or silica-alumina and calcined to 450° C. prior to coating with the catalyst. The actual coating was accomplished similarly to Example 1 by pouring a water slurry containing the specific catalyst formulation through the radiator channels, blowing out the excess with an air gun, and drying at room temperature with a fan. The radiator core was then dried to 120° C., or dried to 120° C. and then calcined to 400 to 450° C. The radiator core was then reattached to its plastic tanks and ozone destruction performance of the various catalysts was determined at a radiator surface temperature of about 40° C. to 50° C. and a face velocity of 10 mph as described in Example 1.

Table I summarizes the variety of catalysts coated onto the radiator. Details of the catalyst slurry preparations are given below.

A Pt/Al$_2$O$_3$ catalyst (nominally 2% by weight Pt on Al$_2$O$_3$) was prepared by impregnating 114 g of a platinum salt solution derived from H$_2$Pt(OH)$_6$ solubilized in an amine, (17.9% Pt), dissolved in 520 g of water to 1000 g of Condea SBA-150 high surface area (specified to be about 150 m$^2$/g) alumina powder. Subsequently 49.5 g of acetic acid was added. The powder was then dried at 110° C. for 1 hour and calcined at 550° C. for 2 hours. A catalyst slurry was then prepared by adding 875 g of the powder to 1069 g of water and 44.6 g of acetic acid in a ball mill and milling the mixture to a particle size 90% <10 μm. (Patches 1 and 4)

The carbon catalyst slurry was a formulation (29% solids) purchased from Grant Industries, Inc., Elmwood Park, N.J. The carbon is derived from coconut shell. There is an acrylic binder and a defoamer. (Patches 8 and 12)

The Carulite® catalyst (CuO/MnO$_2$) was prepared by first ball milling 1000 g of Carulite® (purchased from Carus Chemical Co., Chicago, Ill.) with 1500 g of water to a particle size 90%<6 μm. Carulite® 200 is specified as containing 60 to 75 weight percent MnO$_2$, 11–14 percent CuO and 15–16 percent Al$_2$O$_3$. The resulting slurry was diluted to ca. 28% solids and then mixed with either 3% (solids basis) of Nalco #1056 silica sol or 2% (solids basis) National Starch #x4260 acrylic copolymer. (Patches 5, 9 and 10)

The Pd/Mn/Al$_2$O$_3$ catalyst slurry (nominally 10% by weight palladium on alumina) was prepared as described in Example 1. (Patches 2, 3 and 6)

An I.W. (incipient wetness) Pd/Mn/Al$_2$O$_3$ catalyst (nominally 8% palladium and 5.5% MnO$_2$ based on alumina) was prepared similarly by first impregnating high surface area SRS-II alumina (Davison) to the point of incipient wetness with a water solution containing palladium tetraamine acetate. After drying and then calcining the powder for two hours at 450° C., the powder was reimpregnated to the point of incipient wetness with a water solution containing manganese nitrate. Again, after drying and calcination at 450° C. for two hours, the powder was mixed in a ball mill with acetic acid (3% by weight of catalyst powder) and enough water to create a slurry of 35% solids. The mixture was then milled until the particle size was 90%<8 µm. (Patches 7 and 11)

The $SiO_2/A_2O_3$ precoat slurry was prepared as described in Example 1. (Patches 3 and 11)

The $Al_2O_3$ precoat slurry was prepared by ball milling high surface area Condea SBA-150 alumina with acetic acid (5% by weight based on alumina) and water (total solids ca. 44%) to a particle size of 90%<10 µm. (Patches 9 and 12)

Results are summarized in Table I. The conversion of carbon monoxide after being on the automobile for 5,000 miles was also measured at the conditions recited in Example 1 for patch #4. At a radiator temperature of 50° C. and a linear velocity of 10 mph no conversion was observed.

TABLE I

CATALYST SUMMARY

| PATCH # | CATALYST | OZONE CONVERSION (%) |
|---|---|---|
| 1 | $Pt/Al_2O_3$ 0.67 g/in³ (23 g/ft³ Pt) No Precoat No Calcine (120° C. only) | 12 |
| 2 | $Pd/Mn/Al_2O_3$ 0.97 g/in³ (171 g/ft³ Pd) No Precoat Calcined 450° C. | 25 |
| 3 | $Pd/Mn/Al_2O_3$ 1.19 g/in³ (209 g/ft³ Pd) $SiO_2/Al_2O_3$ Precoat (0.16 g/in³) Calcined 450° C. | 24 |
| 4 | $Pt/Al_2O_3$ 0.79 g/in³ (27 g/ft³ Pt) No Precoat Calcined 450° C. | 8 |
| 5 | Carulite 200 0.49 g/in³ 3% $SiO_2/Al_2O_3$ Binder No Precoat Calcined 400° C. | 50 |
| 6 | $Pd/Mn/Al_2O_3$ 0.39 g/in³ (70 g/ft³ Pd) No Precoat Calcined 450° C. | 28 |
| 7 | I.W. $Pd/Mn/Al_2O_3$ 0.69 g/in³ (95 g/ft³ Pd) No Precoat No Calcine (120° C. only) | 50 |
| 8 | Carbon 0.80 g/in³ No Precoat No Calcine (120° C. only) | 22 |
| 9 | Carulite 200 0.65 g/in³ 3% $SiO_2/Al_2O_3$ Binder $Al_2O_3$ Precoat (0.25 g/in³) Calcined 450° C. | 38 |
| 10 | Carulite 200 0.70 g/in³ 2% Latex Binder No Precoat No Calcine (120° C. only) | 42 |
| 11 | I.W. $Pd/Mn/Al_2O_3$ 0.59 g/in³ (82 g/ft³ Pd) $SiO_2/Al_2O_3$ precoat (0.59 g/in³) No Calcine either Coat (120° C. only) | 46 |
| 12 | Carbon 1.07 g/in³ $Al_2O_3$ Precoat (0.52 g/in³) calcined to 450° C. Topcoat not calcined (120° C. only) | 17 |

Example 4

A 1993 Nissan Altima radiator core (Nissan part number 21460-1E400) was heat treated in air to 400° C. for 16 hours and then a portion coated with Condea high surface area SBA-150 alumina (dry loading=0.86 g/in³) by pouring a water slurry containing the alumina through the radiator channels, blowing out the excess with an air gun, drying at room temperature with a fan, and then calcining to 400° C. The alumina precoat slurry was prepared as described in Example 3. The radiator was then coated sequentially in 2"×2" square patches with seven different CO destruction catalysts (Table II). Each coating was applied by pouring a water slurry containing the specific catalyst formulation through the radiator channels, blowing out the excess with an air gun, and drying at room temperature with a fan.

The Carulite® and 2% $Pt/Al_2O_3$ catalysts (Patches #4 and #6, respectively) were prepared according to the procedure described in Example 3. The 3% $Pt/ZrO_2/SiO_2$ catalyst (Patch #3) was made by first calcining 510 g of zirconia/silica frit (95% $ZrO_2$/5%$SiO_2$—Magnesium Elektron XZO678/01) for 1 hour at 500° C. A catalyst slurry was then prepared by adding to 480 g of deionized water, 468 g of the resulting powder, 42 g of glacial acetic acid, and 79.2 g of a platinum salt solution (18.2% Pt) derived from $H_2Pt(OH)_6$ solubilized with an amine. The resulting mixture was milled on a ball mill for 8 hours to a particle size of 90% less than 3µm.

The 3% $Pt/TiO_2$ catalyst (Patch #7) was prepared by mixing in a conventional blender 500 g of $TiO_2$ (Degussa P25), 500 g of deionized water, 12 g of concentrated ammonium hydroxide, and 82 g of a platinum salt solution (18.2% Pt) derived from $H_2Pt(OH)_6$ solubilized with an amine. After blending for 5 minutes to a particle size of 90% less than 5 µm, 32.7 g of Nalco 1056 silica sol and sufficient deionized water to reduce the solids content to ca. 22% was added. The resulting mixture was blended on a roll mill to mix all ingredients.

The 3% $Pt/Mn/ZrO_2$ catalyst slurry (Patch #5) was prepared by combining in a ball mill 70 g of manganese/zirconia frit comprising a coprecipitate of 20 weight percent manganese and 80 weight percent zirconium based on metal weight (Magnesium Elektron XZO719/01), 100 g of deionized water, 3.5 g of acetic acid and 11.7 g of a platinum salt solution (18.2% Pt) derived from $H_2Pt(OH)_6$ solubilized with an amine. The resulting mixture was milled for 16 hours to a particle size 90% less than 10 µm.

The 2% $Pt/CeO_2$ catalyst (Patch #1) was prepared by impregnating 490 g of alumina stabilized high surface area ceria (Rhone Poulenc) with 54.9 g of a platinum salt solution (18.2% Pt) derived from $H_2Pt(OH)_6$ solubilized with an amine and dissolved in deionized water (total volume—155 mL). The powder was dried at 110° C. for 6 hours and calcined at 400° C. for 2 hours. A catalyst slurry was then prepared by adding 491 g of the powder to 593 g of deionized water in a ball mill and then milling the mixture for 2 hours to a particle size of 90% less than 4 μm. The 4.6% Pd/CeO$_2$ catalyst (Patch #2) was prepared similarly via incipient wetness impregnation using 209.5 g (180 mL) of palladium tetraamine acetate solution.

Figure 4:
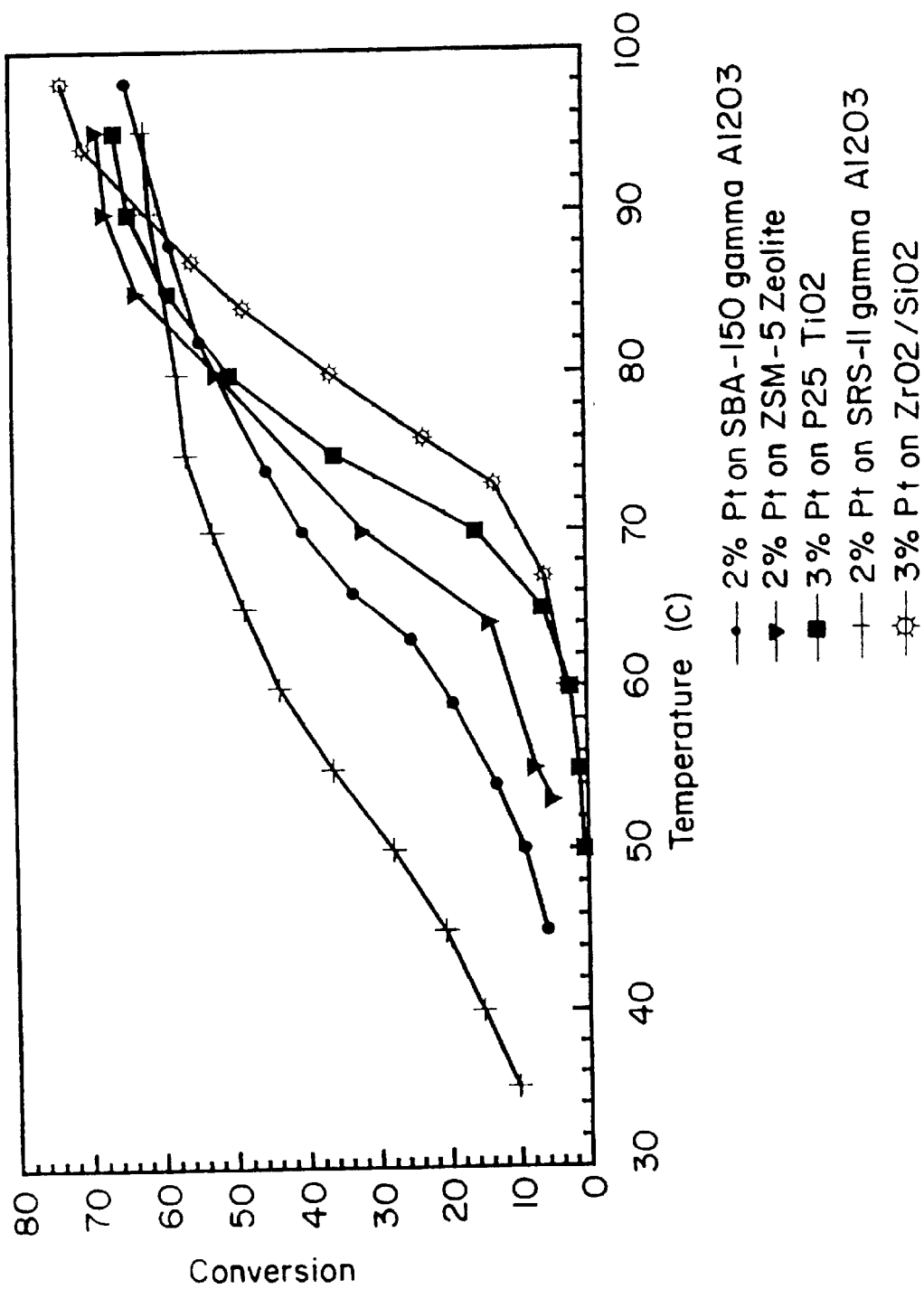
FIGS. 4–9 and 11–12 are plots of CO conversion versus temperature using the different catalysts of Examples 4, 9–12, 14 and 15.

After all seven catalysts were applied, the radiator was calcined for about 16 hours at 400° C. After attaching the radiator core to the plastic tanks, CO destruction performance of the various catalysts was determined by blowing an air stream containing CO (ca. 16 ppm) through the radiator channels at a 5 mph linear face velocity (315,000/h space velocity) and then measuring the concentration of CO exiting the back face of the radiator. The radiator temperature was about 95° C., and the air stream had a dew point of approximately 35° F. Results are summarized in Table II. FIG. 4 illustrates CO conversion vs. temperature for Patch Nos. 3, 6 and 7.

Ozone destruction performance was measured as described in Example 1 at 25° C., 0.25 ppm ozone, and a linear face velocity of 10 mph with a flow of 135.2 L/min and an hourly space velocity of 640,000/h. The air used had a dewpoint of 35° F. Results are summarized in Table II.

The catalysts were also tested for the destruction of propylene by blowing an air stream containing propylene (ca. 10 ppm) through the radiator channels at a 5 mph linear face velocity, with a flow rate of 68.2 L/min and an hourly space velocity of 320,000/h, and then measuring the concentration of propylene exiting the back face of the radiator. The radiator temperature was ca. 95° C., and the air stream had a dew point of approximately 35° F. Results are summarized in Table II.

TABLE II

CO/HC/OZONE CONVERSION SUMMARY

| PATCH # | CATALYST | CO CONV. (%)[1] | OZONE CONV. (%)[2] | PROPYLENE CONV. (%)[3] |
|---|---|---|---|---|
| 1 | 2% Pt/CeO$_2$ 0.7 g/in$^3$ (24 g/ft$^3$ Pt) | 2 | 14 | 0 |
| 2 | 4.6% Pd/CeO$_2$ 0.5 g/in$^3$ (40 g/ft$^3$ Pd) | 21 | 55 | 0 |
| 3 | 3% Pt/ZrO$_2$/SiO$_2$ 0.5 g/in$^3$ (26 g/ft$^3$ Pt) | 67 | 14 | 2 |
| 4 | Carulite 200 0.5 g/in$^3$ 3% SiO$_2$/Al$_2$O$_3$ binder | 5 | 56 | 0 |
| 5 | 3% Pt/Mn/ZrO$_2$ 0.7 g/in$^3$ (36 g/ft$^3$ Pt) | 7 | 41 | 0 |
| 6 | 2% Pt/Al$_2$O$_3$ 0.5 g/in$^3$ (17 g/ft$^3$ Pt) | 72 | 8 | 17 |
| 7 | 3% Pt/TiO$_2$ 0.7 g/in$^3$ (36 g/ft$^3$ Pt) 3% SiO$_2$/Al$_2$O$_3$ binder | 68 | 15 | 18 |

[1]Test Conditions: 16 ppm CO; 95° C.; 5 mph face velocity; 68.2 L/min; LHSV (hourly space velocity) = 320,000/h; Air dewpoint = 35° F.
[2]Test Conditions: 0.25 ppm O$_3$; 25° C.; 10 mph face velocity; 135.2 L/min; LHSV (hourly space velocity) = 640,000/h; Air dewpoint = 35° F.
[3]Test Conditions: 10 ppm propylene; 95° C.; 5 mph face velocity; 68.2 L/min; LHSV (hourly space velocity) = 320,000/h; Air dewpoint = 35° F.

Example 5

This example summarizes technical results from an on-the-road vehicle test conducted in February and March 1995 in the Los Angeles area. The purpose of the test was to measure catalytic ozone decomposition efficiency over a catalyzed radiator under actual driving conditions. The Los Angeles (LA) area was chosen as the most appropriate test site primarily due to its measurable ozone levels during this March testing period. In addition, specific driving routes are defined in the LA area which are typical of AM and PM peak and off-peak driving. Two different catalyst compositions were evaluated: 1) Carulite® (CuO/MnO$_2$/Al$_2$O$_3$ purchased from Carus Chemical Company); and 2) Pd/Mn/Al$_2$O$_3$ (77 g/ft$^3$ Pd) prepared as described in Example 3. Both catalysts were coated in patches onto a late model Cadillac V-6 engine aluminum radiator. The radiator was an aluminum replacement for the copper-brass OEM radiator which was on the Chevrolet Caprice test vehicle. The car was outfitted with ¼" Teflon® PTFE sampling lines located directly behind each catalyst patch and behind an uncoated portion of the radiator (control patch). Ambient (catalyst in) ozone levels were measured via a sampling line placed in front of the radiator. Ozone concentrations were measured with two Dasibi Model 1003AH ozone monitors located in the back seat of the vehicle. Temperature probes were mounted (with epoxy) directly onto each radiator test patch within a few inches of the sampling line. A single air velocity probe was mounted on the front face of the radiator midway between the two patches. Data from the ozone analyzers, temperature probes, air velocity probe, and vehicle speedometer were collected with a personal computer located in the trunk and downloaded to floppy disks.

Overall results from the test are summarized in Table III below. For each catalyst (Carulite® & Pd/Mn/Al$_2$O$_3$), results for cold idle, hot idle and on-the-road driving are reported. Data were collected on two separate trips to LA in February and March of 1995. The first trip was cut short after only a few days due to low ambient ozone levels. Although somewhat higher during the second trip in March, ambient levels still only averaged approximately 40 ppb. The last three days of testing (March 17–20) had the highest ozone encountered. Peak levels were approximately 100 ppb. In general, no trend in conversion vs. ozone concentration was noted.

Except for the cold idle results, those reported in Table III are averages from at least eleven different runs (the actual range of values appear in parentheses). Only data corresponding to inlet ozone concentration greater or equal to 30 ppb were included. Freeway data was not included since ambient levels dropped to 20 ppb or lower. Only two runs were completed for the cold idle tests. By cold idle refers to data collected immediately after vehicle startup during idle before the thermostat switches on and pumps warm coolant fluid to the radiator. Overall, ozone conversions were very good for both catalysts with the highest values obtained during hot idle. This can be attributed to the higher temperatures and lower face velocities associated with idling. Cold idle gave the lowest conversion due to the lower ambient temperature of the radiator surface. Driving results were intermediate of hot and cold idle results. Although the radiator was warm, temperature was lower and face velocity higher than those encountered with hot idle conditions. In general, ozone conversions measured for Carulite® were greater than those measured for Pd/Mn/Al$_2$O$_3$ (e.g. 78.1 vs. 63.0% while driving). However, for the hot idle and driving runs, the average temperature of the Carulite® catalyst was typically 40° F. greater than the Pd/Mn/Al$_2$O$_3$ catalyst while the average radiator face velocity was typically 1 mph lower.

Overall, the results indicate that ozone can be decomposed at high conversion rates under typical driving conditions.

TABLE III

ON-ROAD OZONE CONVERSION RESULTS*

| | OZONE CONVERSION (%) | TEMPERATURE (° F.) | FACE VELOCITY (mph) | VEHICLE SPEED (mph) |
|---|---|---|---|---|
| | Pd/Mn/Al$_2$O$_3$ | | | |
| Idle Cold | 48.2 (47.2–49.2) | 70.6 (70.5–70.8) | 9.0 (8.9–9.2) | 0.0 |
| Idle Hot | 80.6 (70.7–89.9) | 120.0 (104.7–145.2) | 7.4 (6.1–8.4) | 0.0 |
| Driving | 63.0 (55.5–69.9) | 104.3 (99.2–109.6) | 13.2 (12.2–14.9) | 23.3 (20.5–29.7) |
| | Carulite (CuO/MnO$_2$) | | | |
| Idle Cold | 67.4 (67.4–67.5) | 71.8 (70.8–72.9) | 8.2 (7.5–8.9) | 0.0 |
| Idle Hot | 84.5 (71.4–93.5) | 157.1 (134.8–171.2) | 7.5 (6.7–8.2) | 0.0 |
| Driving | 78.1 (72.3–83.8) | 143.7 (132.9–149.6) | 12.2 (11.2–13.5) | 19.2 (13.7–24.8) |

*Average values. Ranges appear in parentheses.

In general, the results of motor testing are consistent with fresh activity measured in the lab prior to installation of the radiator. At room temperature, 20% relative humidity (0.7% water vapor absolute), and a 10 mph equivalent face velocity, lab conversions for Pd/Mn/Al$_2$O$_3$ and Carulite® were 55 and 69% respectively. Increasing the RH to 70% (2.3% absolute) lowered conversions to 38 and 52%, respectively. Since the cold idle (70° F.) conversions measured at a 9 mph face velocity were 48 and 67% respectively, it would appear that the humidity levels encountered during the testing were low.

The face velocity of air entering the radiator was low. At an average driving speed of roughly 20 mph (typical of local driving), radiator face velocity was only approximately 13 mph. Even at freeway speeds in excess of 60 mph, radiator face velocity was only ca. 25 mph. The fan significantly affects control of air flowing through the radiator. While idling, the fan typically pulled about 8 mph.

Example 6

An 8 weight percent Pd on Carulite® catalyst was prepared by impregnating 100 g Carulite® 200 powder (ground up in a blender) to the point of incipient wetness with 69.0 g of a water solution containing palladium tetraamine acetate (12.6% Pd). The powder was dried overnight at 90° C. and then calcined to 450° C. for 2 hours. 92 g of the resulting calcined catalyst was then combined with 171 g of deionized water in a ball mill to create a slurry of 35% solids. After milling for 30 minutes to a particle size 90%≦9 μm, 3.1 g of National Starch x4260 acrylic latex binder (50% solids) was added, and the resulting mixture was milled for an additional 30 minutes to disperse the binder. Compositions containing 2,4 and 6 weight percent Pd on Carulite® catalysts were similarly prepared and evaluated.

The catalysts were evaluated for ozone decomposition at room temperature and 630,000/h space velocity using washcoated 300 cpsi ceramic honeycombs, as described below in Example 7. The catalyst samples were prepared as recited above. Results are summarized in Table IV. As can readily be seen, the 4 and 8% Pd/Carulite® catalysts which were calcined to 450° C. gave equivalent initial and 45 minute ozone conversions (ca. 62 and 60%, respectively). These results are equivalent to those of Carulite® alone under the identical test conditions. The 2 and 4% Pd catalysts which were calcined to 550° C. gave significantly lower conversions after 45 minutes (47%). This is attributed to a loss in surface area at the higher temperature of calcination. The 6% catalyst was also calcined to 550° C. but did not show quite as large of an activity drop.

TABLE IV

OZONE RESULTS (300 cpsi Honeycomb, 630,000/h Space Velocity) Pd on Carulite 200

| CATALYST | LOADING (g/in$^3$) | CONVERSION (%) Initial | CONVERSION (%) 45 Minutes |
|---|---|---|---|
| 4% Pd/Carulite (calcined 450° C.) | 1.8 | 64 | 59 |
| 8% Pd/Carulite (calcined 450° C.) | 2.0 | 61 | 60 |
| 2% Pd/Carulite (calcined 550° C.) | 2.1 | 57 | 48 |
| 4% Pd/Carulite (calcined 550° C.) | 1.9 | 57 | 46 |
| 6% Pd/Carulite (calcined 550° C.) | 2.3 | 59 | 53 |

Example 7

A series of tests were conducted to evaluate a variety of catalyst compositions comprising a palladium component to treat air containing 0.25 ppm ozone. The air was at ambient conditions (23° C.; 0.6% water). The compositions were coated onto 300 cell per inch ceramic (cordierite) flow through honeycombs at loadings of about 2 g of washcoat per cubic inch of substrate. The coated monoliths containing the various supported palladium catalysts were loaded into a 19 diameter stainless steel pipe, and the air stream was passed perpendicular to the open face of the honeycomb at a space velocity of 630,000/h. Ozone concentration was measured inlet and outlet of the catalyst. One alumina support used was SRS-II gamma alumina (purchased from Davison) characterized as described in Example 1 (surface area approximately 300 m$^2$/g). Also used was a low surface area theta alumina characterized by a surface area of approximately 58 m$^2$/g and an average pore radius of about 80 Angstrom. E-160 alumina is a gamma alumina characterized by a surface area of about 180 m$^2$/g and an average pore radius of about 47 Angstrom. Ceria used had a surface area about 120 m$^2$/g and an average pore radius of about 28 Angstrom. Also used was dealuminated Beta zeolite with a silica to alumina ratio of approximately 250 to 1 and a surface area about 430 m$^2$/g. Carbon, a microporous wood carbon characterized with a surface area of about 850 m$^2$/g, was also used as a support. Finally, a titania purchased from Rhone-Poulenc (DT51 grade) and characterized by a surface area of approximately 110 m$^2$/g was used as a support. Results are summarized in Table V which includes the relative weight percent of various catalyst components, the loading on the honeycomb, initial ozone conversion, and conversion after 45 minutes.

TABLE V

OZONE RESULTS - (300 cpsi Honeycomb, 630,000/h Space Velocity, 0.6% Water; ca. 0.25 ppm Ozone)

| CATALYST | LOADING (g/in$^3$) | CONVERSION (%) Initial | CONVERSION (%) 45 Minutes |
|---|---|---|---|
| I.W. 8% Pd/5% Mn/Al$_2$O$_3$ | 1.8 | 60 | 55 |

TABLE V-continued

OZONE RESULTS - (300 cpsi Honeycomb,
630,000/h Space Velocity,
0.6% Water; ca. 0.25 ppm Ozone)

| CATALYST | LOADING (g/in³) | CONVERSION (%) Initial | CONVERSION (%) 45 Minutes |
|---|---|---|---|
| I.W. 8% Pd/5% Mn/Low Surface Area Al₂O₃ | 1.9 | 64 | 60 |
| 8% Pd/Low Surface Area Al₂O₃ | 1.9 | 56 | 44 |
| 8% Pd/E-160 Al₂O₃ | 2.2 | 61 | 57 |
| 4.6% Pd/CeO₂ | 1.99 | 59 | 58 |
| 8% Pd/BETA Zeolite (dealuminated) | 1.9 | 38 | 32 |
| 5% Pd/C | 0.5 | 63 | 61 |
| 8% Pd/DT-51 TiO₂ | 1.8 | 39 | 20 |

Example 8

Following is a preparation of Carulite® slurry which includes vinyl acetate latex binder and is used in coating radiators which results in excellent adhesion of the catalyst to an aluminum radiator.

1000 g of Carulite® 200, 1500 g of deionized water, and 50 g of acetic acid (5% based on Carulite®) were combined in a 1 gallon ball mill and milled for 4 hours to a particle size 90% ≦ 7 µm. After draining the resulting slurry from the mill, 104 g (5% solids basis) of National Starch Dur-O-Set E-646 cross linking EVA copolymer (48% solids) was added. Thorough blending of the binder was achieved by rolling the slurry on a mill without milling media for several hours. Following coating of this slurry onto a piece of aluminum substrate (e.g., radiator), excellent adhesion (i.e., coating could not be wiped off) was obtained after drying for 30 minutes at 30° C. Higher temperatures of curing (up to 150° C.) can be utilized if desired.

Example 9

Figure 5:
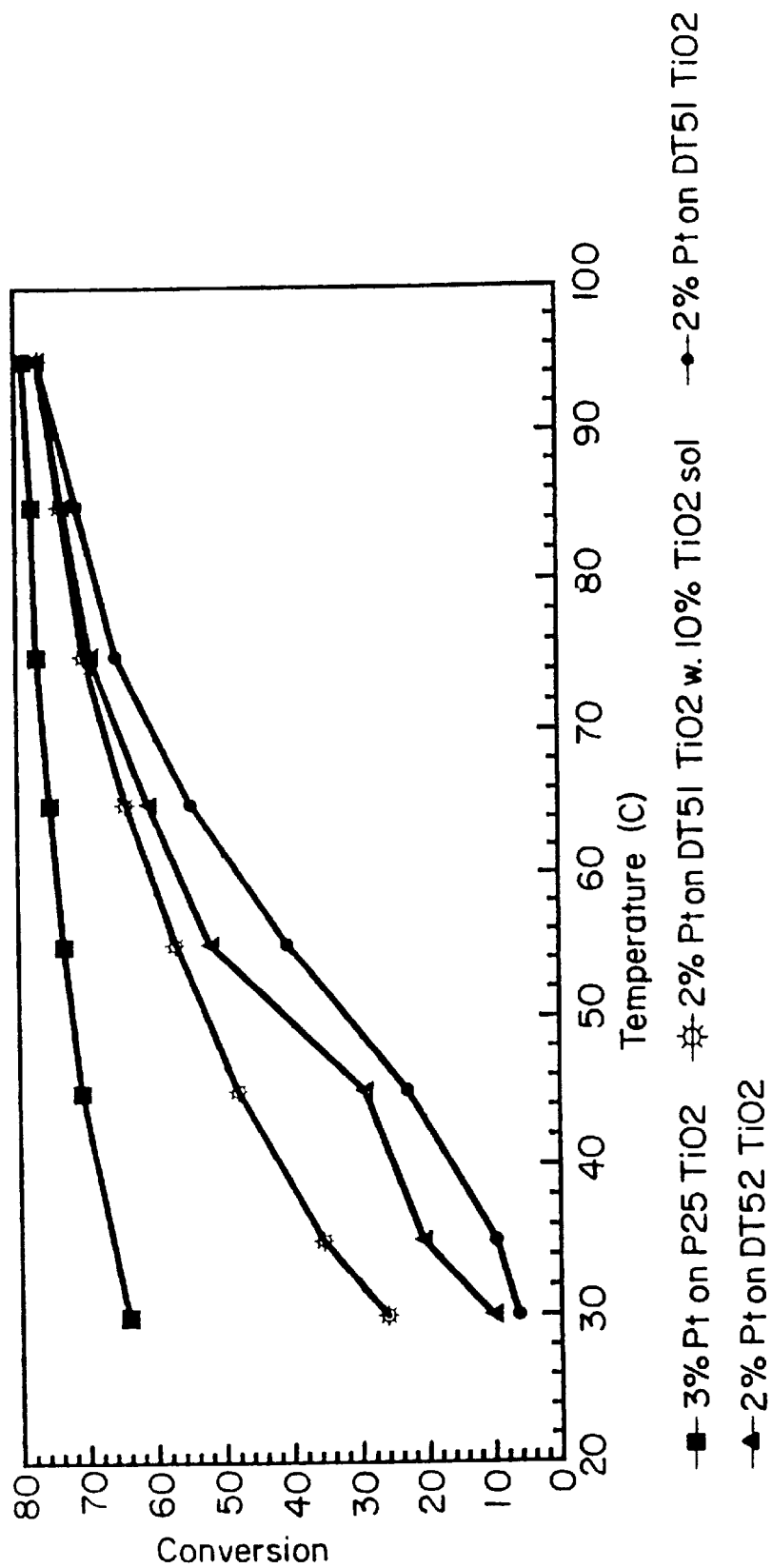

Carbon monoxide conversion was tested by coating a variety of titania supported platinum compositions onto ceramic honeycombs as described in Example 6. Catalyst loadings were about 2 g/in³, and testing was conducted using an air stream having 16 ppm carbon monoxide (dew point 35° F.) at a space velocity of 315,000/h. The catalyst compositions were reduced on the honeycomb using a forming gas having 7% $H_2$ and 93% $N_2$ at 300° C. for 3 hours. Compositions containing $TiO_2$ included 2 and 3 weight percent platinum component on P25 titania; and 2 and 3 weight percent platinum component on DT51 grade titania. DT51 grade titania was purchased from Rhone-Poulenc and had a surface area of about 110 m²/g. Alternatively, DT52 grade titania, a tungsten containing titania from Rhone-Poulenc which also has a surface area of about 110 m²/g can be used. P25 grade titania was purchased from Degussa and was characterized as having a particle size of approximately 1 µm and a surface area of about 45–50 m²/g. Results are illustrated in FIG. 5.

Example 10

Figure 6:
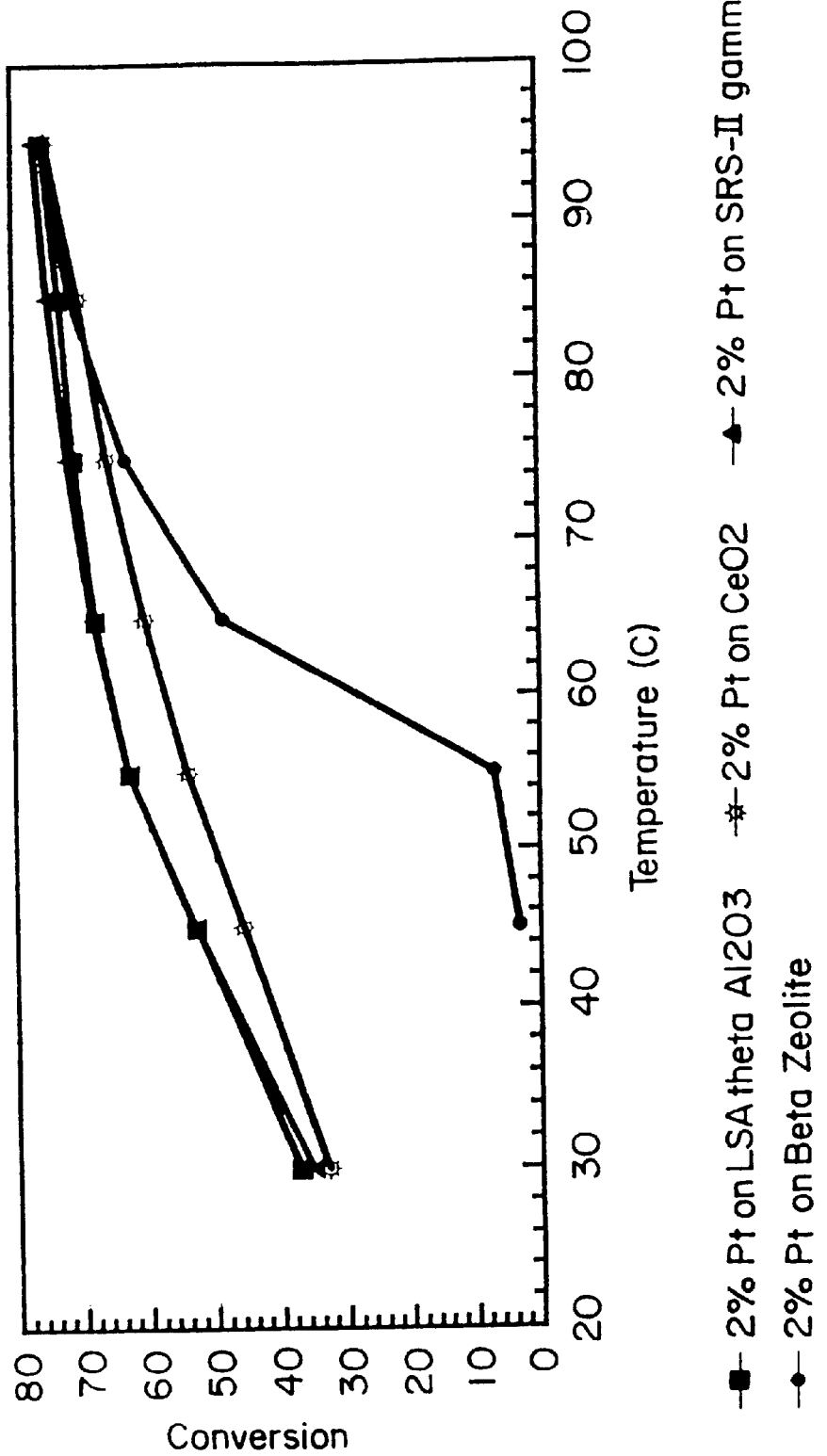

Example 10 relates to the evaluation of CO conversion for compositions containing alumina, ceria and zeolite. The supports were characterized as described in Example 7. Compositions evaluated included 2 weight percent platinum on low surface area theta alumina; 2 weight percent platinum on ceria; 2 weight percent platinum on SRS-II gamma alumina, and 2 weight percent platinum on Beta zeolite. Results are illustrated in FIG. 6. The catalyst compositions were reduced.

Example 11

CO conversion was measured v. temperature for compositions containing 2 weight percent platinum on SRS-II gamma alumina and on ZSM-5 zeolite which were coated onto a 1993 Nissan Altima radiator as recited in Example 4 and tested using the same procedure to test CO as used in Example 4. Results are illustrated in FIG. 4.

Example 12

Figure 7:
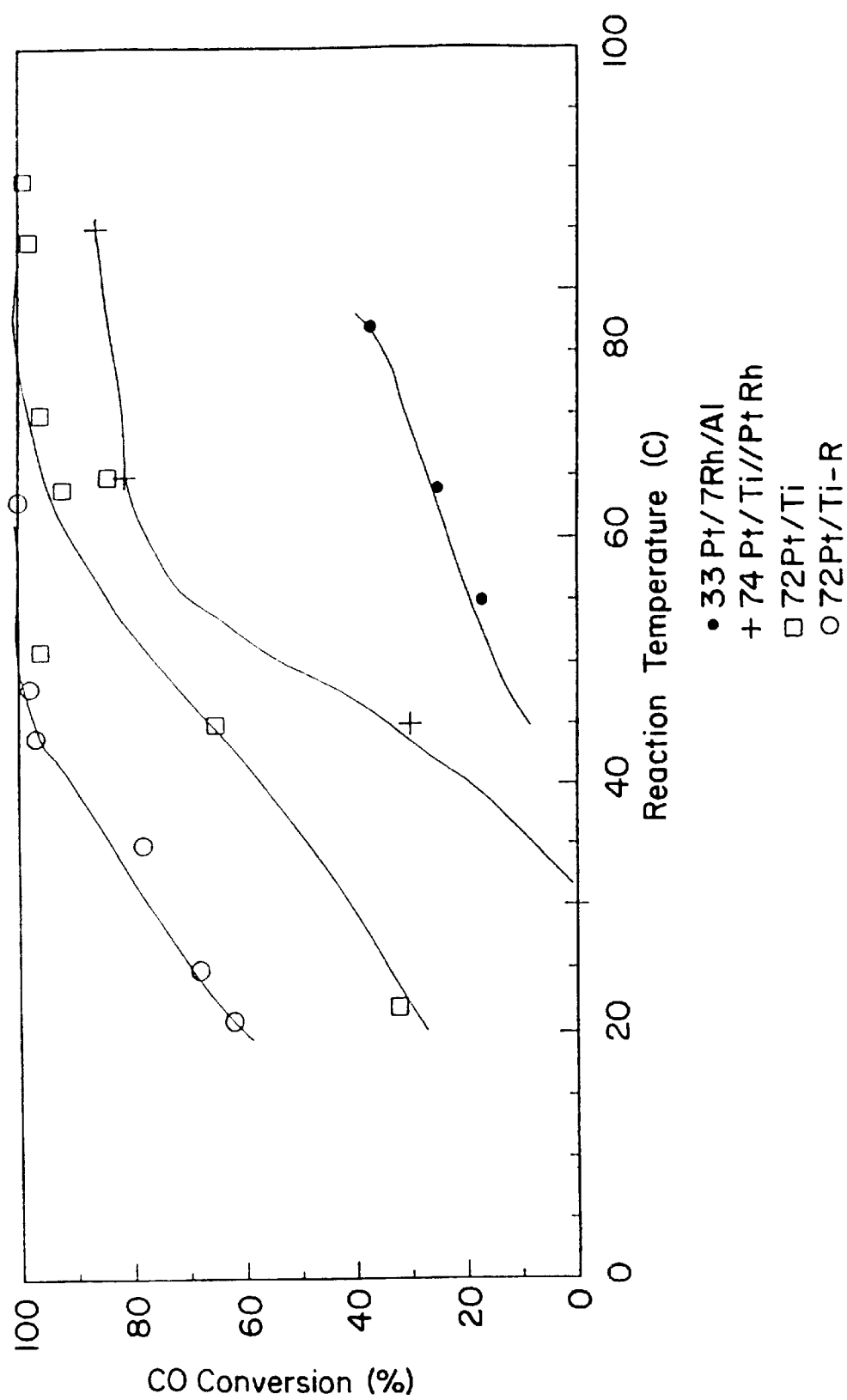

0.659 g of a solution of amine solubilized platinum hydroxide solution having 17.75 weight percent platinum (based on metallic platinum) was slowly added to 20 g of an 11.7 weight percent aqueous slurry of a titania sol in a glass beaker and stirred with a magnetic stirrer. A one-inch diameter by one-inch long 400 cells per square inch (cpsi) metal monolith was dipped into the slurry. Air was blown over the coated monolith to clear the channels and the monolith was dried for three hours at 110° C. At this time, the monolith was redipped into the slurry once again and the steps of air blowing the channels and drying at 110° C. was repeated. The twice coated monolith was calcined at 300° C. for two hours. The uncoated metal monolith weighed 12.36 g. After the first dipping, it weighed 14.06 g, after the first drying 12.6 g, after the second dipping 14.38 g and after calcination weighed 13.05 g indicating a total weight gain of 0.69 g. The coated monolith had 72 g/ft³ of platinum based on the metal and is designated as 72Pt/Ti. The catalyst was evaluated in an air stream containing 20 ppm carbon monoxide at a gas flow rate of 36.6 liters per minute. After this initial evaluation the catalyst core was reduced in a forming gas having 7% hydrogen and 93% nitrogen at 300° C. for 12 hours and the evaluation to treat an air stream containing 20 ppm carbon monoxide was repeated. The reduced coated monolith as designated as 72Pt/Ti/R. The above recited slurry was then evaluated using a core from a ceramic monolith having 400 cells per square inch (cpsi), which was precoated with 40 g per cubic foot, of 5:1 weight ratio of platinum to rhodium plus 2.0 g per cubic inch of ES-160 (alumina) and the core had 11 cells by 10 cells by 0.75 inches long monolith and designated as 33Pt/7Rh/Al was dipped into the above recited slurry and air blown to clean the channels. This monolith was dried at 110° C. for three hours and calcined at 300° C. for two hours. The catalyst substrate including the first platinum and rhodium layer weighed 2.19 g. After the first dip it weighed 3.40 g and after calcination 2.38 g showing a total weight gain of 0.19 g which is equal to 0.90 g per cubic inch of the platinum/titania slurry. The dipped ceramic core contained 74 per cubic foot of platinum based on the platinum metal and designated as 74Pt/Ti//Pt/Rh. Results are illustrated in FIG. 7.

Example 13

A platinum on titanium catalyst as described in the above referenced Example 12 was used in an air stream containing 4 ppm propane and 4 ppm propylene, at a space velocity of 650,000 shsv. The platinum and titanium catalyst had 72 g of platinum per cubic foot of total catalyst and substrate used. It was evaluated on the ceramic honeycomb as recited in Example 13. The measured results for propylene conversion were 16.7% at 65° C.; 19% at 70° C.; 23.8% at 75° C.; 28.6% at 80° C.; 35.7t at 85° C.; 40.5% at 95° C. and 47.6% at 105° C.

Example 14

Example 14 is an illustration of a platinum component on a titania support. This Example illustrates the excellent activity of platinum supported on titania for carbon monoxide and hydrocarbon oxidation. The evaluation was carried out using a catalyst prepared from a colloidal titania sol to form a composition comprising 5.0 weight percent platinum component based on the weight of the platinum metal and titania. The platinum was added to titania in the form of amine solubilized platinum hydroxide solution. It was added to colloidal titania slurry or into titania powders to prepare a platinum and titania containing slurry. The slurry was coated onto a ceramic monolith having 400 cells per square inch (cpsi). Samples had coating amounts varying from 0.8–1.0 g/in. The coated monoliths were calcined for 300° C. for 2 hours in the air and then reduced. The reduction was carried out at 300° C. in a gas containing 7% hydrogen and 93% nitrogen for 12 hours. The colloidal titania slurry contained 10% by weight titania in an aqueous media. The titania had a nominal particle size of 2–5 nm.

Carbon monoxide conversion was measured in an air stream containing 20 ppm CO. The flow rate of the carbon monoxide in various experiments range from space velocities of 300,000 VHSV to 650,000 VHSV at a temperature between ambient to 110° C. The air used was purified air from an air cylinder and where humidity was added the air was passed through a water bath. Where humidity was studied the relative humidity was varied from 0–100% humidity at room temperature (25° C.). The carbon monoxide containing air stream was passed through the ceramic monolith coated with the catalyst compositions using a space velocity of 650,000/h.

Figure 8:
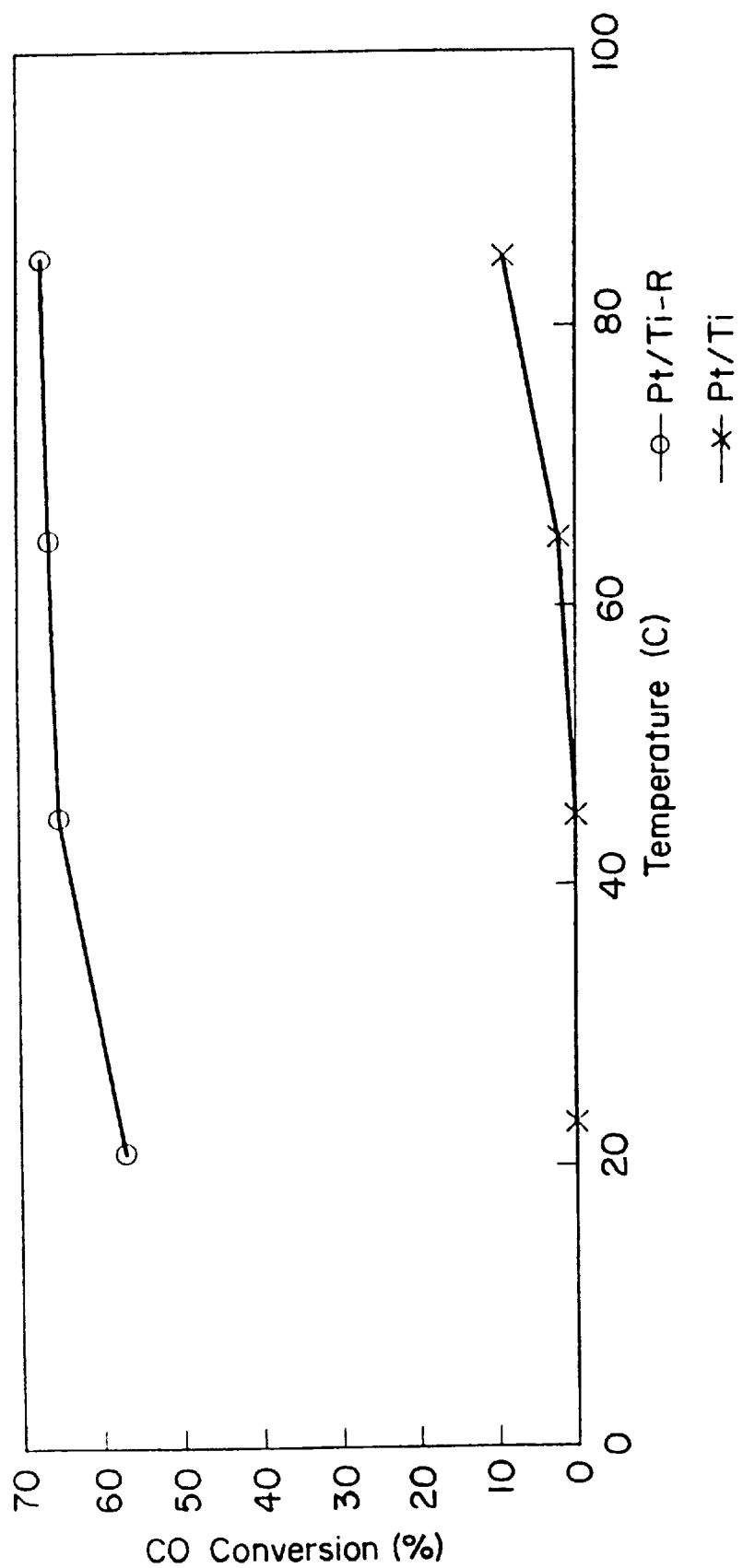

FIG. 8 represents a study using air with 20 ppm CO having to measure carbon monoxide conversion v. temperature comparing platinum supported on titania which has been reduced (Pt/Ti-R) at 300° C. using a reducing gas containing 7% hydrogen and 93% nitrogen for 12 hours as recited above with a non reduced platinum supported on titania catalyst (Pt/Ti) coating. FIG. 8 illustrates a significant advantage when using a reduced catalyst.

Figure 9:
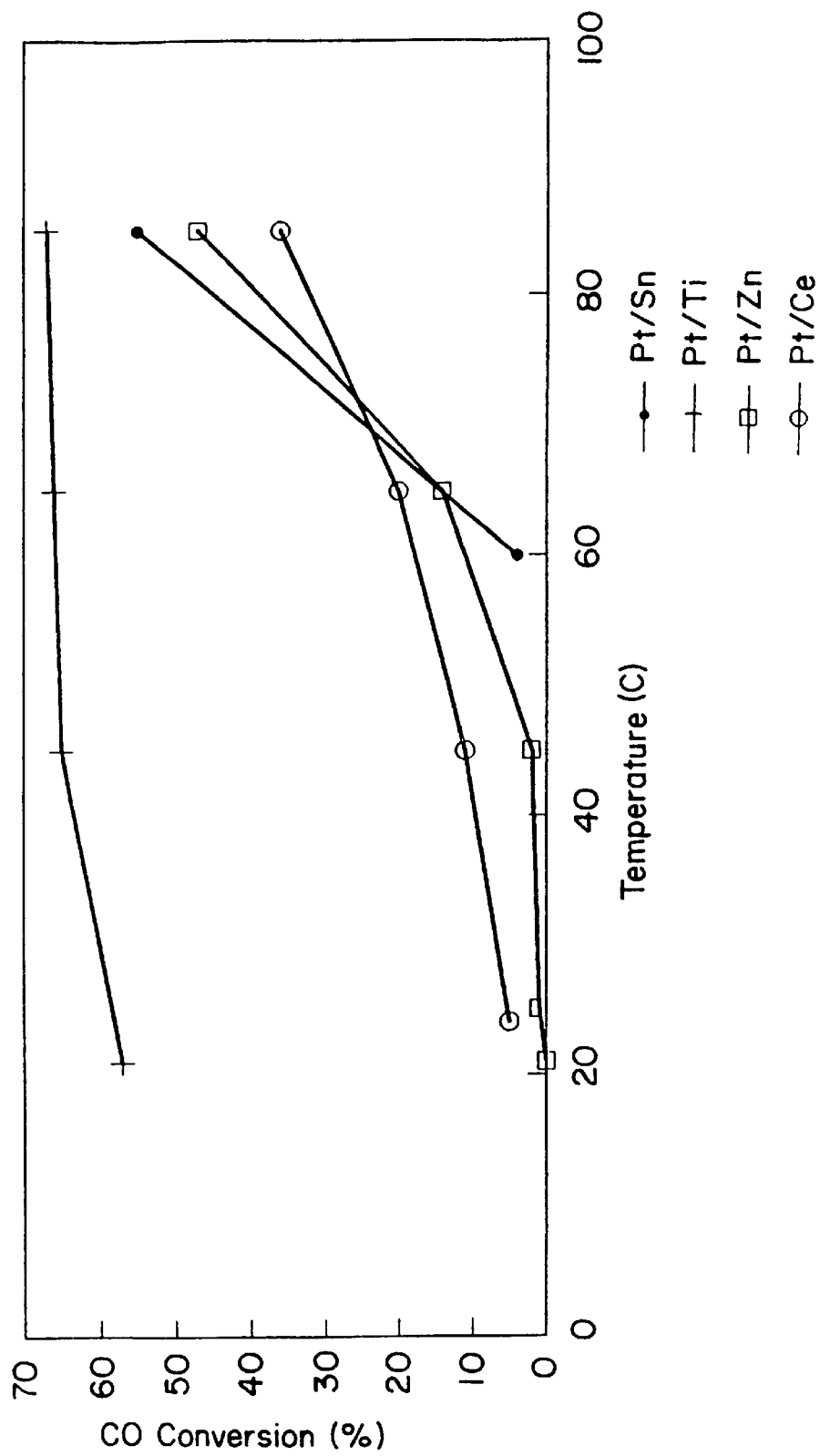

FIG. 9 illustrates a comparison of platinum on titania which has been reduced with varying supports including platinum on tin oxide (Pt/Sn), platinum on zinc oxide (Pt/Zn) and platinum on ceria (Pt/Ce) for comparative sake. All of the samples were reduced at the above indicated conditions. The flow rate of carbon monoxide in the air was 650,000 shsv. As can be seen, the reduced platinum on colloidal titania had significantly higher conversion results than platinum on the various other support materials.

Figure 10:
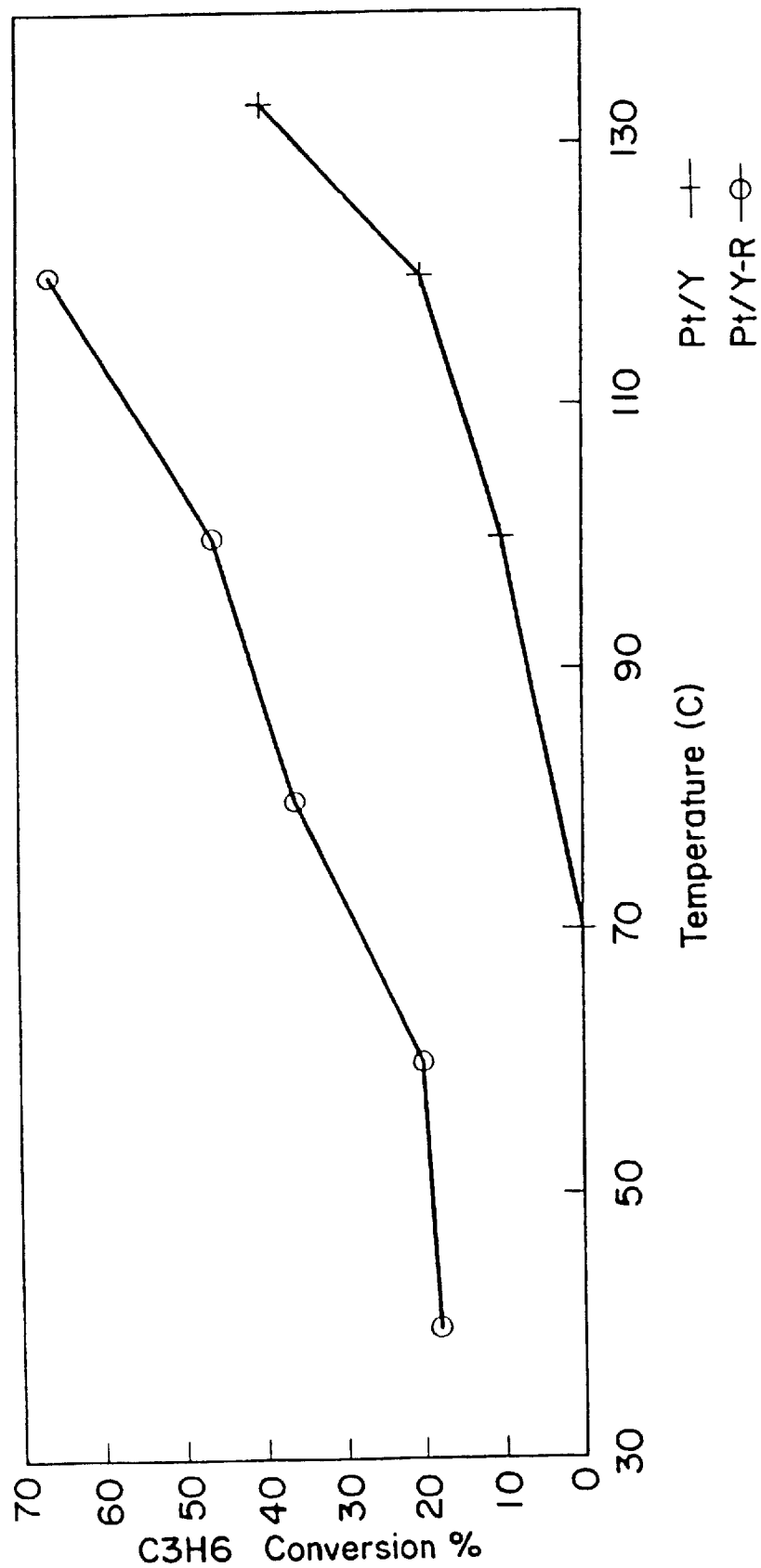
FIG. 10 is a plot of propylene conversion versus temperature based on Example 14.

Hydrocarbon oxidation was measured using a 6 ppm propylene/air mixture. The propylene/air stream was passed through the catalyst monolith at a space velocity of 300,000 vhsv at a temperature which varied from room temperature to 110° C. Propylene concentration was determined using a flame ionized detector before and after the catalyst. The results are summarized in FIG. 10. The support used was 5% by weight based on the weight of platinum metal and yttrium oxide $Y_2O_3$. The comparison was between reduced and non reduced catalyst. As shown in FIG. 10 reducing the catalyst resulted in a significant improvement in propylene conversion.

Figure 11:
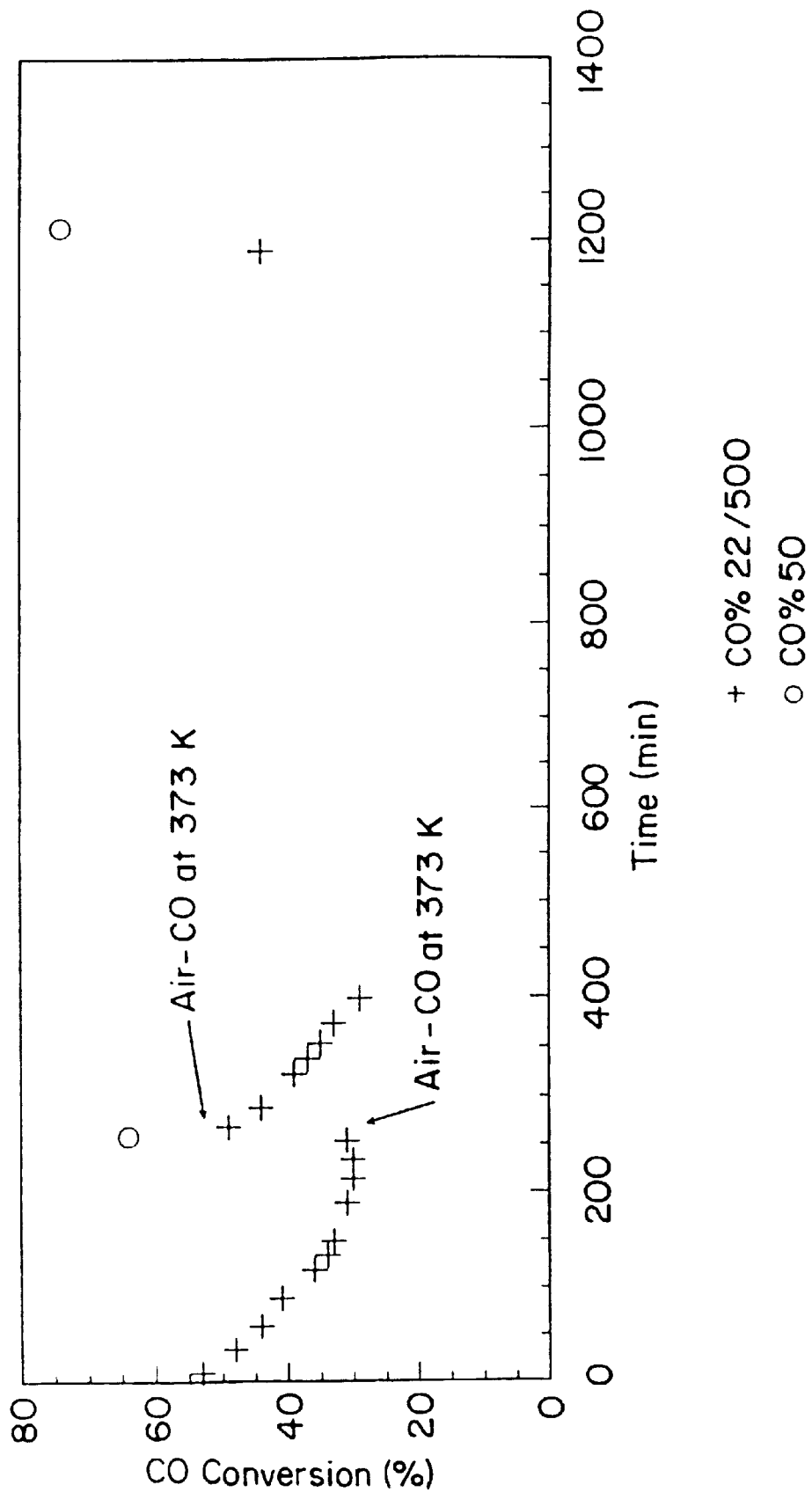

The above recited platinum supported on titania catalyst was reduced in a forming gas containing 7% hydrogen and 93% nitrogen at 500° C. for 1 hour. The conversion of carbon monoxide was evaluated in 0 percent relative humidity air at a flow rate of 500,000 vhsv. The evaluation was conducted to determine if the reduction of the catalyst was reversible. Initially, the catalyst was evaluated for the ability to convert carbon monoxide at 22° C. As shown in FIG. 11, the catalyst initially converted about 53% of the carbon monoxide and dropped down to 30% after approximately 200 minutes. At 200 minutes the air and carbon monoxide was heated to 50° C. and carbon monoxide conversion increased to 65%. The catalyst was further heated to 100° C. in air and carbon monoxide and held at 100° C. for one hour, and then cooled in air to room temperature (about 25° C.). Initially, the conversion dropped to about 30% in the period from about 225–400 minutes. The evaluation was continued at 100° C. to 1200 minutes at which time conversion was measured at about 40%. A parallel study was conducted at 50° C. At about 225 minutes the conversion was about 65%. After 1200 minutes, the conversion actually rose to about 75%. This Example shows that reduction of the catalyst permanently improves the catalysis activity.

Example 15

Example 15 is used to illustrate ozone conversion at room temperature for platinum and/or palladium components supported on a manganese oxide/zirconia coprecipitate. This Example also shows a platinum catalyst which catalyzes the conversion of ozone to oxygen and, at the same time, oxidize carbon monoxide and hydrocarbons. Manganese oxide/zirconia mixed oxide powders were made having 1:1 and 1:4 weight based on Mn and Zr metals. The coprecipitate was made in accordance with the procedure disclosed in U.S. Pat. No. 5,283,041 referenced above. 3% and 6% Pt on manganese/zirconia catalysts (1:4 weight basis of Mn to Zr) were prepared as described in Example 4. SBA-150 gamma alumina (10% based on the weight of the mixed oxide powder) was added as a binder in the form of a 40% water slurry containing acetic acid (5% by weight of alumina powder) and milled to a particle size 90%<10 µm. The 6% weight percent Pd catalyst was prepared by impregnating manganese/zirconia frit (1:1 weight basis of Mn to Zr) to the point of incipient wetness with a water solution containing palladium tetraamine acetate. After drying and then calcining the powder for two hours at 450° C., the catalyst was mixed in a ball mill with Nalco #1056 silica sol (10% by weight of catalyst powder) and enough water to create a slurry of approximately 35% solids. The mixture was then milled until the particle size was 90%<10 µm. Various samples were reduced using a forming gas having 7% $H_2$ and 93% $N_2$ at 300° C. for 3 hours. Evaluations were conducted to determine the conversion of ozone on coated radiator minicores from a 1993 Altima radiator which were approximately ½ inch by ⅞ inch by 1 inch deep. The evaluation was conducted at room temperature using a one-inch diameter stainless steel pipe as described in Example 7 with house air (laboratory supplied air) at a 630,000/h space velocity with an inlet ozone concentration of 0.25 ppm. Results are provided on Table VI.

TABLE VI

SUMMARY OF FRESH ACTIVITY OZONE RESULTS - 
(39 cpsi Nissan 
Altima core, 630,000/h Space Velocity; 25° C.; 
0.25 ppm ozone; House air - ca. 0.6% water)

| CORE NO. | CATALYST | LOADING (g/in³) | CONV. (%) Initial | CONV. (%) 45 Minutes |
|---|---|---|---|---|
| 1 | 3% Pt/MnO₂/ZrO₂ (1:4) (calcined at 450° C.) | 0.7 | 70.7 | 65.8 |
| 2 | 3% Pt/MnO₂/ZrO₂ (1:4) (calcined at 450° C.; reduced at 300° C.) | 0.7 | 70.5 | 63.7 |
| 3 | 6% Pt/MnO₂/ZrO₂ (1:4) (calcined at 450° C.) | 0.68 | 68.2 | 62.3 |

TABLE VI-continued

SUMMARY OF FRESH ACTIVITY OZONE RESULTS -
(39 cpsi Nissan
Altima core, 630,000/h Space Velocity; 25° C.;
0.25 ppm ozone; House air - ca. 0.6% water)

| CORE NO. | CATALYST | LOADING (g/in³) | CONV. (%) Initial | CONV. (%) 45 Minutes |
|---|---|---|---|---|
| 4 | 6% Pt/MnO₂/ZrO₂ (1:4) (calcined 450° C.; reduced at 300° C.) | 0.66 | 66 | 55.8 |
| 5 | 6% Pd/MnO₂/ZrO₂ (1:1) w. 10% Nalco 1056 | 0.39 | 38.3 | 21.1 |
| 6 | MnO₂/ZrO₂ (1:1) w. 10% Nalco 1056 | 0.41 | 58.3 | 44.9 |
| 7 | MnO₂/ZrO₂ (1:1) w. 10% Nalco 1056 | 0.37 | 55.8 | 41.2 |
| 8 | 3% Pt/ZrO₂/SiO₂ (calcined 450° C.) | 0.79 | 27.4 | 10 |
| 9 | 3% Pt/ZrO₂/SiO₂ (calcined 450° C. and reduced at 300° C.) | 0.76 | 54.2 | 30.1 |

As can be seem from Table VI Cores 1 and 2 having only 3% platinum resulted in excellent ozone conversion initially and after 45 minutes both for reduced and unreduced catalyst. Cores 3 and 4 having a 6% platinum concentration also had excellent results. Cores 5–7 illustrate a variety of other support materials used which resulted in conversion of ozone. Core 5 had palladium on a manganese oxide/zirconia coprecipitate and resulted in lower than expected but still significant ozone conversion. Cores 6 and 7 used the coprecipitate without precious metal and also resulted in significant ozone conversions but here again not as good as when using platinum as a catalyst. Core 8 was platinum on a zirconia/silica support which was calcined but not reduced and Core 9 was platinum on zirconia/silica support which was reduced. Both Cores 8 and 9 gave some conversion but yet not as good as the conversion obtained with platinum on the coprecipitate.

Figure 12:
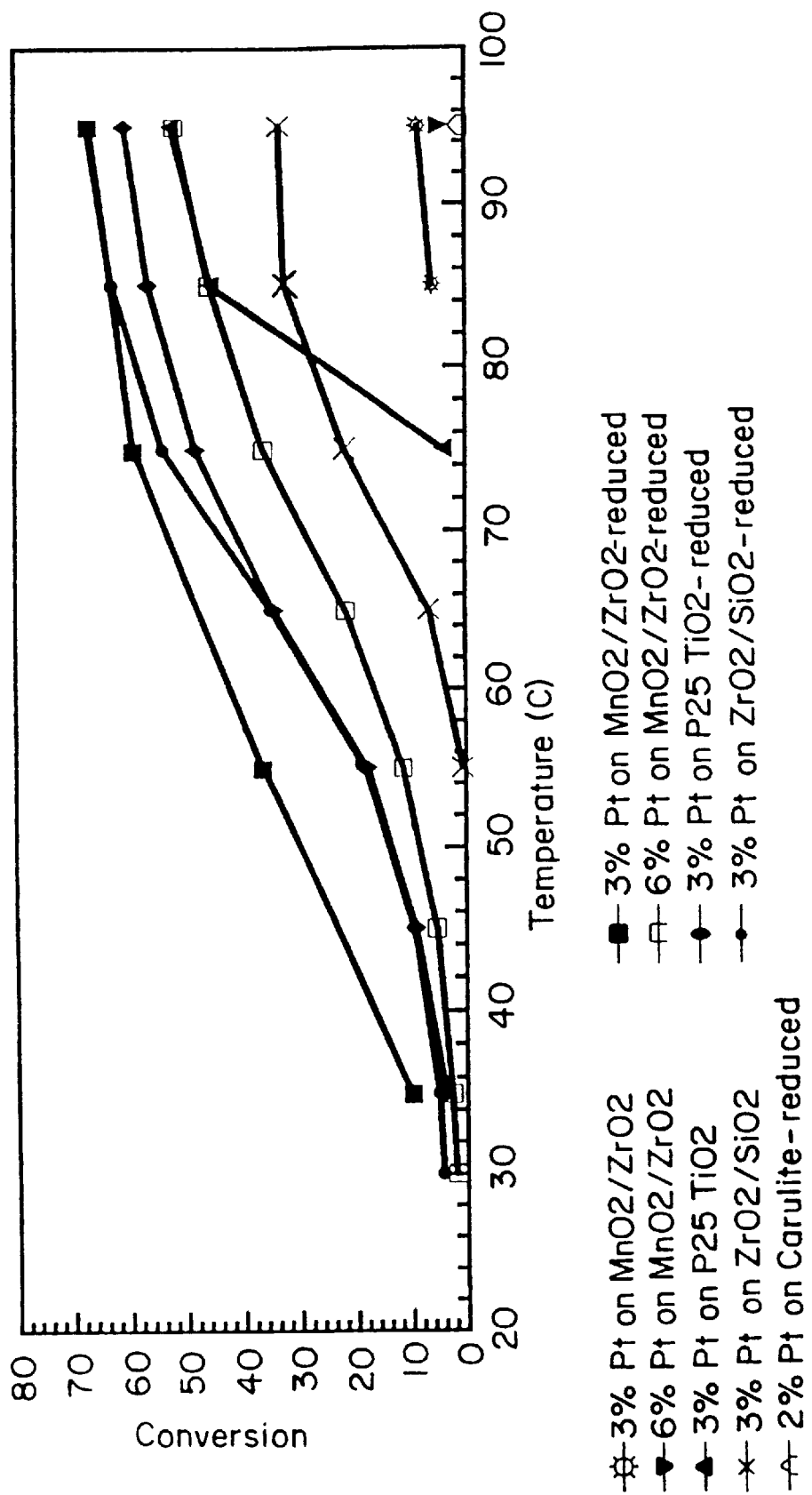

In addition, carbon monoxide conversion was evaluated on 39 cpsi radiator minicores, as recited, for 3% and 6% platinum on manganese/zirconia supports. Reduced and unreduced samples were evaluated. For illustrative purposes, platinum on zirconia/silica supports and platinum on Carulite® reduced and unreduced are also presented. As can be seen from FIG. 12, the results of 3% reduced platinum on manganese/zirconia support were higher when compared to the other embodiments.

Example 16 (Comparative)

Ozone conversion was measured over an uncoated 1995 Ford Contour radiator at room temperature and 80° C. by blowing an air stream containing ozone (0.25 ppm) through the radiator channels at a 10 mph linear velocity (630,000/h space velocity) and then measuring the concentration of ozone exiting the back face of the radiator. The air stream had a dew point of approximately 35° F. Heated coolant was not circulated through the radiator, but the air stream was heated as necessary with heating tape to achieve the desired radiator temperature. Additional testing was completed with an uncoated 0.75" (L)×0.5" (W)×1.0" (D) Ford Taurus radiator "mini-core" in a 1" diameter stainless steel pipe as described in Example 7. The air stream was heated with heating tape to achieve the desired radiator temperature. For both tests, no decomposition of ozone was observed up to 120° C.

Example 17

Figure 13:
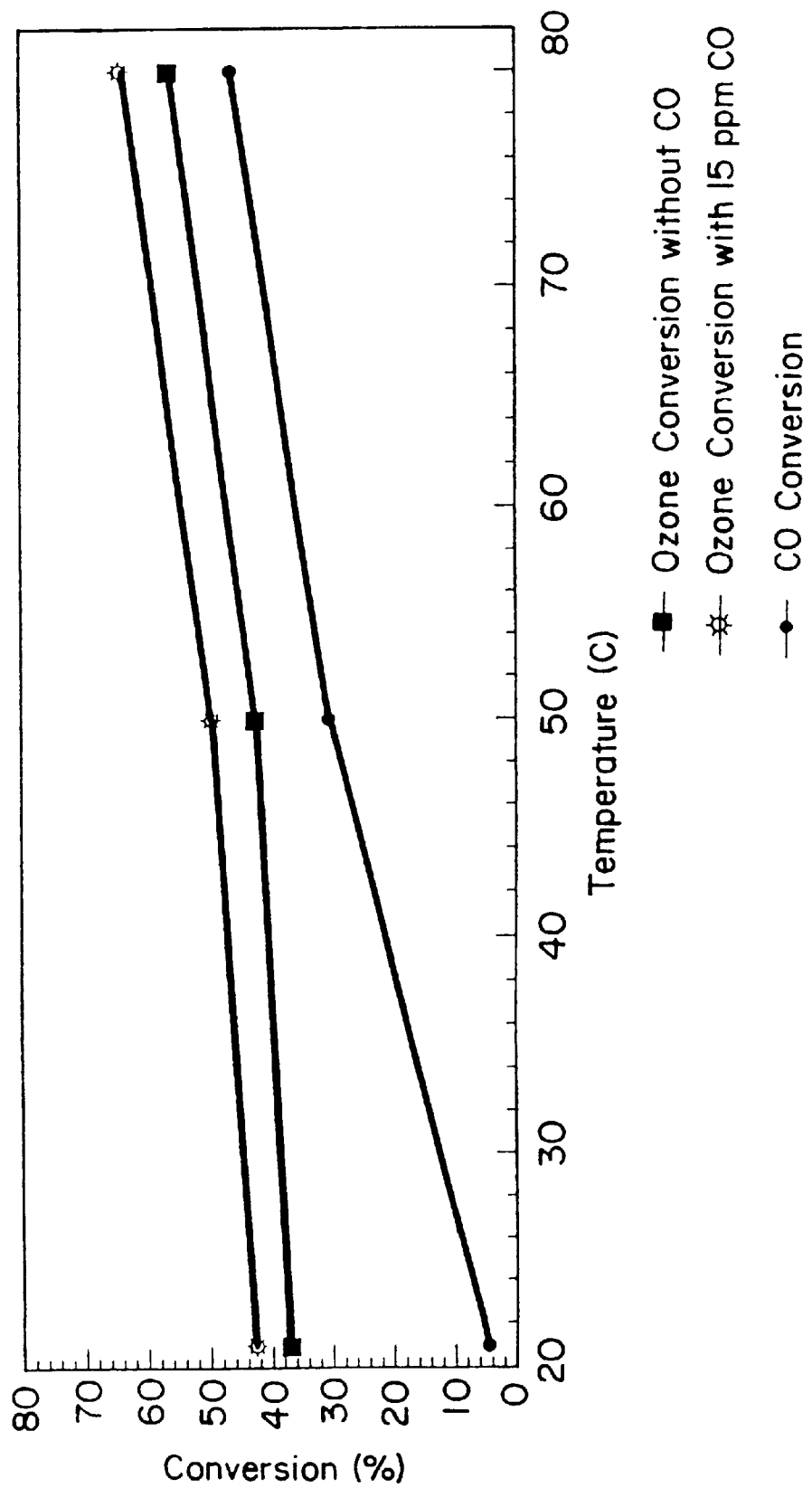
FIG. 13 is a plot of ozone conversion versus temperature based on Example 17.

Ozone conversion was measured at various temperatures for a reduced 3% Pt/TiO₂ catalyst in the absence and in the presence of 15 ppm CO. Degussa P25 grade titania was used as the support and was characterized as having a particle size of approximately 1 μm and a surface area of ca. 45–50 m²g. The catalyst was coated onto a 300 cpsi ceramic (cordierite) honeycomb and was reduced on the honeycomb using a forming gas having 7% H₂ and 93% N₂ at 300° C. for 3 hours. Testing was accomplished as described previously in Example 7. The air stream (35° F. dewpoint) was heated with heating tape to achieve the desired temperature. As can be seen in FIG. 13, an approximate 5% enhancement in absolute ozone conversion was observed from 25 to 80° C. The presence of CO improves the conversion of ozone.

Example 18

Figure 14:
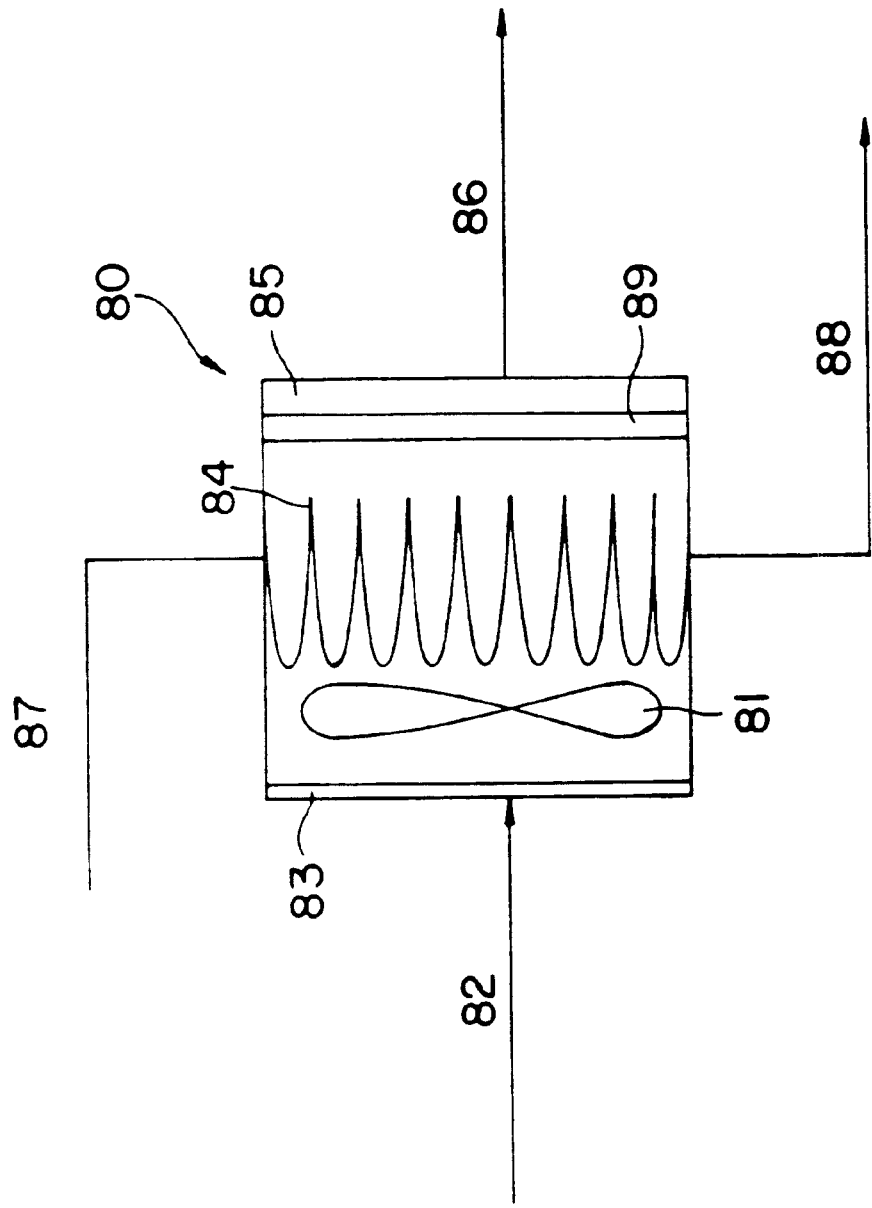
FIG. 14 is a schematic representation of a test model air conditioning condenser.

To demonstrate the effectiveness of the process of the present invention in reducing atmospheric pollutant levels, a test model air conditioning condenser was set up as shown schematically in FIG. 14. In this test, the catalytic conversion of ozone to molecular oxygen was measured. However, it should be recognized that similar catalytic conversions of other pollutants can be similarly conducted using the appropriate catalysts. The action of fan 81 draws a stream of ambient air 82 into air conditioning condenser unit 80 through grill 83. The air passes over a condenser coil 84 before exiting through grill 85 as outlet air stream 86. A refrigerant enters coil 84 as vapor stream 87 and exits as condensate stream 88.

Test samples of catalysts can either be applied directly to coil 84, or applied to a separate pollutant treating device 89 mounted downstream of the condenser coil. Details of the actual test unit are set forth below in Table VII.

TABLE VII

Condenser Coil Equipment Specification

| | |
|---|---|
| Nominal duty rating | 20 Ton |
| Trane model number | CAUC-C20 |
| Gross Heat rejection | 301,000 BTU/h |
| Condenser fan data: | |
| Number/size/type | 2/26"/propeller |
| Fan drive | direct |
| No. of motors/Hp each | 2/1.0 |
| Nominal total CFM | 12,400 |
| Condenser coil data: | |
| No./size (in.) | 1/63 × 71 |
| Metal tube/fin | copper/aluminum |
| Face area (ft²) | 31.0 |
| Rows/fins per foot | 3/168 |
| Fin thickness (in.) | 0.01 |
| Coil depth (in.) | 2.75 |
| General data: | |
| No. of refrig. circuits | 1 |
| Operating charge, R22 | 25 lbs. |
| Std. ambient range | 40–115° F. |
| Unit dimensions | 88"W × 60"D × 68"H |

Test coatings of ozone destruction catalysts were spray coated onto the coil of the condenser unit in three 12"×12" square patches. The catalysts used were Carulite and Pd/Mn/Al₂O₃ (see Example 3, above). Two patches of Carulite catalyst were applied at two different loadings, 0.3 and 0.6 g/in³, while only a single patch of the palladium catalyst was applied at 0.3 g/in³. The Carulite contained a proprietary latex binder from National Starch, although other binders have since been found to provide suitable adhesion, as discussed above. The palladium catalyst had no binder. During operation of the air conditioner, inlet and outlet condenser air temperatures averaged approximately 35° C. and 45° C., respectively. Fin temperature on the outlet side of the coil was typically only a few degrees higher than the exhaust temperature. Air velocity on the front face of the coil (2.5" deep) was approximately 300 ft/min, and this correlates to an hourly space velocity of about 86,400/h.

The three catalyst patches were applied to the condenser after assembly, and the unit was then installed on the roof of a building. However, the condenser was at no time removed from its mounting frame. The unit was stood on its end so that the coolant tubes ran vertically and the corresponding cooling fins ran horizontally. Prior to coating with catalyst, the fins were steam cleaned to remove residual oils from the surface which could detrimentally affect washcoat adhesion. After drying, the 12"×12" sections to be coated with catalyst were first spray coated with a thin precoat of alumina (loading 0.1 g/in$^3$ of condenser volume) to aid in adhesion of the catalyst washcoat to the metal fin surface. After drying with a forced air flow at about 40° C., the catalyst coatings were then applied by spraying over the alumina precoats. Drying was accomplished at about 40° C. with forced air flow.

Spray coating of the catalyst and alumina precoat was accomplished using a Binks High Volume Low Pressure (HVLP) 2.5 gallon paint spray system (Model 39-20) equipped with an Accuspray Series 10 spray gun. The system allowed for delivery of liquid slurry to the gun nozzle, where atomization by high velocity air occurs. The liquid and air delivery pressures were controlled separately. The spray pattern was adjusted to give a vertical spray of roughly 1 inch width when the gun was held about 3 inches from the condenser face. Freshly mixed slurry was added to the 2.5 gallon canister which was pressurized to 10 psig. The atomization air line was pressurized to 70 psig. The canister was then placed on a balance to record slurry weight loss while spraying. In this way, a controlled amount of slurry could be metered onto the condenser coils. This amount was in turn calculated from the desired catalyst loading and the solids content of the particular slurry. One half of the slurry was sprayed onto the front face of the coil, while the other half was sprayed onto the back face. The gun was held approximately 1–2 inches from the face of the condenser, which allowed for good penetration of slurry into the interior of the coil without being blown out the back side. The slurry was applied at a rate of 5 g every 3–5 seconds. This allowed application of thinner, more uniform coats. Immediately after addition of the desired amount of slurry to each side, the patch was thoroughly air-knifed to unblock any clogged louvers and to more evenly distribute the catalyst in the condenser interior.

This same coating technique was used to spray additional catalyst patches in-situ onto the condenser coil after the unit was installed on the building roof. In this case, the unit could not be stood on its end, and thus the coolant tubes ran horizontally while the fins ran vertically.

Figure 15:
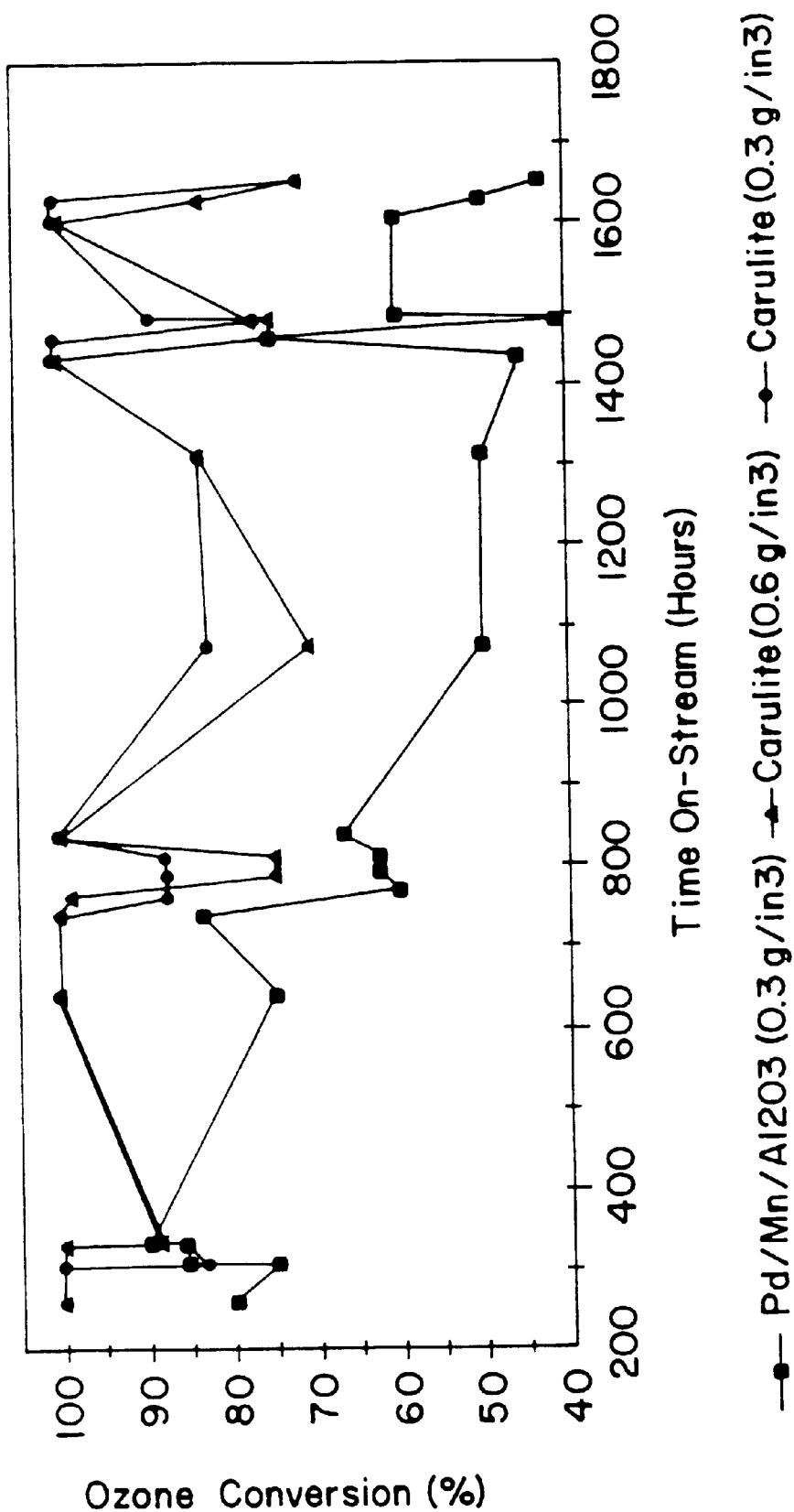
FIG. 15 is a graph showing ozone conversion versus time for three catalyst test patches.

Ozone conversion vs. time for the three catalyst patches is summarized in the graph presented as FIG. 15. For reference, the calculated mass transfer conversion limit is approximately 90%. Ozone conversion is expressed as percent of the ambient ozone converted to $O_2$. As is readily apparent, the Carulite patches gave consistently higher ozone conversion than the Pd/Mn/Al$_2$O$_3$ patch. The Carulite patches also appear to have held up better over time.

An OREC Model O3DM-100 analyzer was used to measure ozone levels. Because the detection limit on this analyzer is 10 ppb, the corresponding error in the conversion calculations is about ±10% at 100 ppb, and about ±20% at 50 ppb. Despite this large error window, it appeared that over 1300 hours some deactivation in catalytic activity had occurred, particularly for the palladium sample. Since no definitive correlation of activity with absolute humidity or ozone concentration was observed, a likely cause for the loss in activity was the accumulation of dirt and other non-gaseous contaminants on the catalyst and resultant physical masking of the catalytic sites. While the exhaust face of the condenser still looked very clean, the inlet face showed a significant accumulation of dirt which masked the original color of the catalysts. Best results were obtained using Carulite catalyst, which generally showed a consistent conversion above 90% during the first 700 hours, and above 70% for the duration of the test. The palladium catalyst showed a conversion above 70% for the first 700 hours, but then fell off to about 50% at 1100 hours, and below 50% at 1400 hours.

At approximately 1400 hours, the test patches on the condenser were washed with a water spray to remove the accumulated dust. Test results showed a temporary improvement in ozone conversion, followed by a rapid return to pre-wash values. It is believed that the wash procedure was not effective in removing the contaminants which were reducing the conversion rates. This suggests that a better rejuvenation technique is needed, or that a filter should be provided upstream of the catalyzed surface to protect the surface from dust and other non-gaseous contaminants.

Example 19

Metal Foam Insert

As discussed above in regard to FIG. 1, a separate treatment device, such as device 25, can be used to treat a pollutant such as ozone. Treatment cartridge 27 is described as being of any suitable material such as a pad, frame or screen coated with a catalyst or adsorbent material. The present example is directed to a metal foam insert which can be used as a removable treatment cartridge for catalyzing ozone conversion. A one-inch diameter, 0.5 inch deep piece of aluminum foam (Duocel, 10 pores per inch) was coated with Carulite 200 by dipping the piece in a slurry containing Carulite 200, 5% acetic acid (based on the weight of Carulite 200), and 5% DUR-O-SET E-646 EVA polymer binder (also based on the weight of Carulite 200). The piece was blown with an air knife to remove excess slurry and then dried at 90° C. for 30 minutes. The dry catalyst loading was 0.22 g/in$^3$ of metal foam volume. The catalyst was tested for ozone conversion at room temperature by placing the piece in a one-inch diameter stainless steel tube and then passing an air stream containing 0.1% water and 0.25 ppm ozone through it. Ozone concentration was measured before and after the catalyst using an OREC O3DM-100 ozone analyzer. The flow rate was 67.6 L/min which corresponds to an hourly space velocity of 630,000/h. Ozone conversion after 45 minutes was 27.3%.

Example 20

100 g of Versal GL alumina obtained from LaRoche Industries Inc. was impregnated with about 28 g of Pt amine hydroxide (Pt(A)salt) diluted in water to about 80 g of solution. 5 g of acetic acid was added to fix the Pt onto the alumina surface. After mixing for half hour, the Pt impregnated catalyst was made into a slurry by adding water to make about 40% solids. The slurry was ballmilled for 2 hours. The particle size was measured to be 90% less than 10 microns. The catalyst was coated onto a 1.5" diameter by 1.0" length 400 cpsi ceramic substrate to give a washcoat loading after drying of about 0.65 g/in$^3$. The catalyst was then dried at 100° C. and calcined at 550° C. for 2 hours.

This catalyst was tested for $C_3H_6$ oxidation at temperatures between 60 and 100° C. in dry air as described in Example 23.

Some of calcined $Pt/Al_2O_3$ sample described above was also reduced in 7% $H_2/N_2$ at 400° C. for 1 hour. The reduction step was carried out by ramping the catalyst temperature from 25 to 400° C. at a $H_2/N_2$ gas flow rate of 500 cc/min. The ramp temperature was about 5° C./min. The catalyst was cooled down to room temperature and the catalyst was tested for $C_3H_6$ oxidation as described in Example 23.

Example 21

6.8 g of ammonium tungstate was dissolved in 30 cc of water and the pH adjusted to 10 and the solution impregnated onto 50 g of Versal GL alumina (LaRoche Industries Inc.). The material was dried at 100° C. and calcined for 2 hours at 550° C. The approximately 10% by metal weight of W on $Al_2O_3$ was cooled to room temperature and impregnated with 13.7 g of Pt amine hydroxide (18.3% Pt). 2.5 g of acetic acid was added and mixed well. The catalyst was then made into a slurry containing 35% solid by adding water. The slurry was then coated over a 400 cpsi, 1.5"×1.0" diameter ceramic substrate resulting, after drying, in having a catalyst washcoat loading of 0.79 g/in³. The coated catalyst was then dried and calcined at 550° C. for 2 hours. The catalyst was tested calcined in $C_3H_6$ and dry air in the temperature range 60 to 100° C.

Example 22

6.8 g of perrhenic acid (36% Re in solution) was further diluted in water to make 10 g percent perrhenic acid solution. The solution was impregnated onto 25 g of Versal GL alumina. The impregnated alumina was dried and the powder calcined at 550° C. for 2 hours. The impregnated 10 weight percent based metal of Re on $Al_2O_3$ powder was then further impregnated with 6.85 g of Pt amine hydroxide solution (Pt metal in solution was 18.3%). 5 g of acetic acid was added and mixed for a half hour. A slurry was made by adding water to make 28% solid. The slurry was ballmilled for 2 hours and coated onto 1.5" diameter×1.0" length 400 cpsi ceramic substrate to give a catalyst washcoat loading of 0.51 g/in³ after drying. The catalyst coated substrate was dried at 100° C. and calcined at 550° C. for 2 hours. The catalyst was tested in the calcined form using 60 ppm $C_3H_6$ and dry air in the temperature range of 60 to 100° C.

Example 23

The catalyst of Examples 20, 21 and 22 were tested in a microreactor. The size of the catalyst samples was 0.5" diameter and 0.4" length. The feed was composed of 60 ppm $C_3H_6$ in dry air in the temperature range of 25 to 100° C. The $C_3H_6$ was measured at 60, 70, 80, 90 and 100° C. at steady sate condition. Results are summarized in Table VIII.

TABLE VIII

SUMMARY RESULTS OF $C_3H_6$ CONVERSION

| Catalyst Name % C3H6 Conversion @ | $Pt/Al_2O_3$ Calcined (Ex. 20) | $Pt/Al_2O_3$ Calcined and Reduced (Ex. 20) | Pt/10% W/ $Al_2O_3$ Calcined (Ex. 21) | Pt/10% Re/ $Al_2O_3$ Calcined (Ex. 22) |
|---|---|---|---|---|
| 60° C. | 0 | 10 | 9 | 11 |
| 70° C. | 7 | 22 | 17 | 27 |
| 80° C. | 20 | 50 | 39 | 45 |

TABLE VIII-continued

SUMMARY RESULTS OF $C_3H_6$ CONVERSION

| Catalyst Name % C3H6 Conversion @ | $Pt/Al_2O_3$ Calcined (Ex. 20) | $Pt/Al_2O_3$ Calcined and Reduced (Ex. 20) | Pt/10% W/ $Al_2O_3$ Calcined (Ex. 21) | Pt/10% Re/ $Al_2O_3$ Calcined (Ex. 22) |
|---|---|---|---|---|
| 90° C. | 38 | 70 | 65 | 64 |
| 100° C. | 60 | 83 | 82 | 83 |

It is clear from the Table that addition of W or Re oxide has enhanced the activity of the $Pt/Al_2O_3$ in the calcined form. The $C_3H_6$ conversion of the calcined $Pt/Al_2O_3$ was enhanced significantly when catalyst was reduced at 400° C. for 1 hour. The enhanced activity was also observed for the calcined catalyst by incorporation of W or Re oxides.

Example 24

This is an example of preparing high surface area cryptomelane using $MnSO_4$.

Molar ratios of $KMnO_4$:$MnSO_4$:acetic acid were 1:1.43:5.72

Molarities of Mn in solutions prior to mixing were:
  0.44 M $KMnO_4$
  0.50 M $MnSO_4$
FW $KMnO_4$=158.04 g/mol
FW $MnSO_4 \cdot H_2O$=169.01 g/mol
FW $C_2H_4O_2$=60.0 g/mol The following steps were conducted:
1. Made a solution of 3.50 moles (553 grams) of $KMnO_4$ in 8.05 L of D.I. water and heated to 68° C.
2. Made 10.5 L of 2N acetic acid by using 1260 grams of glacial acetic acid and diluting to 10.5 L with D.I. water. Density of this solution is 1.01 g/mL.
3. Weighed out 5.00 moles (846 grams) of manganous sulfate hydrate ($MnSO_4 \cdot H_2O$) and dissolved in 10,115 g of the above 2N acetic acid solution and heated to 40° C.
4. Added the solution from 3. to the solution from 1. over 15 minutes while continuously stirring. After addition was complete, began heating the slurry according to the following heat-up rate:
   1:06 pm 69.4° C.
   1:07 pm 71.2° C.
   1:11 pm 74.5° C.
   1:15 pm 77.3° C.
   1:18 pm 80.2° C.
   1:23 pm 83.9° C.
   1:25 pm 86.7° C.
   1.28 pm 88.9° C.
5. At 1:28 pm approximately 100 mL of slurry was removed from the vessel and promptly filtered on a Büchner funnel, washed with 2 L of D.I. water, and then dried in an oven at 100° C. The sample was determined to have a BET Multi-Point surface area of 259.5 m²/g and Matrix (T-Plot) surface area of 254.1 m²/g.

Example 25

This is an example of preparing high surface area cryptomelane using $Mn(CH_3COO)_2$.

Molar ratios of $KMnO_4$:$Mn(CH_3CO_2)_2$:acetic acid were 1:1.43:5.72

FW $KMnO_4$=158.04 g/mol Aldrich Lot #08824MG

FW Mn(CH$_3$CO$_2$)$_2$.H$_2$O=245.09 g/mol Aldrich Lot #08722HG
FW C$_2$H$_4$O$_2$=60.0 g/mol
The following steps were conducted:
1. Made a solution of 2.0 moles (316 grams) of KMnO$_4$ in 4.6 L of D.I. water and heated to 60° C. by heating on hot plates.
2. Made up 6.0 of 2N acetic acid by using 720 grams of glacial acetic acid and diluting to 6.0 L with D.I. water. Density of this solution is 1.01 g/mL.
3. Weighed out 2.86 moles (700 grams) of manganese (II) acetate tetrahydrate [Mn(CH$_3$CO$_2$)$_2$.4H$_2$O] and dissolved in 5780 g of the above 2N acetic acid solution (in the reactor vessel). Heated to 60° C. in the reactor vessel.
4. Added the solution from 1. to the solution from 3. while maintaining the slurry at 62–63° C. After complete addition, gently heated the slurry according to the following:
82.0° C. at 3:58 pm
86.5° C. at 4:02 pm
87.0° C. at 4:06 pm
87.1° C. at 4:08 pm
shut off heat
then quenched the slurry by pumping 10 L of D.I. water into the vessel. This cooled the slurry to 58° C. at 4:13 pm. The slurry was filtered on Büchner funnels. The resulting filter cakes were reslurried in 12 L of D.I. water then stirred overnight in a 5 gallon bucket using a mechanical stirrer. The washed product was refiltered in the morning then dried in an oven at 100° C. The sample was determined to have a BET Multi-Point surface area of 296.4 m$^2$/g and Matrix (T-Plot) surface area of 267.3 m$^2$/g. The resulting cryptomelane is characterized by the XRD pattern of FIG. 17. It is expected to have an IR spectrum similar to that shown in FIG. 16.

Example 26

Following is a description of the ozone testing method for determining percent ozone decomposition used in this Example. A test apparatus comprising an ozone generator, gas flow control equipment, water bubbler, chilled mirror dew point hygrometer, and ozone detector was used to measure the percent ozone destroyed by catalyst samples. Ozone was generated in situ utilizing the ozone generator in a flowing gas stream comprised of air and water vapor. The ozone concentration was measured using the ozone detector and the water content was determined utilizing the dew point hygrometer. Samples were tested as 25° C. using inlet ozone concentrations of 4.5 to 7 parts per million (ppm) in a gas stream flowing at approximately 1.5 L/minute with a dew point between 15° C. and 17° C. Samples were tested as particles sized to –25/+45 mesh held between glass wool plugs in a ¼" I.D. Pyrex® glass tube. Tested samples filled a 1 cm portion of the glass tube.

Sample testing generally required between 2 to 16 hours to achieve a steady state of conversion. Samples typically gave close to 100% conversion when testing began and slowly decreased to a "leveled off" conversion that remained steady for extended periods of time (48 hours). After a steady state was obtained, conversions were calculated from the equation: % ozone conversion=[(1-(ozone concentration after passing over catalyst)/(ozone concentration before passing over catalyst)]*100.

Ozone destruction testing on the sample of Example 24 showed 58% conversion.

Ozone destruction testing on the sample of Example 25 showed 85% conversion.

Example 27

This example is intended to illustrate that the method of Example 25 generated "clean" high surface area cryptomelane for which the ozone destruction performance was not further enhanced by calcination and washing. A 20 gram portion of the sample represented by Example 25 was calcined in air at 200° C. for 1 hour, cooled to room temperature, then washed at 100° C. in 200 mL of D.I. water by stirring the slurry for 30 minutes. The resulting product was filtered and dried at 100° C. in an oven. The sample was determined to have BET Multi-Point surface area of 265 m$^2$/g. Ozone destruction testing on the sample showed 85% conversion. A comparison to the testing of the sample of Example 25 demonstrated that no benefit in ozone conversion was realized from the washing and calcination of the sample of Example 25.

Example 28

Samples of high surface area cryptomelane were obtained from commercial suppliers and modified by calcination and/or washing. As received and modified powders were tested for ozone decomposition performance according to the method of Example 26 and characterized by powder X-ray diffraction, infrared spectroscopy, and BET surface area measurements by nitrogen adsorption.

Example 28a

A commercially supplied sample of high surface area cryptomelane (Chemetals, Inc., Baltimore, Md.) was washed for 30 minutes in D.I. water at 60° C., filtered, rinsed, and oven-dried at 100° C. Ozone conversion of the as received sample was 64% compared to 79% for the washed material. Washing did not change the surface area or crystal structure of this material (223 m$^2$/g cryptomelane) as determined by nitrogen adsorption and powder X-ray diffraction measurements, respectively. However, infrared spectroscopy showed the disappearance of peaks at 1220 and 1320 wavenumbers in the spectrum of the washed sample indicating the removal of sulfate group anions.

Example 28b

Commercially supplied samples of high surface area cryptomelane (Chemetals, Inc., Baltimore, Md.) were calcined at 300° C. for 4 hours and 400° C. for 8 hours. Ozone conversion of the as received material was 44% compared to 71% for the 300° C. calcined sample and 75% for the 400° C. calcined sample. Calcination did not significantly change the surface area or crystal structure of the 300° C. or 400° C. samples (334 m$^2$/g cryptomelane). A trace of Mn$_2$O$_3$ was detected in the 400° C. sample. Calcination causes dehydroxylation of these samples. Infrared spectroscopy show a decrease in the intensity of the band between 2700 and 3700 wavenumbers assigned to surface hydroxyl groups.

Example 29

The addition Pd black (containing Pd metal and oxide) to high surface area cryptomelane is found to significantly enhance ozone decomposition performance. Samples were prepared comprising Pd black powder physically mixed with powders of (1) a commercially obtained cryptomelane (the 300° C. calcined sample described in Example 28b) and (2) the high surface area cryptomelane synthesized in Example 25 calcined at 200° C. for 1 hour. The samples were prepared by mixing, in a dry state, powder of Pd black and cryptomelane in a 1:4 proportion by weight. The dry mixture was shaken until homogeneous in color. An amount of D.I. water was added to the mixture in a beaker to yield 20–30% solids content, thus forming a suspension. Aggregates in the suspension were broken up mechanically with a stirring rod. The suspension was sonicated in a Bransonic® Model 5210 ultrasonic cleaner for 10 minutes and then oven dried at 120–140° C. for approximately 8 hours.

The ozone conversion for the commercially obtained cryptomelane calcined at 300° C. was 71% as measured on the powder reactor (Example 28b). A sample of this product was mixed with 20 weight percent Pd black yielded 88% conversion.

The cryptomelane sample prepared as in Example 25 calcined at 200° C. had 85% conversion. Performance improved to 97% with 20 weight percent Pd black added.

We claim:

1. A method of treating the atmosphere comprising ambient air comprising:

contacting the ambient air with a stationary air handling system for facilities selected from the group consisting of residential buildings, commercial buildings, industrial buildings, power plants, oil refineries, and chemical plants, the air handling system comprising a substrate selected from the group consisting of fan blades, ducts, louvers, grills, motor housings, filtration media, screens, coils, fins and plates, the substrate further comprising aluminum surfaces, at least a portion of said surfaces being coated with a pollutant treating composition consisting essentially of manganese oxide which is free or substantially free of copper and/or oxides thereof.

2. The method as recited in claim 1 wherein, the pollutant treating composition further comprises a polymeric binder.

3. The method of claim 2, wherein the polymeric binder comprises a polymeric composition which comprises a polymer selected from the group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, thermoplastic polyesters, thermosetting polyesters, poly(phenylene oxide), poly(phenylene sulfide), fluorinated polymers, polyamide, phenolic resins and epoxy resins, polyurethane, silicone polymers, polyimides, acrylics, styrene acrylics, poly(vinyl alcohol) and ethylene vinyl acetate copolymers.

4. The method according to claims 1 or 2 wherein the substrate is part of a heating, ventilating and air conditioning unit (HVAC).

5. The method of claim 4 wherein, the substrate is an air conditioning condenser.

6. The method as recited in claim 1 wherein, the pollutant treating composition further comprises a refractory support.

7. The method as recited in claim 1 further comprising the step of calcining the pollutant treating composition.

8. The method as recited in claim 1 wherein, the manganese oxide is $\alpha$-$MnO_2$ selected from the group consisting hollandite, cryptomelane, manjiroite and coronadite.

9. The method as recited in claim 8 wherein $\alpha$-$MnO_2$ is cryptomelane which has been washed in an aqueous liquid thereby removing sulfate ijons, chloride ions, and/or nitrates from the cryptomelane.

10. The method as recited in claim 1 wherein, the $MnO_2$ is cryptomelane which has been made by mixing an aqueous manganese salt solution with an acidic potassium permanganate solution, forming a slurry, stirring the slurry at a temperature range of about from 50 to 110° C., filtering the slurry, drying the filtered slurry at a temperature range of about from 75 to 200° C. to form cryptomelane crystals having a surface area of about from 150 to 350 $m^2$/g.

11. The method of claim 10 wherein the surface area is from about 200 to 250 $m^2$/g.

12. The method as recited in claim 11 wherein, the manganese salt is selected from the group consisting of $MnCl_2$, $Mn(NO_3)_2$, $MnSO_4$ and $MN(CH_3COO)_2$.

13. The method as recited in claims 10 or 12 further comprising the step of calcining the catalyst composition.

14. The method as recited in claim 12 wherein the manganese salt is $Mn(CH_3COO)_2$.

15. The method as recited in claim 12 further comprising washing the cryptomelane thereby removing sulfate ions, choride ions and/or nitrate from the cryptomelane.

16. The air handling unit of claim 1, wherein the unit is an HVAC unit.

17. The HVAC unit of claim 16, wherein the coated aluminum surface is an air conditioning condenser.

* * * * *